(12) United States Patent
Knight et al.

(10) Patent No.: US 9,065,792 B2
(45) Date of Patent: *Jun. 23, 2015

(54) METHOD OF ENABLING DIGITAL MUSIC CONTENT TO BE DOWNLOADED TO AND USED ON A PORTABLE WIRELESS COMPUTING DEVICE

(71) Applicant: OMNIFONE LIMITED, London (GB)

(72) Inventors: Mark Stephen Knight, London (GB); Michael Ian Lamb, London (GB); Robert John Lewis, London (GB); Stephen William Pocock, Egham (GB); Philip Anthony Sant, London (GB); Mark Peter Sullivan, Birmingham (GB); Christopher John Evans, London (GB)

(73) Assignee: OMNIFONE LIMITED, London (GB)

( * ) Notice: Subject to any disclaimer, the term of this patent is extended or adjusted under 35 U.S.C. 154(b) by 94 days.

This patent is subject to a terminal disclaimer.

(21) Appl. No.: 13/832,783

(22) Filed: Mar. 15, 2013

(65) Prior Publication Data

US 2013/0304870 A1  Nov. 14, 2013

Related U.S. Application Data

(63) Continuation of application No. 12/299,505, filed as application No. PCT/GB2007/001675 on May 8, 2007, now Pat. No. 8,510,847.

(30) Foreign Application Priority Data

| May 5, 2006 | (GB) | .................................. 0608932 |
| May 5, 2006 | (GB) | .................................. 0608933 |
| May 5, 2006 | (GB) | .................................. 0608934 |
| May 5, 2006 | (GB) | .................................. 0608935 |
| May 5, 2006 | (GB) | .................................. 0608936 |
| Feb. 9, 2007 | (GB) | .................................. 0702596 |

(51) Int. Cl.
*G06F 7/04* (2006.01)
*H04L 12/58* (2006.01)
(Continued)

(52) U.S. Cl.
CPC ............... *H04L 51/32* (2013.01); *G06Q 10/10* (2013.01); *G06Q 30/06* (2013.01);
(Continued)

(58) Field of Classification Search
CPC ..... H04L 67/06; H04L 67/104; H04L 45/563; H04L 2209/603
USPC ............................. 370/310; 709/225; 726/26
See application file for complete search history.

(56) References Cited

U.S. PATENT DOCUMENTS 8,229,856 B1 * 7/2012 Reddick .......................... 705/50
2002/0198846 A1 * 12/2002 Lao ................................ 705/54
(Continued)

OTHER PUBLICATIONS

Senoh, T.; et al.; "DRM renewability & interoperability"; Consumer Communications and Networking Conference, 2004. CCNC 2004. First IEEE;DOI: 10.1109/CCNC.2004.1286899; Publication Year: 2004 , pp. 424-429.*

*Primary Examiner* — Harunur Rashid
*Assistant Examiner* — Angela Holmes
(74) *Attorney, Agent, or Firm* — Saul Ewing LLP

(57) ABSTRACT

The invention enables digital music content to be downloaded to and used on a portable wireless computing device. An application running on the wireless device has been automatically adapted to parameters associated with the wireless device without end-user input (e.g. the application has been configured in dependence on the device OS and firmware, related bugs, screen size, pixel number, security models, connection handling, memory etc. This application enables an end-user to browse and search music content on a remote server using a wireless network; to download music content from that remote server using the wireless network and to playback and manage that downloaded music content. The application also includes a digital rights management system that enables unlimited legal downloads of different music tracks to the device and also enables any of those tracks stored on the device to be played so long as a subscription service has not terminated.

23 Claims, 73 Drawing Sheets

(51) Int. Cl.
   *G06Q 10/10*   (2012.01)
   *G06Q 30/06*   (2012.01)
   *H04M 3/487*   (2006.01)
   *H04L 29/06*   (2006.01)
   *H04M 1/725*   (2006.01)
   *H04W 12/08*   (2009.01)
   *H04L 29/08*   (2006.01)

(52) U.S. Cl.
   CPC ..... *H04L 2463/101* (2013.01); *H04M 1/72558* (2013.01); *H04M 3/4872* (2013.01); *H04M 2203/358* (2013.01); *H04W 12/08* (2013.01); *H04L 67/06* (2013.01); *H04L 67/325* (2013.01); *H04L 67/04* (2013.01); *H04L 69/14* (2013.01); *H04L 67/32* (2013.01)

(56) References Cited

U.S. PATENT DOCUMENTS

| | | |
|---|---|---|
| 2006/0008256 A1* | 1/2006 | Khedouri et al. ............. 386/124 |
| 2006/0056324 A1* | 3/2006 | Hyyppa et al. ................ 370/310 |
| 2007/0073728 A1* | 3/2007 | Klein et al. .................... 707/10 |

* cited by examiner

|        | Lower | Upper |
|--------|-------|-------|
| Data   | 3.33% | 6.67% |
| Image  | 3.33% | 6.67% |
| Audio  | 10%   | 90%   |
Figure 7
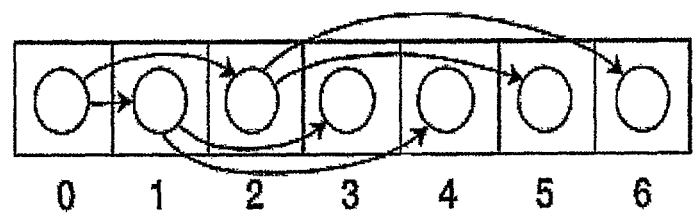
Figure 5
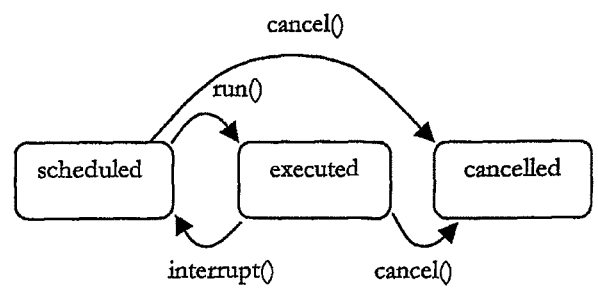
Figure 6

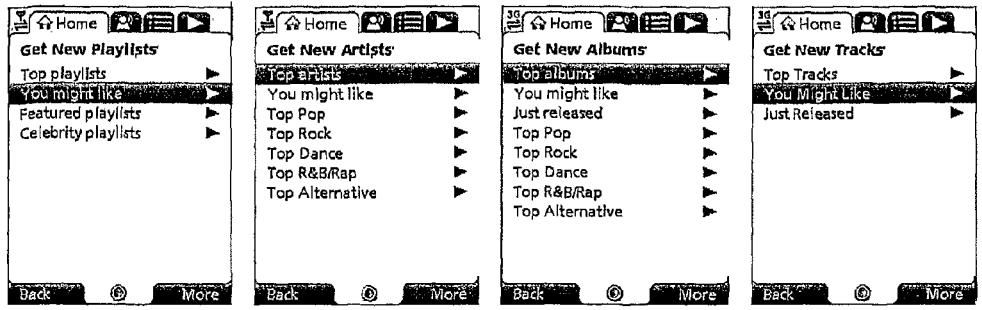

Figure 10

| Personalised Menu Item | Recommendations contained |
|---|---|
| You Might Like | Playlists / Artists / Albums / Tracks recommended to the customer based on their recent listening habits, and taking into account any explicit music ratings that they have made. |
| Featured... *Playlists* *Artists* *Albums* *Tracks* | A list of Playlists / Artists / Albums / Tracks that have been editorially pushed for promotion, and personalized for the Playlists / Artists / Albums / Tracks and Genres the customer listens to. |
| Just Released | A list of back-catalogue Artists / Albums / Tracks that have been recently added to the system. Even those that are new to the system could potentially be old back catalogue releases. This list is based on the customer's recent listening and rating habits |

Figure 11

DRAWING
LEFT
BLANK
Figure 12
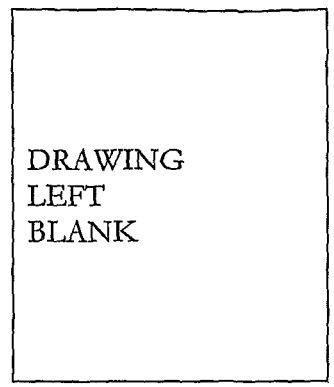
Figure 13
Figure 14

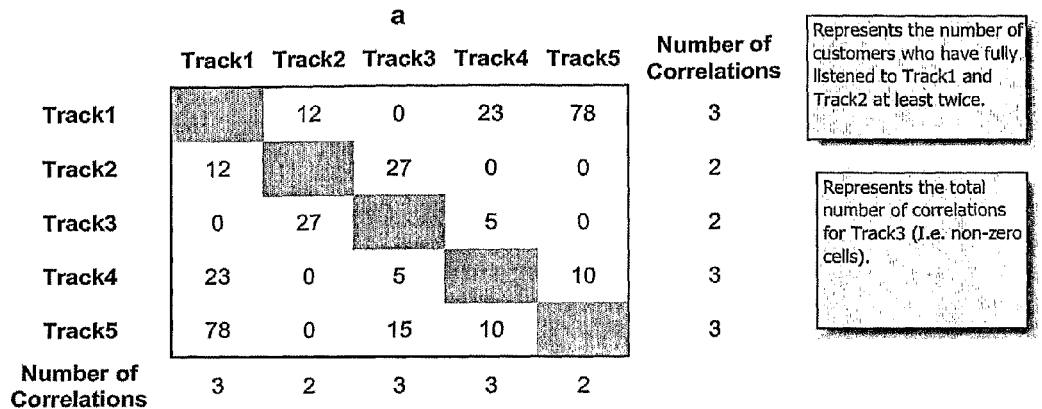

Figure 16

| Personalised Menu Item | Recommendations Contained |
|---|---|
| Cool members | |
| You might like | A list of 10 Buzz Members who are deemed similar to this member. This list is generated using this member's rating and listening habits. |
| Featured Members | A list of Buzz members that have been editorially pushed for promotion, and personalised for the Playlists / Artists / Albums / Tracks and Genres the customer listens to. |
| Buzz Playlists | |
| You might like | A list of 10 shared playlists belonging to the Buzz members in the You might like members list. |
| Featured playlists | A list of Buzz playlists that have been editorially pushed for promotion, and personalised for the Playlists / Artists / Albums / Tracks and Genres the customer listens to. |

Figure 15

|   |   | a |   |   |   |   | Weighting Sum |   |   |
|---|---|---|---|---|---|---|---|---|---|
|   |   | Track1 | Track2 | Track3 | Track4 | Track5 |   |   |   |
| b | Track1 |  | 34.00 | 0.00 | 13.15 | 44.61 | 91.77 |   |   |
|   | Track2 | 34.00 |  | 76.50 | 0.00 | 0.00 | 110.50 |   |   |
|   | Track3 | 0.00 | 76.50 |  | 2.86 | 8.58 | 87.94 |   |   |
|   | Track4 | 13.15 | 0.00 | 2.86 |  | 5.72 | 21.73 |   |   |
|   | Track5 | 44.61 | 0.00 | 8.58 | 5.72 |  | 58.91 |   |   |
|   | Weighting Sum | 91.77 | 110.50 | 87.94 | 21.73 | 58.91 |   |   |   |

Figure 17

|   |   | a |   |   |   |   |   |   |
|---|---|---|---|---|---|---|---|---|
|   |   | Track1 | Track2 | Track3 | Track4 | Track5 | PCAs |   |
| b | Track1 |  | 0.31 | 0.00 | 0.61 | 0.76 |   |   |
|   | Track2 | 0.31 |  | 0.87 | 0.00 | 0.00 |   |   |
|   | Track3 | 0.00 | 0.87 |  | 0.13 | 0.15 |   |   |
|   | Track4 | 0.61 | 0.00 | 0.13 |  | 0.10 |   |   |
|   | Track5 | 0.76 | 0.00 | 0.15 | 0.10 |  |   |   |

Figure 18 a

|  | Artist1 | Artist2 | Artist3 | Artist4 | Artist5 |
|---|---|---|---|---|---|
| Artist1 |  | 0.31 | 0.00 | 0.61 | 0.76 |
| Artist2 | 0.31 |  | 0.87 | 0.00 | 0.00 |
| Artist3 | 0.00 | 0.87 |  | 0.13 | 0.15 |
| Artist4 | 0.61 | 0.00 | 0.13 |  | 0.10 |
| Artist5 | 0.76 | 0.00 | 0.15 | 0.10 |  | b (row label on left side)

Figure 19 a

|  | Cust1 | Cust2 | Cust3 | Cust4 | Cust5 |
|---|---|---|---|---|---|
| Cust1 |  | 0.31 | 0.00 | 0.61 | 0.76 |
| Cust2 | 0.31 |  | 0.87 | 0.00 | 0.00 |
| Cust3 | 0.00 | 0.87 |  | 0.13 | 0.15 |
| Cust4 | 0.61 | 0.00 | 0.13 |  | 0.10 |
| Cust5 | 0.76 | 0.00 | 0.15 | 0.10 |  | b (row label on left side)

Figure 20

| Associations Matrix based on | Inputs to recommendation | Results mechanism |
|---|---|---|
| "More like this" Track In the More like this scenarios, a seed Track, Album or Artist is selected by the customer. MusicStation then provides a sequence of Tracks, Albums or Artists based on the seed, which can optionally be used as a Playlist by the customer. | | |
| Track Associations Matrix | The seed Track | Sequence of 10 distinct recommended Tracks in descending of order of closeness of fit (i.e. PCA correlation value).<br><br>Filtered out of this returned list are:<br>- The seed Track.<br>- Tracks that are not available on the customer's service.<br>- Tracks that the customer already owns or has fully listened to.<br>- Tracks, or Tracks from Albums or Artists, that the customer has rated as Hate it!<br><br>Returned Tracks should be from a variety of Artists. No more than 2 Tracks should be for the same Artist. |
| "More like this" Artist | | |
| Artist Associations Matrix | The seed Artist. | Sequence of 10 distinct recommended Artists in descending of order of closeness of fit (i.e. PCA correlation value).<br><br>Filtered out of this returned list are:<br>- The seed Artist<br>- Artists that are not available on the customer's service.<br>- Artists for which the customer has already fully listened to 50% of their catalogue.<br>- Artists that the customer has rated as Hate it! |

Figure 21

| "More like this" Album | | |
|---|---|---|
| Artist Associations Matrix | The seed Artist of the Release. | Sequence of 10 distinct recommended Albums (Releases), based on a cross-section of the Albums produced by the Artists with the highest closeness of fit (i.e. PCA correlation value).<br><br>Filtered out of this returned list are:<br>- The seed Album.<br>- Albums that are not available on the customer's service.<br>- Albums for which the customer has already fully listened to at least 50% of the Tracks.<br>- Albums that the customer has rated as Hate it!, and Albums from Artists that the customer has rated as Hate it!**<br><br>Returned Albums should be from a variety of Artists. No more than 2 Albums should be for the same Artist. |
| Tracks "You might like"<br>Tracks, Albums, Artists, and Playlists that "You might like" is a sequence of 10 recommended Tracks, Albums, Artists, and Playlists that are based upon your recent listening habits. The list is available form the Artist/Album/Track/Playlist screens. | | |
| Track Associations Matrix | 10 distinct Tracks made up of:<br>- The most recent Tracks rated a Love It! (up to a maximum of 5)<br>- The most recent Tracks that have been fully-listened to at least twice, to make up the remaining Tracks.<br>Excluded as inputs are Tracks the customer had flagged as Hate It! Regardless of how many times listened to. | Sequence of 10 distinct recommended Tracks in descending of order of closeness of fit (i.e. PCA correlation value).<br><br>Filtered out of this returned list are:<br>- The seed Tracks.<br>- Tracks that are not available on the customer's service.<br>- Tracks that the customer already owns or has fully listened to.<br>- Tracks, or Tracks from Albums or Artists, that the customer has rated as Hate it!<br><br>Additionally the system will seek to return the best correlated two new Tracks that are one-week old new releases in the system, replacing the least highly correlated Tracks in the 10 returned.<br><br>Returned Tracks should be from a variety of Artists. No more than 2 Tracks should be for the same Artist. |

Figure 22

| Artists "You might like" | | |
|---|---|---|
| Artist Associations Matrix | 10 distinct Artists made up of:<br>• The most recent Artists rated a Love It! (up to a maximum of 5)<br>• The most recent Artists for which Tracks have been fully-listened to at least twice, to make up the remaining Artists.<br>Excluded as inputs are Artists the customer had flagged as Hate It! Regardless of how many times listened to. | Sequence of 10 distinct recommended Artists in descending of order of closeness of fit (i.e. PCA correlation value).<br><br>Filtered out of this returned list are:<br>• The seed Artists.<br>• Artists that are not available on the customer's service.<br>• Artists for which the customer has already fully listened to 50% of their catalogue.<br>• Artists that the customer has rated as Hate it!<br><br>Additionally the system will seek to return the best correlated two new Artists that are one-week old new releases in the system, replacing the least highly correlated Artists in the 10 returned. |
| Albums "You might like" | | |
| Artist Associations Matrix | 10 distinct Artists made up of:<br>• The most recent Artists rated a Love It! (up to a maximum of 5)<br>• The most recent Artists for which Tracks have been fully-listened to at least twice, to make up the remaining Artists.<br>Excluded as inputs are Artists the customer had flagged as Hate It! Regardless of how many times listened to. | Sequence of 10 distinct recommended Albums in descending of order of closeness of fit (i.e. PCA correlation value).<br><br>Filtered out of this returned list are:<br>• The seed Albums.<br>• Albums that are not available on the customer's service.<br>• Albums for which the customer has already fully listened to at least 50% of the Tracks.<br>• Albums that the customer has rated as Hate it!, and Albums from Artists that the customer has rated as Hate it!<br><br>Additionally the system will seek to return the best correlated two Artists that are one-week old new releases in the system, replacing the least highly correlated Artists in the 10 returned.<br><br>Returned Albums should be from a variety of Artists. No more than 2 Albums should be for the same Artist. |

Figure 23

| Albums "You might like" | | |
|---|---|---|
| Artist Associations Matrix | 10 distinct Artists made up of:<br>• The most recent Artists rated a Love It! (up to a maximum of 5)<br>• The most recent Artists for which Tracks have been fully-listened to at least twice, to make up the remaining Artists.<br>Excluded as inputs are Artists the customer had flagged as Hate It! Regardless of how many times listened to. | Sequence of 10 distinct recommended Albums in descending of order of closeness of fit (i.e. PCA correlation value).<br><br>Filtered out of this returned list are:<br>• The seed Albums.<br>• Albums that are not available on the customer's service.<br>• Albums for which the customer has already fully listened to at least 50% of the Tracks.<br>• Albums that the customer has rated as Hate it!, and Albums from Artists that the customer has rated as Hate it!<br><br>Additionally the system will seek to return the best correlated two Artists that are one-week old new releases in the system, replacing the least highly correlated Artists in the 10 returned.<br><br>Returned Albums should be from a variety of Artists. No more than 2 Albums should be for the same Artist. |
| "Recommended Members"<br>Recommended members are customers that are similar to the source customer based upon rating and listening habits. They are listed on the Cool Members screen on the Buzz tab. | | |
| Customer Associations Matrix | The current customer. | Sequence of 10 distinct recommended Customers in descending of order of closeness of fit for the customer's service.<br><br>Filtered out of this returned list are:<br>• Customers who are already friends.<br>• Customers who have been blocked.<br><br>Additionally the system will seek to return the best correlated two new Customers that are one-week old new releases in the system, replacing the least highly correlated Customers in the 10 returned. |

Figure 24

| Playlists "You might like" | | |
|---|---|---|
| Playlists "You might like" are Playlists that have been shared by other MusicStation customers within the same service. Accessed from the Playlists screen and also listed on the Buzz tab Cool Playlists screen. | | |
| Customers Associations Matrix | The current customer. | Sequence of 10 distinct recommended Playlists taken from the customers who are closest to the current customer, in descending of order of closeness of fit.<br><br>Filtered out of this returned list are:<br>• Playlists from customers who are already friends.<br>• Playlists from customers who have been blocked.<br>• Playlists that the customer has already listened to at least once.<br>• Playlists for which the customer has already fully listened to at least 50% of the Tracks.<br>• Playlists that the customer has in their library.<br>• Playlists that the customer has rated as Hate it!<br><br>Additionally the system will seek to return the best correlated two new Customers that are one-week old new releases in the system, replacing the least highly |
| Inbox – editorial and promotional. | | |
| Inbox items are directed to the customer based on what they listen to. An extension of this would be to supply news on Artists that we THINK they may be interested in based upon our Artists correlations matrix. | | |
| Artist Associations Matrix | As per "Artists "You might like". | As per "Artists "You might like". |

Figure 25

|  | Average plays per customer | Normalized Plays (X - MEAN) / STDEV | Rating Value (2.5 + NORMALISED PLAYS) |
|---|---|---|---|
| Angels - Robbie Williams | 12.90 | 1.95 | 4.45 |
| Country House - Blur | 4.60 | -0.01 | 2.49 |
| Life on Mars - David Bowie | 3.30 | -0.32 | 2.18 |
| Yellow - Coldplay | 1.23 | -0.81 | 1.69 |
| Bohemian Rhapsody - Queen | 4.01 | -0.15 | 2.35 |
| I Luv Ya - Atomic Kitten | 1.89 | -0.65 | 1.85 |
| Average overall plays per customer | 4.66 | | |
| Standard Deviation | 4.23 | | |

Figure 26

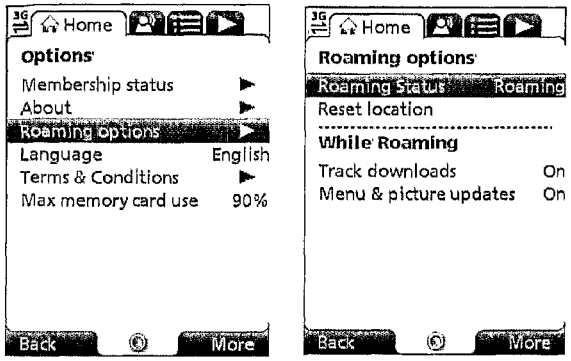

Figure 36

| Option | Description |
|---|---|
| Roaming Status | The phone's current roaming status. This will show *Home* if the user is not roaming and will show *Roaming* if the user is roaming. |
| Track Downloads | The user can set this option *On* to download tracks (with additional charges) when roaming without a prompt. The user set this option to *Off* to prevent the downloading tracks when roaming or *Ask* to cause the following prompts. |
| Menu & picture updates | The user can set this option *On* to update menu items and pictures (with additional charges) when roaming without a prompt. The user set this option to *Off* to prevent menu and picture updates when roaming or *Ask* to cause the following prompts. |

Figure 37

| Message Title shown on Inbox screen | Message Content | Result |
|---|---|---|
| Friend Request Accepted *OtherMemberName* | *OtherMemberName* has approved your friend request. You can now both send each other tracks, playlists and messages. | OtherMemberName is added to this user's friends and this user is added to OtherMemberName's |
| Friend Request Denied *OtherMemberName* | *OtherMemberName* has denied your friend request. | No change to either member's friends lists. This member can resubmit their friend request. |
| Friend Requests Blocked *OtherMemberName* | *OtherMemberName* has blocked all friend requests from you. | This member will have all friend requests to this other member blocked automatically. The other member will never see requests from this member again. |

Figure 43

| | |
|---|---|
| [major].[minor].[micro] | Represents the version number in the format major version.minor version.micro version. For example 0.4.6. |
| Variant name | Then a variant name which will be defined for each variant. Currently this will be one of "MIDP", "Symbian", "WindowsMobile", "MusicMate". |
| Platform identifier | The variant is followed by a space character, and then a platform identifier. The platform identifier is the device code from the db. This platform identifier will differ for each variant. This platform identifier may contain spaces, and will generally be used to perform a look up in the database for the properties of that device. |

Figure 46

| | |
|---|---|
| error.data | is the name of the resource being sent to the server. |
| ackId=1 | is an acknowledgment id. This is the id that will be echoed back to the client by the server in the acknowledgement line (see section 3.2.6). The client must generate this acknowledgement id in a way that it can uniquely identify which put data a received acknowledgement is for. |
| offset=0 | The next part is an offset number of bytes. This offset is how many bytes into the body of the message that this data starts. |
| length=160 | The next part is a length number of bytes. The length is how many bytes long the data in the body of the message is. |
| type="application/octet-stream" | The final part is the content type. This will almost always be the content type for our data objects. Therefore this may be redundant information, but it has been left in the protocol because images being transferred may not necessarily be wrapped in a data object. |

Figure 47

```
MSTP/0.1
RequestId: 123463
Client: MusicStation 0.4.6 MIDP Nokia/N70
UserGUID: AB12YZ
Put: error.data; ackId=1; offset=0; length=160; type="application/octet-stream"

```
MSTP/0.1
RequestId: 123464
Client: MusicStation 0.4.6 MIDP Nokia/N70
UserGUID: AB12YZ
Put: error.data; ackId=2; offset=0; length=160; type="application/octet-stream"
Put: photo.jpeg; ackId=3; offset=160; length=320; type="image/jpeg"

```
MSTP/0.1
RequestId: 123465
Client: MusicStation 0.4.6 MIDP Nokia/N70
UserGUID: AB12YZ
Put: photo.jpeg?name=Fave%20Tracks; ackId=4; offset=0; length=160; type="image/jpeg"

| Success | 1000 |
|---|---|
| Success, client roaming | 1100 |
| Unauthorized | 4010 |
| Unauthorized IP Address | 4011 |
| Forbidden | 4030 |
| Internal Server Error | 5000 |
| Service Unavailable | 5030 |
| Unsupported Version | 5050 |

Figure 51

```
MSTP/0.1
StatusCode: 1000
ResponseId: 234570
Sent: news1.data; ackId=20060619111100NEWS1; offset=0; length=160;
type="application/octet-stream"

```
MSTP/0.1
StatusCode: 1000
ResponseId: 234571
Sent: news2.data; ackId=20060619111200NEWS2; offset=0; length=160;
type="application/octet-stream"
Sent: news3.data; ackId=20060619111200NEWS3; offset=160; length=160;
type="application/octet-stream"

```
MSTP/0.1
StatusCode: 1000
ResponseId: 234572
Sent: news1.data; ackId=20060619111200NEWS1; offset=0; from=160; length=40;
type="application/octet-stream"

```
MSTP/0.1
StatusCode: 1000
ResponseId: 234573
Sent: news1.data; ackId=20060619111230NEWS1; offset=0; length=40;
type="application/octet-stream"
Sent: command.data; ackId=20060619111230NEWS2; offset=40; length=40;
type="application/octet-stream"

| object_change_log |
|---|
| object_guid |
| object_type |
| object_modified_date |
| object_modified_type (addition, replace, deletion) |
| priority |

Figure 63

| customer_object |
|---|
| customer_id |
| object_guid |
| object_type |
| object_created_date |
| object_modified_date |
| object_last_used_date |
| object_deleted_date |

Figure 64

| customer_object_change_log |
|---|
| customer_id |
| object_guid |
| object_type |
| object_modified_date |
| object_modified_type (addition, replace, deletion) |
| priority |
| acknowledgement_id |
| acknowledgement_date |

Figure 65

| ChangeLogRecord |
| --- |
| objectGUID |
| objectModifiedDate |
| objectModifiedType (ADDITION, REPLACE, DELETION) |
| acknowledgementId |
| acknowledgementDate |

Figure 66

| object_guid | object_modified_date | object_modified_type | priority |
| --- | --- | --- | --- |
| SnowPatrolXYZ | 18/07/2006 13:16:33 | REPLACE | 3 |
| EyesOpenXYZ | 18/07/2006 13:16:33 | ADDITION | 3 |

Figure 67

| customer_id | object_guid | object_modified_date | object_modified_type | priority |
| --- | --- | --- | --- | --- |
| 567 | SnowPatrolXYZ | 18/07/2006 13:16:33 | REPLACE | 3 |

Figure 68

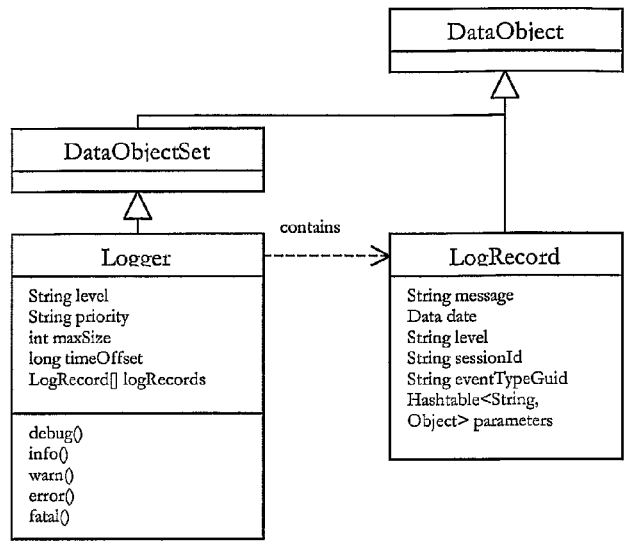

Figure 69

| customer_logger | type | constraint | default | comments |
|---|---|---|---|---|
| customer_id | NUMBER(10) | Mandatory | | Foreign key in customer |
| level | VARCHAR2(256) | Mandatory Allow values: DEBUG, INFO, WARN, ERROR, OFF | INFO | Level of logging output on client |
| priority | VARCHAR2(256) | Mandatory Allow values: MIN, NORMAL, MAX | NORMAL | Task priority for sending log records to the server |
| max_size | VARCHAR2(32) | Mandatory | 100 | Maximum number of log records stored on client |

Figure 70

| Parameter | Req'd? | Description |
|---|---|---|
| Version | Yes | A <major.minor> representation of the highest MusicStation protocol version supported by this device. |
| Software Licence | Yes | The 512 bit number installed on the device relating the application to a particular MusicStation Service. |
| Application GUID | Yes | The Application GUID is embedded in the MusicStation handset software at build time. It is a unique identifier of the specific build of the MusicStation application particular to the device's manufacturer, model, version and firmware revision level. |
| IMEI | No† | International Mobile Equipment Identity number, globally unique idenitifer of every mobile phone. Some handsets provide access to the IMEI from Java, where this is the case it is retrieved and sent to the Server as part of the MusicStation Service Registration Request. |
| Bluetooth Address | No† | The unique address used to identify a Bluetooth device and therefore a globally unique method of identifying the handset. The J2ME Bluetooth API (JSR-82) provides a method to obtain the Bluetooth Address. Where this is supported it is retrieved and sent to the Server as part of the MusicStation Service Registration Request. |
| IMSI | No† | International Mobile Subscriber Identity number, unique to every mobile phone user, stored in the SIM. The IMSI is available as a system property on some J2ME devices. Where this is supported it is retrieved and sent to the Server as part of the MusicStation Service Registration Request. |
| MSISDN | No | MSISDN is the full international number associated with a mobile phone starting with the country code. The MSISDN is available as a system property on some J2ME devices. Where this is supported it is retrieved and sent to the Server as part of the MusicStation Service Registration Request. |

Figure 72

| Metadata Item | Req'd? | Description |
|---|---|---|
| MSISDN | No† | As above. |
| Party ID | No† | Internal MNO unique identification for subscriber. Generally used if MSISDN is deemed too sensitive to place inside communications headers which go outside of the MNO network. |
| IMEI | No | As above. |

Figure 73

| Parameter | Req'd? | Description |
|---|---|---|
| Status | Yes | Indicates if the MusicStation Registration Request resulted in a successful registration. Values include:<br>• "Success"- registration was successful.<br>• "Access Denied" – the device was not authorised.<br>• "Malformed Request" - the CA failed to parse the Device's request, for example both IMEI and Bluetooth Address were missing from the request.<br>• "UnsupportedVersion" - indicates that the device used a protocol version not supported by the CA. |
| Client GUID | Yes† | Uniquely identifies the device to the CA or RI and is sent by the device in every request to the MusicStation Server or RI. |
| Client Certificate | Yes† | The MusicStation handset application's public key certificate signed by the CA using the MusicStation Root CA Certificate. |
| Client Private Key | Yes† | The RSA 1024 bit private key used by the device to<br>• Decrypt messages that have been encrypted using its public key.<br>• Sign messages that can be validated using its public key. |

Figure 74

| Parameter | Req'd? | Description |
|---|---|---|
| Version | Yes | A <major.minor> representation of the highest MusicStation protocol version supported by this device. |
| Client GUID | Yes | Uniquely identifies the device to the RI and is sent by the device in every request to the RI. |
| Request Time | Yes | The current time as measured by the Device as the difference, measured in milliseconds, between the current time and midnight, January 1, 1970 UTC. |
| Client Certificate | Yes | The MusicStation handset application's public key certificate signed by the CA using the MusicStation Root CA Certificate. |

Figure 75

| Parameter | Req'd? | Description |
|---|---|---|
| Status | Yes | Status indicates if the RI Registration Request was successful. To succeed the Software Licence must be unlocked. If the RI Registration Request was unsuccessful then one of the following error codes results:<br>• "AccessDenied" - Device is not authorised to contact the RI.<br>• "MalformedRequest" – RI failed to parse the Device's request.<br>• "UnsupportedVersion" – Device used a protocol version not supported by the RI.<br>• "InvalidCertificate" - RI could not verify the signature on the Client Certificate due to the certificate being invalid in some way.<br>• "DomainFull" - no more Devices are allowed to join the Domain.<br>• "DomainAccessDenied" – RI does not allow the Device access to the Domain, or the Client Certificate can not be authorised without more information. |
| Session ID | Yes† | The session identifier set up by the RI. |
| RI ID | Yes† | Identifies the RI to the Device. It may be possible for the Device to obtain rights from more than one RI. In this case the RI ID uniquely identifies each RI. |
| RI URL | Yes† | If the RI Registration Request message was successful then the RI URL parameter indicates the URL that should be stored in the RI Context. The Device uses this URL in later interactions with the RI to send requests for ROs. The RI URL is an absolute identifier. There can be more than one RI URL so that the Device can have a fail-over RO request capability. |
| Domain Info | Yes† | Carries the Domain Key (encrypted using the Device's 1024 bit RSA Client Public Key) as well as information about the maximum lifetime of the Domain. See Appendix A for more detail on DK encryption. |

Figure 76

| Parameter | Req'd? | Description |
|---|---|---|
| Client GUID | Yes | Uniquely identifies the requesting Device to the RI, sent in every request to the RI. |
| Domain ID | Yes | Identifies the Domain for which the requested ROs shall be issued. |
| RI ID | Yes | Identifies the authorising RI. |
| Request Time | Yes | Measured by the Device as the difference, in milliseconds, between the current time and midnight, January 1, 1970 UTC. |
| RO Info | Yes | Identifies the requested Rights Object(s). The parameter consists of a (non-empty) set of Rights Object identifiers specifying which ROs are being requested. |

Figure 77

| Parameter | Req'd? | Description |
|---|---|---|
| Status | Yes | Status indicates if the RO Acquisition Request was successful. If the request was unsuccessful then one of the following error codes results:<br>• "AccessDenied" - Device is not authorised to contact the RI, for example see Client Certificate Revocation below.<br>• "MalformedRequest" - RI failed to parse the Device's request.<br>• "UnsupportedVersion" - Device used a protocol version not supported by the RI.<br>• "NotFound" - Requested object was not found.<br>• "NotRegistered" - Device tried to contact an RI with which it was not previously registered.<br>• "RightsExpired" - Requested rights are no longer available for this Device. This response code indicates to the device that it should not make further attempts to acquire these rights. |
| Client GUID | Yes† | Identifies the requesting Device. The value returned here must equal the Client GUID sent by the Device in the RO Acquisition Request message that triggered this response. |
| RI ID | Yes† | Identifies the RI. The value must equal the RI ID sent by the Device in the preceding RO Acquisition Request message. |
| Protected ROs | Yes† | The Rights Objects in which sensitive information (such as the CEK) is encrypted using the Rights Encryption Key (REK). The REK is encrypted using the customer's Domain Key. |

Figure 78

| Parameter | Req'd? | Description |
|---|---|---|
| DCF File | Yes | Identifies the DCF (encrypted music file) requested for download. |
| Client GUID | Yes | Identifies the requesting Device. |
| Range | No | Used to request part of a file if it has already been partially downloaded. |
Figure 79
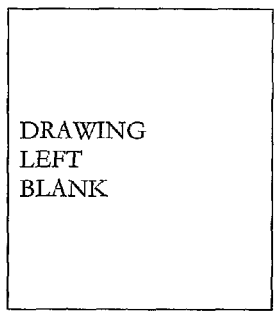
Figure 80
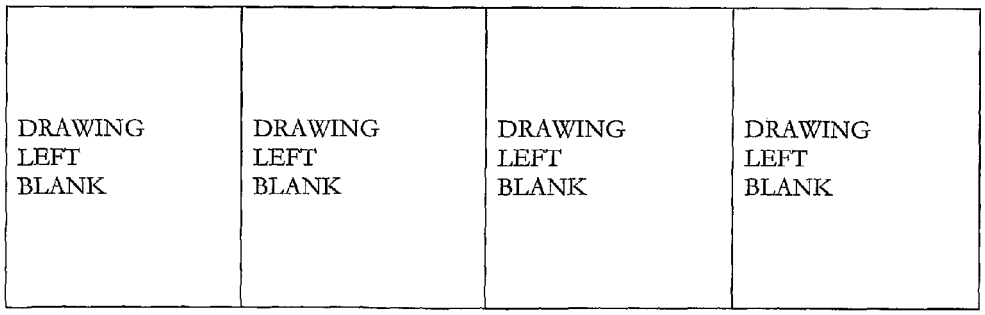
Figure 81

Figure 82

| Joystick Action | Function |
|---|---|
| Joystick right | Switch to the next tab to the right |
| Joystick left | Switch to the next tab to the left |
| Joystick down/hold | Move to the next item on a list or menu/Fast move through menu |
| Joystick up/hold | Move to the previous item on a list or menu/Fast move through menu |
| Joystick press | Open the selected menu option or perform the default action on the selected item |

Figure 83

Figure 84

| More option | Description |
|---|---|
| Add as Friend | Request to add a selected buzz user to your friends list. |
| Add to Lineup | Add an item to the end of your Lineup. |
| Add to Playlist | Add a track to a new or existing playlist. |
| Artist Profile | View information on the selected artist including star-rating, tracks that this user has downloaded from the artist and all tracks and albums from this artist. |
| Clear | Remove all tracks from the Lineup. |
| Close | Exit MusicStation. |
| Delete | Permanently delete an item. For example, delete a track from My Top Tracks or message from the user's Inbox. |
| Details | View information about a selected track or album. |
| Edit my profile | Edit a Buzz profile. This includes entering / editing a catchphrase, setting the profile image and configuring profile options. |
| Help | View context sensitive help for the selected screen. |
| Make Private | Make a shared playlist private. A private playlist is one that cannot be viewed by other Buzz members. |
| Minimise | Minimise MusicStation and place in the background (and if music is currently playing, continue playing music). The user can return to MusicStation rapidly. |
| Open | Open the selected item. |

Figure 85

| | |
|---|---|
| Pause | Pause the current track. |
| Play | Play a track on the Lineup. |
| Play ASAP | Play the item as soon as it has been downloaded. |
| Play next | Play the item after the current track has finished. |
| Play now | Play the item immediately. This option is only available on downloaded tracks. |
| Play Top Track | Add a random track from the user's top tracks to the Lineup. |
| Rate | Score an item. An item can be marked I Love it! Neutral or I Hate it! This contributes to the calculation of Star-rating |
| Reset search | Clear the search criteria from the Search text box. |
| Remove | Remove an item. For example remove a track from a playlist, a friend from a user's friend list or a track from the Lineup. |
| Save as playlist | Save the current list of tracks on the Lineup as a playlist. |
| Send | Send a message to a Buzz member. For example a friend request to another buzz user or a recommendation message to a friend. |
| Send/Receive | Send any outgoing messages in the outbox and check the server for incoming messages. |
| Send to Friend | Send a recommendation to selected friend(s) on a user's friends list. |
| Share | Make a Private Playlist available to other Buzz users. A shared playlist can be viewed and listened to by other Buzz users. |

Figure 86

Figure 87
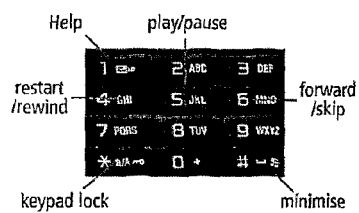
Figure 88
| Key | Function |
|---|---|
| 4 Press | Restart Current Track / Go to Previous track |
| 4 Press + Hold | Rewind Current Track |
| 5 | Pause / Resume the Current Track |
| 6 Press | Go to Next Track |
| 6 Press + Hold | Fast Forward Current Track |
Figure 89

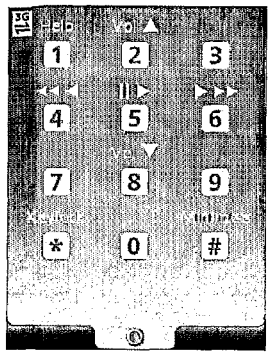
Figure 90
| Key | Function |
| --- | --- |
| 1<br>*Press* | Display the keypad help screen. |
Figure 91
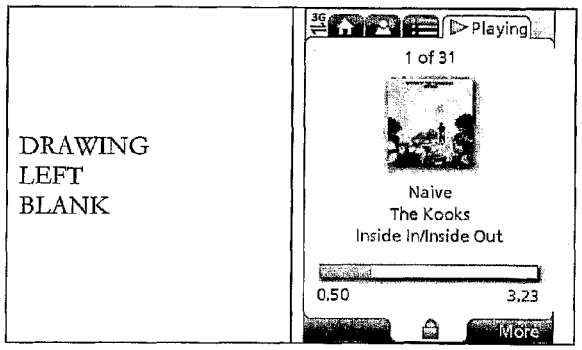
Figure 92
| Key | Function |
| --- | --- |
| *<br>*Press + Hold* | Lock / Unlock keypad |
Figure 93

DRAWING
LEFT
BLANK

| Key | Function |
|---|---|
| #<br>Press + Hold | Minimise MusicStation |

| | DRAWING<br>LEFT<br>BLANK | When the user selects Close from the More menu then if music is playing they will be asked whether they want |
|---|---|---|

: # METHOD OF ENABLING DIGITAL MUSIC CONTENT TO BE DOWNLOADED TO AND USED ON A PORTABLE WIRELESS COMPUTING DEVICE

CROSS-REFERENCE TO RELATED APPLICATIONS

This application is a continuation of U.S. application Ser. No. 12/299,505, filed May 20, 2009, which claims the priority of PCT/GB2007/001675, filed on May 8, 2007, which claims priority to GB 0608936, filed May 5, 2006, GB 0608935, filed May 5, 2006, GB 0608934, filed May 5, 2006, GB 0608933, filed May 5, 2006, GB 0608932, filed May 5, 2006, and GB 0702596, filed Feb. 9, 2007, the entire contents of which are hereby incorporated herein by reference.

BACKGROUND OF THE INVENTION

1. Field of the Invention

This invention relates to a method of enabling digital music content to be downloaded to and used on a portable wireless computing device. The term 'portable wireless computing device' used in this patent specification should be expansively construed to cover any kind of portable device with two way wireless communication capabilities and includes without limitation radio telephones, mobile telephones, smart phones, communicators, personal computers, computers and application specific devices. It includes devices able to communicate in any manner over any kind of network, such as GSM or UMTS, CDMA and WCDMA mobile radio, Bluetooth, IrDA etc.

2. Description of the Prior Art

The past few years have seen enormous changes in the way music is distributed and consumed. The traditional method, where the consumer buys a physical product in a shop and listens to it at home, has declined, and total worldwide revenue for the music industry has dropped from a little under $40 bn in 2000 to $31 bn in 2005. Meanwhile there has been an enormous upsurge in the distribution of digital music over the internet, initially in the form of illegal file sharing, but latterly more and more as paid for downloads. Portable digital audio players (DAPs), exemplified by the Apple iPod™, have had a dramatic effect on the global music marketplace. Just five years after the introduction of the first portable digital audio player, digital music sales global have already grown to well over $5 bn in 2005.

To reverse these trends, the music labels are now turning their attentions to pursuing the mobile market, where music is sold via mobile phones (or other kinds of portable wireless device) and distributed over the cellular wireless network. The potential value is already clear from the explosive growth of the ringtone market, and both the music labels and mobile network operators MNOs believe that mobile full-track music could provide more revenue, better security and improved pricing compared to digital music on a PC.

The mobile phone has some distinct advantages over the iPod and other DAPs. As well as playing music, mobile phones are connected to an increasingly fast, secure wireless network where users can locate and share music on the move and pay for content using the MNO's inbuilt and convenient billing facilities. Increasing innovation from the mobile handset manufacturers is helping to move the market forward.

There are still significant challenges ahead, however. The reliance on mobile internet technology WAP (Wireless Application Protocol) as the primary means of selling full music content is limiting. The technology is unfriendly, slow and cumbersome for users. Indeed, the world's largest mobile phone group, Vodafone Global, has avoided selling full music downloads on anything but top-of-the-range 3G phones because of the end-user difficulties associated with WAP. Many other operators have been forced to take a similar approach. This has limited the take-up of full music download services—only a small minority of mobile phone subscribers can use or have access to 3G. In the relatively mature 2005 UK market, less than half a million of Vodafone's 14.4 million customers have 3G—a market penetration of around 3%. Many other operators have no or only very limited 3G penetration.

MNOs are also concerned about the poor music play experience available, even on current top-of-the-range 3G handsets. Even when devices are marketed as top-of-the-range music phones they generally fail to deliver a user experience akin to a run-of-the-mill MP3 player.

Two alternatives to WAP based acquisition of full music content are currently favoured:
Streamed services, which offer users a personalised radio service streamed to their handset.
Music shop applications, running locally on a mobile telephone, and which offer users the ability to purchase music tracks and albums directly from the mobile telephone Streaming radio solutions are however a niche marketplace. The requirement for a constant data connection and the lack of full user control of what a user listens to means the consumer proposition and appeal is limited. Streaming solutions also suffer limited handset reach and a requirement for high speed (usually 3G) data connection. Operators implementing such services must also plan and invest for a significant network burden—all music tracks must be redownloaded every time they are played.

Music shop applications offer a more compelling user proposition but also suffer limited handset reach, with a focus on 3G and niche Symbian handsets. The user experience on such devices is also limited currently with competitor products offering only limiter pay per track services and with limited functionality that fails to approach the richness of a high quality DAP. This limited functionality, combined with relatively small music catalogues, has severely limited the appeal of these solutions to date.

SUMMARY OF THE PRESENT INVENTION

The present invention provides a mature, reliable and convenient solution which will enable users to easily acquire, listen to and manage music on portable wireless computing devices.

An implementation is called MusicStation™. MusicStation provides a method of enabling digital music content to be downloaded to and used on a portable wireless computing device, the method comprising the steps of:
(a) a software application running on the wireless device, the application having been automatically adapted to parameters associated with the wireless device without end-user input;
(b) the application enabling an end-user to browse and search music content on a remote server using a wireless network; to download music content from that remote server using the wireless network and to playback and manage that downloaded music content;
(c) the application including a digital rights management system that enables unlimited legal downloads of different music tracks to the device and also enables any of those tracks stored on the device to be played so long as a subscription service has not terminated.

This invention has the promise of being genuinely transformative of the way people acquire and listen to digital music. It brings together, for the first time, a number of technologies which operate synergistically to provide a total solution that is significantly greater than the sum of its parts. For example, because the application can be automatically adapted to parameters associated with the wireless computing device without end-user input, it becomes feasible to automatically provision very large numbers of portable wireless devices with the application (either prior to sale, or to allow users to download and install the application—e.g. by simply giving a remote server the correct portable wireless device make and model number). The installed base of mobile telephones, for example, could therefore readily run into the tens, if not hundreds of millions—far larger than any DAP. The application also enables an end-user to browse and search music content on a remote server using a wireless network; to download music content from that remote server using the wireless network and to playback and manage that downloaded music content: hence, not only will the installed base greatly exceed any DAP solution, the functionality will be better than any DAP because it will be possible to search and acquire new music directly from the device over the wireless network (this is a far more natural process than acquiring music via a web based on-line catalogue using a desktop machine and then synching a DAP with the desktop machine). Finally, the application includes a digital rights management system that enables unlimited legal downloads of different music tracks to the device and also enables any of those tracks stored on the device to be played so long as a subscription service has not terminated. This allows users to explore new music far more effectively than before and, with rapidly decreasing memory costs, to store thousands of music tracks on even mid-range devices. Music companies will be willing to make entire catalogues of music available because of the robust DRM model, the huge installed user base and the ease of exploring and acquiring new music. This creates a positive feedback, with more and better content attracting more users, in turn attracting more content.

MusicStation has a number of key advantages over its competitors:
  A comprehensive and intuitive user experience that wraps all music functions;
  Compatibility with a wider range of handsets than any competitor, as a result of the Device Adaptive Architecture (DAA—see below for more details), which ensures the software application runs on almost all music-capable handsets (irrespective of model or manufacturer) and looks and operates in a practically identical fashion on all of them.
MusicStation maximises the benefits of the mobile phone. Unlike DAPs, where music can only be acquired in the home, MusicStation users can discover and acquire new music anywhere;
  MusicStation does not need a PC, broadband, iTunes or a credit card to work.
  MusicStation supports innovative new models like AYCE (all-you-can-eat—i.e. unlimited downloads) and user community features such as making friends and sharing playlists.

The MusicStation Product

MusicStation is designed to be the key enabling technology that will enable the mass-adoption of the mobile phone as the successor to the unconnected Digital Audio Player (DAP). To ensure success, the design and development team have focused on the following key requirements in order to deliver a next generation mass-market music product:

A User Experience that Beats the Best DAP

The traditional native player on mobile phones has been second rate when compared to the best DAPs. MusicStation provides an interface that is as complete as any market-leading DAP but which is also optimised for the benefits of a connected device.

Maximising the Benefits of Connectivity

The mobile phone is an "Almost Always Connected" (AAC) device, so a handset-based music product can enable music purchasing directly when on the move, not just when it is physically attached to an internet-connected PC.

Ensuring No Reliance on a PC

An integrated handset product should not require the user to own a broadband-connected PC at all. This is particularly key in developing markets where mobile phone users do not generally have access to such technology, nor indeed a credit card. Where users do have access to a PC they should be able to access music and playlists whether they are at their desk or on on-the-move—but there should be no reliance on personal computer, broadband or credit card technology.

Enabling Direct Billing

A mobile music application should be able to leverage on the billing relationship between the consumer and the MNO. By providing a much more convenient one-touch billing method for content purchase—irrespective of location—music sales can be truly maximised, especially compared with an at-desk, web-based credit card application, with a cumbersome registration process which also requires a difficult synchronisation requirement with the portable device.

Enabling Wire-free Listening

An on-handset music application must be able to use the Bluetooth functionality available in many mobile handsets to allow music to be played and shared with other Bluetooth enabled devices such as wireless headphones, in-car stereos and hi-fi systems.

Taking Advantage of 24×7 Availability

The mobile phone is the electronic device most likely to be present with a user 24/7, giving a far wider opportunity for consumer interaction, be that listening, purchasing or the managing of music. It is therefore important that a music application is designed to be attractive and easy to use, even to subscribers who stumble across it accidentally whilst exploring handset functionality for the first time.

Giving Users Community Features

As an Almost Always Connected (AAC) device, the mobile phone can deliver community interaction features on-the move, the key to enabling improved consumer music discovery through shared playlists and playlist charts generated by users. This is a key advantage over the unconnected DAP.

Making the most of a Fortuitous Handset Roadmap

The vast majority of handsets will be music capable by Q1 2007—even if they are not actively promoted or branded as a music phone by the MNO or manufacturer. To maximise revenue potential, any music application should be available for every music-capable handset, be it 2.5G or 3G, whatever the manufacturer, enabling MNOs to consider full download music as a mass market opportunity for the first time.

MusicStation has been designed around these key requirements. The end result genuinely able to turn the vast majority of music-capable handsets into "Super-DAPs". Critically, MusicStation gives all the performance and user experience quality of a DAP (in terms of music playing and management), whilst also offering all the browse, search, acquire, playlist and celebrity playlist features of leading PC based on-line music stores. On top it offers music users tribal community features, which can improve their music discovery process—and personalised news and views (neither of which are available on any DAP).

Other key features include:
A single user intuitive interface which wraps all music play/playlist management/content acquisition/news/community functionality;
Availability of all functions available during music playback (news acquisition, searching/browsing, etc);
Intelligent Parallel Downloading technology, allowing for intelligent caching of favourite content;
Inbuilt network awareness (Features and interface intelligently adapt depending on level of network connectivity available—3G/2.5G/0G);
Direct billing integration (enabling extremely convenient one-touch billing without the requirement for a credit card or account)—billing infrastructure for the subscription service is part of the billing infrastructure provided by a network operator that controls the wireless network;
Industry standard music file protection by DRM. The DRM also enables the purchase of a music track such that the track can still be played if the subscription service is terminated.

Being a connected application, unlike DAPs, MusicStation is able to offer an All-You-Can-Eat (AYCE) weekly or daily subscription package directly from the handset for the first time. There is much evidence that the average music revenue per AYCE subscriber is substantially higher than that from a traditional PPT (pay per track) user. To date most AYCE implementations have been desktop-based subscriptions rather than being sold on a connected mobile device.

Device Adaptive Architecture (DAA)

One of the biggest problems for mobile applications to date has been the difficulty of porting applications onto new handsets and delivering applications that work across multiple handset manufacturers and models. Resolving this challenge is one of the most important technical difficulties that MusicStation addresses. Device Adaptive Architecture (DAA) is the solution.

In essence, DAA enables MusicStation to be deployed on more mobile phones than any competitor. It is also enables MusicStation to ported to new handsets in hours rather than weeks or months—with the creation of a manufacturer and handset model specific version of the application in each case.

Until DAA, all mobile applications—be they music-specific or more generalised—suffered limited handset reach. Typical obstructions included:
Manufacturer variations in handset design/memory capabilities;
OS and firmware release and related bugs;
Screen size, pixel number, colour depth, keypad control and softkey variations;
Physical size;
Media file and format support (e.g. audio, picture, video, animation);
Java version and platform implementation differentials;
Handset-specific security models;
Connection handling and capabilities;
Failure to adhere to published specifications;
Computing horsepower and other computational resources.
Memory
Network capabilities and handling of the device, including one or more of CSD, GPRS, 2G, 2.5G, 3G, WAP, SMS, Bluetooth, Infrared, Wi-Fi, WiMAX.

In essence, features vary wildly by handset and by manufacture rand also network operator—and many handsets may suffer bugs in their implementation. Device Adaptive Architecture (DAA) resolves these issues and enables the product to be ported automatically to the vast majority of all music-capable 2.5G and 3G handsets in record time. DAA captures parameters associated with these various features and allows an application to be automatically custom built for a specific handset/network operator combination without end-user input. Further details on DAA may be found in WO 2006/061595, the contents of which are incorporated by reference.

It is also critically important to note that MusicStation's reference platform is Java. A few competitive products have been built on the easy-to-address Symbian platform. Whilst it is relatively easy to build applications for this platform, it does not offer the opportunity for a mass-market music proposition. Less than 10% of handsets globally have Symbian on board and many of those are business-focused handsets. Java is the most widely adopted mobile platform and critical to handset reach. It is available on almost all medium and high end handsets. The combination of Java and DAA technology means MusicStation can be delivered to more consumers than any other technology—and critically act, look and feel almost identical irrespective of manufacturer or model. MusicStation will be available in Java, Symbian, Windows Mobile, Linux and BREW.

Other features include the following:
the application present a graphical user interface in which shows multiple user-selectable tabs, each tab being associated with a core function of the application.
  each tab is visible at any time the application is running
  one tab is associated with a home function that provides access to all available content and to a search function
  one tab, if selected, gives details of the track that is currently playing
  one tab, if selected, provides access to community and news features.
  one tab, if selected, displays the current queue of tracks for listening and/or downloading.
the application present a graphical user interface in which multiple screens show a 'more' menu item that is context sensitive and, if selected, provides access to further functions relevant to a currently selected item and/or the currently displayed screen.
the application is controlled using a multi-tasking context sensitive joystick; the specific function of the joystick is shown by an on-screen icon above it. The operation of the joystick is replicated by numeric keys in the keypad, e.g. the numeric key 5 is up; 0 is down; 7 is left and 9 is right.
the application provides a context appropriate acquire function in which a function equivalent to 'Get New Artist' is at the same level in the menu as 'Artist'. A function equivalent to Get New Track is on the same level in the menu as the menu listing of tracks for an artist.
the application enables one device to act as a master playback device such that other wirelessly connected portable wireless devices playback the same music track, in time synchronisation. The wireless connection can be a short range wireless connection, such as Bluetooth.
the application provides a dedicated 'play' numeric key which always toggles back to the play screen, which shows the track currently being played.
the application provides variable timeouts, with different screens have different timeouts—e.g. a search screen never snaps back but a news screen snaps back after 20 seconds, compared with a standard navigation screen, that might snap back after 7 seconds.

the application displays targeted news filtered according to the end-user's playback habits.

the application tracks, and feeds back to a remote server, detailed end-user listening data. The data includes how long tracks have been listened to, what tracks are skipped through and when. The data can be locally cached on the device and then sent back to the server as a piggyback over a communication that happens anyway. The device will pre-emptively send the data back without waiting for the communication expected to happen anyway, only if the user has not downloaded for more than a set time. This data can be used to enrich a music suggestion engine that provides music track suggestions for display on the device.

the application displays shared playlists.

the application displays playlist charts generated by users all functions of the application are available during music playback the functions available during playback include news acquisition, as well as music track search, browse, and acquire.

Another aspect is a portable wireless computing device that enables digital music content to be downloaded and used, the device including:

(a) a software application running on the wireless device, the application having been automatically adapted to parameters associated with the wireless device without end-user input; and in which:

(b) the application enables an end-user to browse and search music content on a remote server using a wireless network; to download music content from that remote server using the wireless network and to playback and manage that downloaded music content; and (c) the application including a digital rights management system that enables unlimited legal downloads of different music tracks to the device and also enables any of those tracks stored on the device to be played so long as a subscription service has not terminated.

A third aspect is a software application that enables digital music content to be downloaded and used on a portable wireless computing device;

(a) the application running on the wireless device, the application having been automatically adapted to parameters associated with the wireless device without end-user input; and in which:

(b) the application enables an end-user to browse and search music content on a remote server using a wireless network; to download music content from that remote server using the wireless network and to playback and manage that downloaded music content; and (c) the application including a digital rights management system that enables unlimited legal downloads of different music tracks to the device and also enables any of those tracks stored on the device to be played so long as a subscription service has not terminated.

A final aspect is a music track that has been downloaded using the software application defined by the third aspect.

DEFINITIONS

Mobile Telephone: A type of telephone which is connected to the telephone network via wireless technology through the air rather than through a physical wire or other physical connection or form of cable.

Mobile Phone, Phone, Mobile, Mobile Handset or Handset: A type of Mobile Telephone.

Mobile Network: A network which provides wireless connectivity for Mobile Telephones so that they can operate and provide functions such as making telephone calls or accessing network-resident data or services.

Mobile Network Operator (MNO): A company or organisation which operates a Mobile Network and the subscribers or users who use Mobile Telephones on that network.

Global Mobile Network or Mobile Phone Network: The sum of all Mobile Networks operated by Mobile Network Operators in the world.

Wireless Network: A network which provides wireless connectivity to client computing devices. Such a network includes Wi-Fi, WiMAX and the Global Mobile Network.

Server: A networked computing device which exists to provide networked application services, features and functions such as information supply, database search and transactions to one or more client computing devices which make connection to it and make requests for services from it. There are generally many clients to each server and each client is usually of a smaller size and of smaller computing capability than the server.

Services: The networked computing services, features and functions which are typically provided by a Server to one or more network connected client computing devices. Services include information supply, database search and transactions. Such services are architecturally practical to deploy centrally in the network and typically impractical to deploy on a client computer due to the client's size and power.

Client: A computing device connected to a network delivering the features and functions of a network-centric application to the user or consumer of the application. The Client typically connects to a Server and requests Services.

Network Application: A type of application or service that is network-centric, in that it is delivered by a combination of software running on a Client performing the function of the application's interface to the end user or consumer, supported and complemented by Services provided by software on a Server which are accessed by the Client over a network.

Wireless Computing Device: A type of Client which connects to the network via a Wireless Network Such devices include Mobile Telephones, Personal Digital Assistants (PDAs), Games Consoles (e.g. Sony PSP) or other wirelessly network connected client computing devices. The type of the Wireless Computing Device is further defined by it's Manufacturer, Make, Version, Operating System, Firmware Version.

Wireless Device or Wireless Client: A type of Wireless Computing Device.

Software Application: The Client software application which is to be delivered over-the-air to, or pre-installed on, the Wireless Computing Device.

Software Components Individual units of software which form the components of the Software Application which is being customised for the Wireless Computer Device and part of the Device Adaptive Architecture (DAA) software library.

Mobile Content Digital files and data representing electronic products used by, consumed, played, viewed or rendered on Mobile Phones. Examples include ringtones/ring tunes, wallpapers/pictures, screensavers/animations, realtones/truetones, full music downloads, video, SMS & MMS alerts, mobile games, and many other current and emerging Mobile Phone consumable entertainment and information products.

Metadata: Individual items of data or collections of data, potentially hierarchically related, which describe the attributes or behaviour of Wireless Computing Devices, Wireless Networks, Software Components, Network Applications or Mobile Content.

BRIEF DESCRIPTION OF THE DRAWINGS

FIG. 5 is Binary heap stored in an array.
FIG. 6 is State diagram for a Task.
FIG. 7 is cache upper and lower limits for each type of data objects.
FIG. 10 is Screen Captures—Get new . . . option.
FIG. 11 is Personalised Menu Item and Recommendations Contained.
FIG. 12 is Screen capture—rating an item.
FIG. 13 is Screen capture—News.
FIG. 14 is Screen capture—Buzz member recommendations.
FIG. 15 is Personalised Menu Item and Recommendations Contained for Cool Members and Buzz Playlists.
FIG. 16 is a matrix of correlations between tracks.
FIG. 17 is a Weightings Matrix.
FIG. 18 is a set of normalized weightings lying between 0 and 1.
FIG. 19 is an Associated Artists Matrix, which is a matrix of correlations representing how strongly associated pairs of Artists are in the system, based on ratings, and customer plays.
FIG. 20 is an Associated Customers Matrix, which is a matrix of correlations representing how strongly associated pairs of Customers are in the system, based on ratings, and customer plays.
FIG. 21 is part of a Table of Associations Matrix property, Inputs to Recommendation and Results Mechanism.
FIG. 22 is part of a Table of Associations Matrix property, Inputs to Recommendation and Results Mechanism.
FIG. 23 is part of a Table of Associations Matrix property, Inputs to Recommendation and Results Mechanism.
FIG. 24 is part of a Table of Associations Matrix property, Inputs to Recommendation and Results Mechanism.
FIG. 25 is part of a Table of Associations Matrix property, Inputs to Recommendation and Results Mechanism.
FIG. 26 is Calculating the implicit rating value.
FIG. 36 is Screen capture—Roaming options.
FIG. 37 is configurations of the Roaming behaviour for MusicStation.
FIG. 41 is Screen capture—Roaming Options set to On.
FIG. 43 is shows the title, content and result of the responses.
FIG. 46 is details of [major].[minor].[micro], Variant name and Platform identifier.
FIG. 47 is details of error data.
FIG. 48 is an example of the client sending error data to the server.
FIG. 49 is an example of the client sending error data and a photo to the server.
FIG. 50 is an example of the server sending a Jpeg photo with a single parameter.
FIG. 51 is status codes.
FIG. 52 shows the server sending the news1.data file.
FIG. 53 shows the server sending the news2.data and news3.data files.
FIG. 54 is the server response which indicates which range of data has been sent
FIG. 55 is the server sending a Sent line that the client had not sent a corresponding Get line in the request.
FIG. 63 is object change log.
FIG. 64 is customer object.
FIG. 65 is customer object change log.
FIG. 66 is a ChangeLogRecord object.
FIG. 67 is an object_change_log table.
FIG. 68 is a customer object_change_log table.
FIG. 69 is a Logger which contains a LogRecord for each client log.
FIG. 70 is the customer_logger table.
FIG. 72 is Service Registration Request Parameters.
FIG. 73 is MNO Added Metadata.
FIG. 74 is Service Registration Response Parameters.
FIG. 75 is MusiStation RI Registration Request Parameters.
FIG. 76 is RI Registration Response Parameters.
FIG. 77 is MusicStation RO Acquisition Request Parameters.
FIG. 78 is MusicStation RO Acquisition Response Parameters.
FIG. 79 is Content Acquisition Request Parameters.
FIGS. 80-164 are screen shots of the MusicStation implementation.

DETAILED DESCRIPTION

Architecture

1.1. Multi-Threading

A key aspect of the player is that it performs multiple threads simultaneously. There are 3 main threads:
User Interface (UI) thread
Animation thread
Scheduler thread There is also an HTTP connection thread which actually downloads data and loads it into a buffer while the Scheduler thread reads from this so as not to be blocked by the connection.

Typically the UI thread will respond immediately to the user navigating to a new screen by displaying that screen and scheduling a task to load the data behind the screen, either from the local file system or remotely over an HTTP connection.

The load task is added to the task queue. The queue is ordered by task priority, task type and scheduled execution time. Most tasks are scheduled for immediate execution, in which case the execution time is set to the time the task was added to the queue. Some tasks are scheduled with a small delay; for example playing a track is scheduled with a one second delay to allow quickly skipping through the tracks on a playlist.

When a new task is added to the task queue we compare its priority to the currently executing task (if there is one). If its priority is higher then the current task, we attempt to cancel the current task. Only tasks that take an excessive time to complete can be cancelled. This is to avoid tasks hogging the execution thread whist other higher priority tasks are waiting. An excessive amount of time is longer than a few seconds. The cancelled task is then rescheduled. The execution time is set to the time the task was originally added to the queue.

1.1.1. Scheduler

The Scheduler is a facility for threads to schedule tasks for immediate or future execution in a background thread. Tasks may be scheduled for one-time execution, or for repeated execution at regular intervals.

The Scheduler object has a single background thread that is used to execute all of the scheduler's tasks sequentially. If a scheduler task takes excessive time to complete, it "hogs" the timer's task execution thread. This can, in turn, delay the execution of subsequent tasks, which may "bunch up". Any task that may take longer than a few seconds to execute must implement interrupt( ).

The interrupt( ) method is called when a task with a higher priority is added to the task queue and will be called on the currently executing task by the thread adding the task. The run( ) method called by the scheduler thread must throw an InterruptedException at the earliest opportunity. The Scheduler will catch this exception and then reschedule the interrupted task for execution based on its priority and the time it was originally added to the queue. The newly added task is then picked up and executed.

Figure 1:
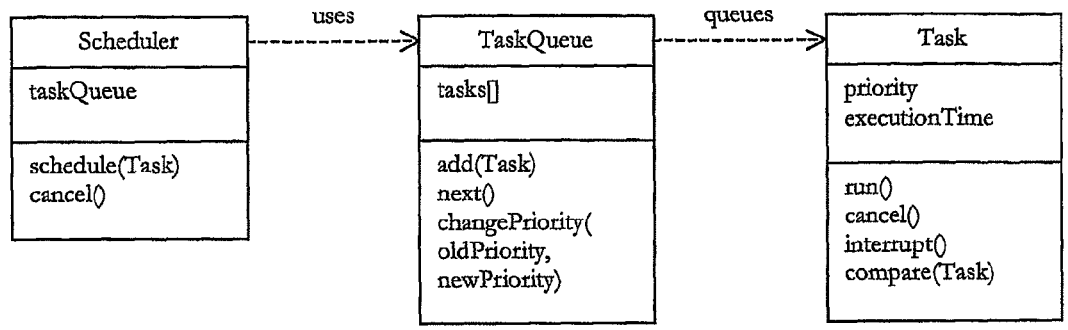
FIG. 1 is a Scheduler class diagram.
Figure 2:
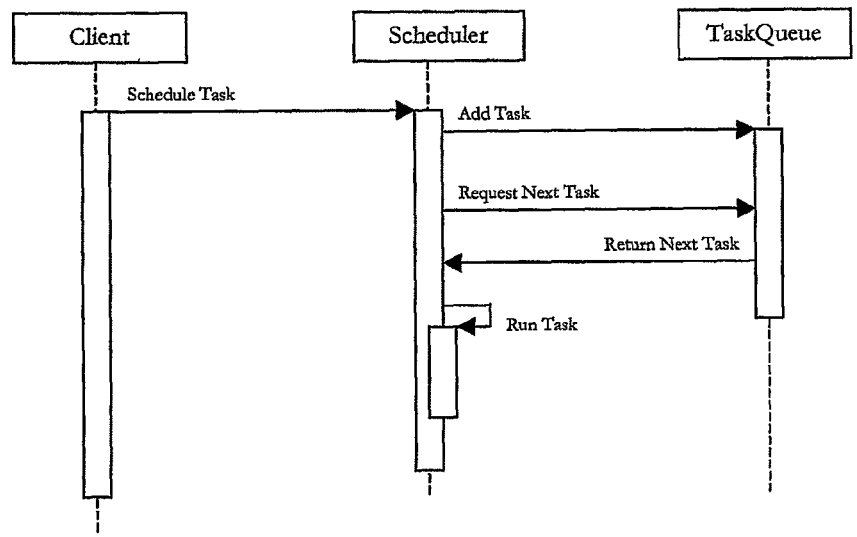
FIG. 2 is Client Schedules a task.

This class is thread-safe: multiple threads can share a single Scheduler object without the need for external synchronization. See FIG. 1: Scheduler class diagram and FIG. 2: Client Schedules a task

1.1.1.1. TaskQueue

This class represents a scheduler's task queue: a priority queue of Tasks, ordered on priority; taskType and executionTime.

The task priorities are based on the CLDC Thread priorities. As such there are 3 priorities defined:

MAX_PRIORITY is the maximum priority that a task can have.
NORM_PRIORITY is the default priority that is assigned to a task
MIN_PRIORITY is the minimum priority that a task can have.

Tasks with the same priority are further subdivided by taskType. For example, this allows us schedule the data for a screen before the images. This could be achieved by using different priorities however it is likely we'll want to lower the priority of a task (e.g. the user navigates to a different screen) without changing the type. By separating the concepts of priority and taskType the design is more flexible and I think easier to understand. Initially the 3 types ordered by importance are:

DATA is used for tasks that request object data files.
AUDIO is used for tasks that request audio files.
IMAGE is used for tasks that request image files.

Figure 3:
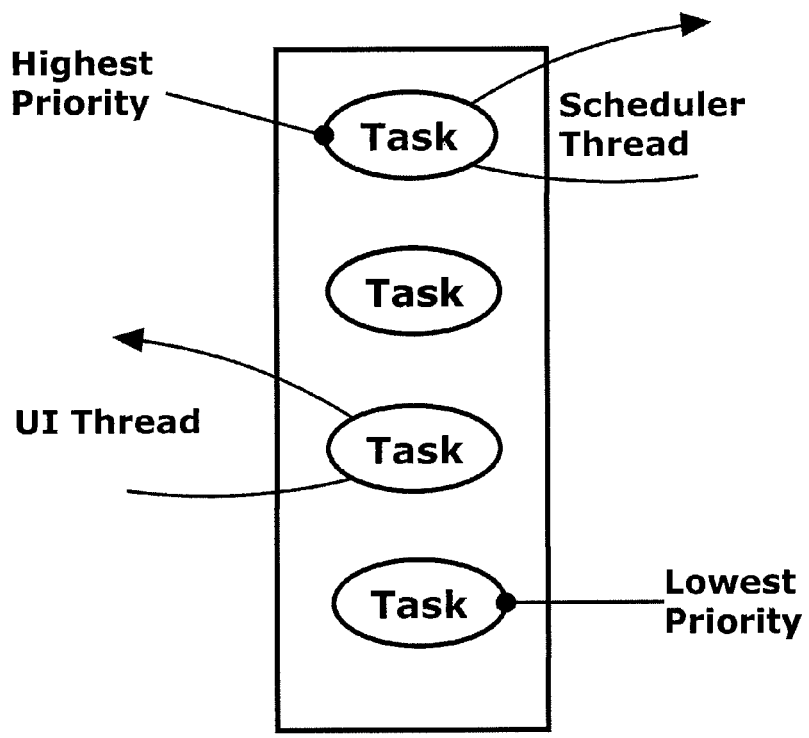
FIG. 3 is UI thread adds a task to the queue.

The executionTime ensures that tasks with the same priority and taskType are executed in the order that they are added to the queue. See FIG. 3: UI thread adds a task to the queue.

Figure 4:
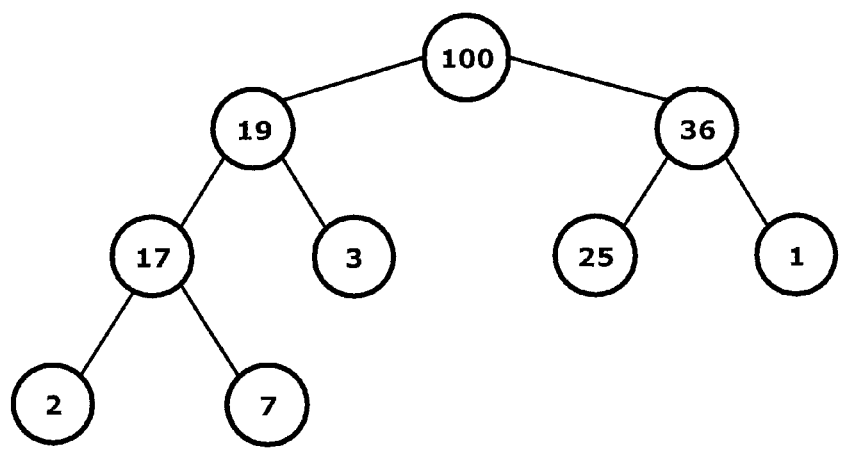
FIG. 4 is an example of a binary heap.

Internally the queue is stored as a binary heap so the cost to schedule a task is log n, where n is the number of concurrently scheduled tasks. A large number (thousands) of scheduled tasks should present no problem. There is no cost for retrieving the next scheduled task, which is always at the root. See FIG. 4: An example of a binary heap.

We always add an element to the bottom of the heap and then call the fixUp( ) method to find its place in the heap. The fixUp( ) method compares the added element with its parent and swaps them if they are not in the correct order.

An array is used to store the heap and because the heap is always complete (there are never any gaps in the tree) it can be stored compactly. No space is required for pointers; instead, for each index i, element a[i] is the parent of two children a[2i+1] and a[2i+2]. See FIG. 5. Binary heap stored in an array.

1.1.1.2. Task

A task can be scheduled for one-time or repeated execution. A task can be in one of 3 states:

SCHEDULED: This task is scheduled for execution. If it is a non-repeating task, it has not yet been executed.
EXECUTED: This non-repeating task has already executed (or is currently executing) and has not been cancelled.
CANCELLED: This task has been cancelled (with a call to Task.cancel).

See FIG. 6: State diagram for a Task

The MusicStation client uses a single Scheduler to schedule all file connections, either from the local file system or remotely over an HTTP connection. The scheduler uses a single thread so all file connections are handled serially. A Task must ensure that it only has an open connection when it is in the executed state. As only one task is ever in the executed state we can guarantee that we only ever have one connection open. Also, any task that supports the interrupt( ) method must be able to resume without storing any state information about the file it was writing to. This is important because another task may have modified the file since the task was interrupted.

1.1.2. Use Cases

1.1.2.1. User opens Playlists

The user opens the application and immediately opens the Playlists menu. The Playlists menu display the "My Playlists" PlaylistSet filtered using the two filters "My Private Playlists" and "My Public Playlists".

When the screen is displayed a LoadTask is added to the TaskQueue to load "My Playlists". The LoadTask.taskType is DATA and the LoadTask.priority is MAX_PRIORITY.

When the LoadTask is added to the TaskQueue, the scheduler thread, which is waiting on the queue, is notified. It takes the task from the queue and executes it by calling the Taskrun( ) method. The task checks to see if the "My Playlists" object data file exists on the file system. In this case it doesn't so an HttpConnection is opened and the file is read over the stream. The file is read into a buffer (65 k) and each time the buffer is filled it is written to the memory card and used to populate part or all of the data object (note very few data files will be larger than the buffer).

As the PlaylistSet data object is populated with Playlists, these Playlists contain image references. As each image reference is read, an ImageLoadTask is created and added to the TaskQueue. The ImageLoadTask.taskType is IMAGE and the ImageLoadTask.priority is MAX_PRIORITY.

Once "My Playlists" has finished loading, the scheduler takes the first ImageLoadTask from the queue. Because the image doesn't exist on the local file system it is loaded over HTTP. This continues until all images have been loaded.

1.1.2.2. User Opens Playlists and Immediately Selects New Playlists

The user opens the application and then opens the Playlists menu. Before "My Playlists" have loaded the user selects "Get New Playlists".

As above a LoadTask is immediately added to the TaskQueue to load "My Playlists" when the user opens Playlists. The LoadTask.taskType is DATA and the LoadTask.priority is MAX_PRIORITY.

Before the LoadTask has finished the user selects "Get New Playlists". This immediately calls TaskQueue.changePriority( ) to downgrade all MAX_PRIORITY tasks to NORM_PRIORITY because we are changing screens. Any outstanding tasks for the last screen need to have a lower priority than tasks for the new screen.

A LoadTask is then added to the TaskQueue to load "New Playlists". The LoadTask.taskType is DATA and the LoadTask.priority is MAX_PRIORITY. Adding the new task causes interrupt( ) to be called on the "My Playlists" LoadTask. As data objects are typically small (less than 4 k) interrupts are ignored. However because the "My Playlists" LoadTask has had its priority lowered to NORM_PRIORITY any ImageLoadTasks it creates are also created with NORM_PRIORITY.

Once the "MyPlaylists" LoadTask has finished loading, the scheduler takes the "New Playlists" LoadTask from the queue and executes it. Once "New Playlists" has loaded the images for the "MyPlaylists" screen load in the background.

1.1.2.3. User Starts Playlist

The user selects a Playlist from "My Playlists" and chooses the Play option.

All of the Tracks in the Playlist are added to the play queue. A StartTask is added to the TaskQueue for the first track. The StartTask.taskType is AUDIO and the StartTask.priority is MAX_PRIORITY. We then add a FetchTask to the TaskQueue for each Track. The FetchTask.taskType is AUDIO and the FetchTask.priority is MIN_PRIORITY. Note, a FetchTask is added for each Track including the first track. This is because the StartTask could be cancelled by the user selecting Next before the task has finished. A FetchTask will first check to see if a file exists and has been fully downloaded before making an HttpConnection.

When the StartTask has finished (and the track begins to play) a PrefetchTask is added for the second track. The PrefetchTask.taskType is AUDIO and the PrefetchTask.priority is MAX_PRIORITY. Depending on the connection rate the second track should have prefetched before the first track finished. In which case the first and second FetchTasks are discarded (the files already exist) and the third tracks FetchTask begins to load.

1.1.2.4. User Starts Playlist and Opens Inbox

The user selects a Playlist from "My Playlists" and chooses the Play option. Halfway through downloading the first track the user opens the Inbox tab.

As above, a StartTask is added for the first track and FetchTasks added for each track. When the user opens the Inbox a LoadTask is created for the ""Inbox" StorySet. The LoadTask.taskType is DATA and the LoadTask.priority is MAX_PRIORITY.

The priority of the StartTask is changed from MAX_PRIORITY to NORM_PRIORITY and the "Inbox" LoadTask is added to the TaskQueue. The interrupt( ) method is called on the StartTask which causes the StartTask.run( ) method to throw an InterruptedException the next time read( ) returns (when the 65 k buffer is filled). The scheduler catches the InterruptedException and the StartTask is rescheduled to run after the "Inbox" LoadTask.

The "Inbox" LoadTask is executed and it creates ImageLoadTasks for each story. These are created with MAX_PRIORITY and will all be executed before the StartTask is resumed.

Once the images are loaded the StartTask resumes by first checking if the file exists and how much has already been read. The task will then request the remainder of the audio file. Once the file has been downloaded the track will play and a PrefetchTask will be added for the next track 1.1.3. Background Downloading
1.1.4. Dynamic Playlist Management
1.2. Intelligent Memory Management MusicStation intelligently manages the memory available on each handset and/or memory card.

Before downloading an object MusicStation will ensure that there is enough memory available for the object.

If there is not enough room, MusicStation will perform a series of checks before deleting an object.

MusicStation will delete the object with the oldest last modified date, ensuring that the objects that are deleted are those files that are not in heavy use or not in use at all.

1.2.1. Downloadable Objects

There are three types of downloadable objects within MusicStation. These include:

Data—any data that needs to be updated such as menu items, charts, text within news articles etc.

Image—any images within MusicStation. These include the images on the Artist and Album profiles and the images associated with a news article.

Audio—the audio files.

Caches

Using the Max memory card use option on the Options menu a user can define the maximum percentage of the memory card that MusicStation will use for storage. This setting determines the allocated memory for MusicStation. The allocated memory is then divided into caches for each type of data object.

A cache exists for each of the downloadable objects. Each cache has an upper and lower limit:

An upper limit is the maximum amount of memory a cache can utilise. It exists to ensure that a user does not exceed the allocated memory.

A lower limit is the minimum amount of memory a cache can utilise. A lower limit exists to ensure that memory is consistently distributed between the different data objects.

The upper and lower limits are defined as a percentage of the allocated memory. The cache upper and lower limits for each type of data objects have been defined as shown in FIG. 7.

1.2.2. Downloading Objects

Before an object is downloaded, MusicStation will run a series of checks to ensure that by the downloading the file that the lower and upper limits are not breached. MusicStation maintains a list of each type of object, which is sorted in order of last use. The object that was most recently used is at the top of the list and the object with the oldest last used date will be at the very bottom of the list.

If downloading of an object exceeds the upper limit of that object's cache, the following process will occur:
DELETE_WITHOUT_CHECK—MusicStation will delete the data object, of the same type, that has the oldest "last used" date.

If there is no available memory to download the object, the following process will occur:
DELETE_WITH_CHECK—
DELETE_WITH_CHECK will locate the data object, of the same type, that has the oldest "last used" date and attempt to delete this object. The delete will proceed if it does not take the cache under the lower limit.
If the delete takes the cache under the lower limit, DELETE_WITH_CHECK will locate the audio object with the oldest last "last used" date and delete the audio object.
If DELETE_WITH_CHECK cannot delete an audio object, it will proceed with step 1. Locate the data object, of the same type, that has the oldest last "last used" date and delete this object.

1.3. Device Specific Media Delivery

Each piece of content is "tagged" with the container, format, bitrate and sample rate (e.g. m4a, acc+, 48 kbps, 44.1 kHz). The playback of content is tested on the device using a piece of base content (pink noise) encoded in all variants of container, format, bitrate, sample rate and mime type. The results of these tests are sent via the test client back to the server and stored. Each container, format, bitrate, sample rate and mime type has a preference when compared to the others stored on the server. When the client then makes a request for an additional piece of content the server returns either: A list of links to that piece content encoded in the variations of container, format, bitrate, sample rate and mime type that played back. This is done by matching the "tags" on the content that played back to the available "tags" on the additional piece of content. This list is ordered by preference. A link to that piece of content encoded in the top encoding preference. A audio playback quality test is performed on this auto-selected item to confirm that it is of acceptable quality. If it is not then the second preference would be examined, and so on down the list. The audio quality test makes use of audio software to analyse the output of the phone's headphone socket.

2. User Experience Features 2.1. Client Exception Handling

The MusicStation client is regularly downloading and updating files in the background whilst the customer is using the application. When an error occurs we may want to retry, inform the user or do nothing depending on the task that is being performed and the error that was thrown. This document describes how we will decide what action to take when an error occurs.

2.1.1. Exception Listener

There are 3 main threads that control the MusicStation client. The UI Thread handles all key presses, the Paint Thread handles all screen redraws and the Task Thread handles loading data. Exceptions can be thrown in any of these threads but they are always passed to the ExceptionListener exceptionThrown( ) method.

The ExceptionListener then decides how to handle the exception based on:
The Exception that was thrown
The Event that caused the Exception
The priority of the Event
The super class of the Exception These parameters are used to lookup the ExceptionConfig for this exception. The ExceptionConfig contains all of the information needed to decide how to handle the exception.

2.1.2. Exception Config

The ExceptionConfig is used to decide whether to automatically retry the event that caused the exception or whether to show an error message to the user.

Figure 8:
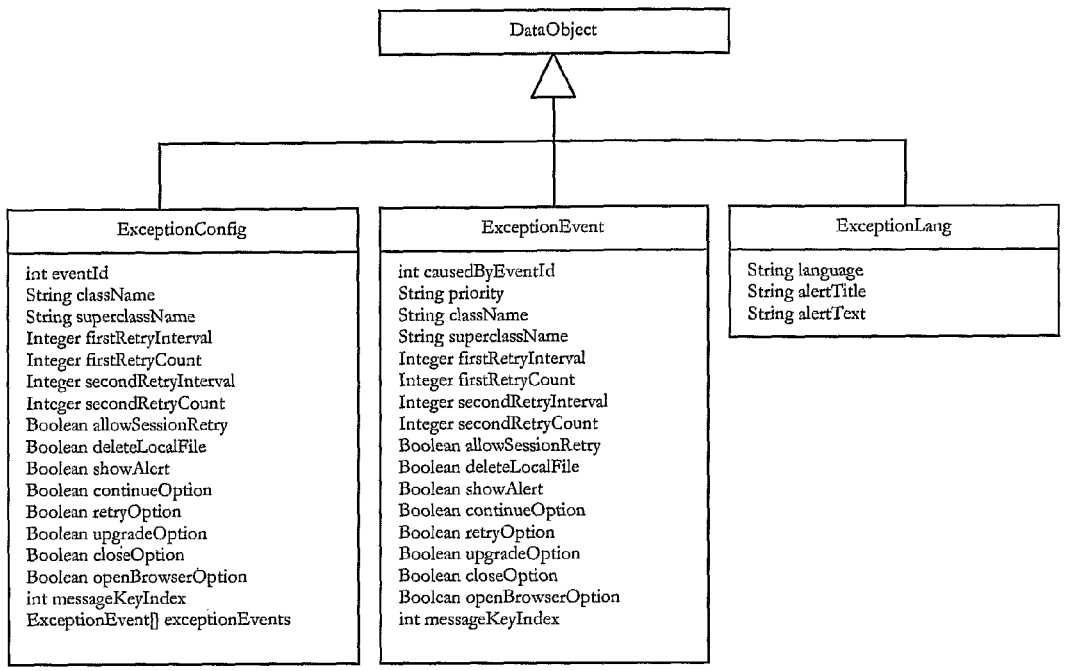
FIG. 8 is Data objects used to configure exceptions.

The following objects are used to configure exceptions:
ExceptionConfig: Contains the default behaviour for this exception
ExceptionEvent: Overrides the default behaviour for a specific Event and priority
ExceptionLang: Contains the error messages in each language supported by the device See FIG. 8 Data objects used to configure exceptions.

Only exceptions that occur in the Task thread cause a retry. The following attributes are used to decide whether and how to retry the Task
firstRetryInterval: We may want to initially retry the request quickly
firstRetryCount: The number of times to retry or 0 to not retry
secondRetryInterval: We may then want to back off and leave a longer period between retries
secondRetryCount: The number of times to retry or 0 to not retry
allowSessionRetry: If there is a server error or the file was not found we may want to disallow the same request to the server for this session.
deleteLocalFile: If the file is corrupted we may want to delete the local file and retry loading the file from the server.

Any exception can display an error message to the user. The following attributes are used to decide whether and what to display to the user.
showAlert: If true, displays an error message to the user with one or more options
continueOption: Goes back to the last screen
retryOption: Retries the Task
upgradeOption: Installs a new version of the application
closeOption: Closes the application
openBrowserOption: Retries the request in the mobile's WAP browser
exceptionLangs: The error message in each supported language For any exception, these values can be overridden for a particular event or we can fall back to the values defined for the exception's superclass.

2.1.3. Device Specific Exceptions

Some devices do not throw the expected exceptions. For example the Nokia N70 throws an IOException with message "−34" when the server does not respond rather than the more specific ConnectionNotFoundException. The DeviceExceptionConfig object allows us to specify mappings between device specific exceptions and the expected exceptions.

Figure 9:
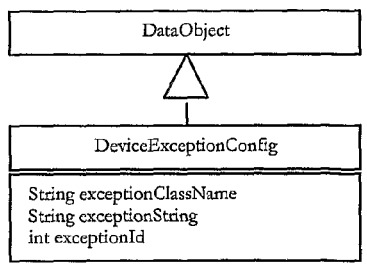
FIG. 9 is Device specific exception.

The following fields map a device specific exception to and expected exception:
exceptionClassName: The Exception thrown by the device
exceptionString: The result of the Exception.toString( ) method
exceptionId: The known Exception this maps to See FIG. 9 Device specific exception 2.1.4. Database Requirements
client_build
event_type_set_idFKnumber(10)not NULL
exception_set_idFKnumber(10)not NULL The event and exception sets are created at build time and the indexes are used at runtime top events and exceptions sent between the client and server.
event_type
priorityvarchar(12)DEFAULT NORMAL, in (MIN, NORMAL, MAX)

The priority is used to determine which events are sent from the client to the seller first. Both the priority and severity lad can be updated on the client by the server.
event_type_set
idPKnumber(10)
automaticnumber(1)not NULL, default 0
countnumber(12)not NULL, default 0
guidvarchar(32)not NULL
namevarchar(96)not NULL
data_classification
created
inserted
modified The set of events created for a client build. This set is used at runtime to map events sent by the client to event types in the database
event_type_set_item
event_type_set_idPKnumber(10)not NULL
event_type_idPKnumber(10)not NULL
event_type_namevarchar(96)not NULL
event_type_indexnumber(10)not NULL, UNIQUE INDEX
data_classification
created
inserted
modified The index is the mapping between a client event and an event type on the server. The index will be defined as a constant in the EventType data object. All references to an event in the client code will use this constant.
exception_set
idPKnumber(10)
automaticnumber(1)not NULL, DEFAULT 0
countnumber(12)not NULL, DEFAULT 0
guidvarchar(32)not NULL
namevarchar(96)not NULL
data_classification
created
inserted
modified The set of exceptions created for a client build. This set is used at runtime to map exceptions sent by the client to exceptions in the database
exception_set_item
exception_set_id PKnumber(10)not NULL
exception_idPKnumber(10)not NULL
exception_namevarchar(96)not NULL
exception_indexnumber(10)not NULL, UNIQUE INDEX
data_classification
created
inserted
modified The index is the mapping between a client exception and an exception on the sew. The index will be defined as a constant in the ExceptionConfig data object All references to an event in the client code will use this constant.
exception
idPK number(10)not NULL
guidvarchar(32)not NULL
namevarchar(96)not NULL
event_type_idFKnumber(10)not NULL
class_namevarchar(128)not NULL
superclass_namevarchar(128)
first_retry_intervalnumber(10)
first_retry_countnumber(10)
second_retry_intervalnumber(10)
second_retry_countnumber(10)
allow_session_retrynumber(1)
delete_local_filenumber(1)
show_alertnumber(1)
continue_optionnumber(1)
retry_optionnumber(1)
upgrade_optionnumber(1)
close_optionnumber(1)
open_browser_optionnumber(1)
message_key_idFKnumber(1)
descriptionvarchar (256)
commentsvarchar (256)
data_classification
created
inserted
modified Contains fields that control how an exception that is thrown on the client is handled. The exception configuration is included in the JAR at build titre and can be updated at runtime on the client by the server.
exception_event
exception_idPKnumber(10)
caused_by_event_type_idPKnumber(10)
event_priorityPKnumber(10) in (ALL, MIN, NORMAL or MAX)
first_retry_intervalnumber(10)
first_retry_countnumber(10)
second_retry_intervalnumber(10)
second_retry_countnumber(10)
allow_session_retrynumber(1)
delete_local_filenumber(1)
show_alertnumber(1)
continue_optionnumber(1)
retry_optionnumber(1)
upgrade_optionnumber(1)
close_optionnumber(1)
open_browser_optionnumber(1)
message_key_idFKnumber(1)
event_indexnumber(10)
descriptionvarchar (256)
commentsvarchar (256)
data_classification
created
inserted
modified Exception handling can be overridden for specific events and specific event priorities.
device_exception
device_idPKnumber(10)
exception_class_namePKvarchar(128)

exception_stringPKvarchar(256)
exception_idFKnumber(10)
automaticnumber(1)not NULL, DEFAULT 0
data_classification
created
inserted
modified Map device specific exceptions onto known exceptions. This table is populated by the detective during device commissioning.

2.2. Recommendations

This document describes the approach taken with making recommendations to customers from within the MusicStation application. Omnifone views the ability to make ever-changing, relevant and up-to-date recommendations as key to the strategy of creating loyalty towards the MusicStation application. Recommendations, properly implemented, encourage exploration and discovery that in turn lead to more purchases of new music. Additionally they allow us to optimise the MusicStation experience in the restricted mobile environment.

2.2.1. Recommendations within MusicStation

MusicStation contains several features designed at promoting personalised recommendations to the customer. These features are spread over the Home, Inbox and Buzz tabs and are described in detail in the following sections.

2.2.1.1. Recommendations on the Home Tab

See FIG. 10 Screen Captures—Get new . . . option

Whenever a customer selects the Get new playlists, Get new artists, Get new albums or Get new tracks option from the Home tab, they are presented with a list of menu options, some of which are personalised suggesting recommendations to the customer based upon their recent listening habits.

The menu items that contain personalised recommendations are shown in FIG. 11.

2.2.1.2. Information that Influences Music Recommendations

Music recommendations for the Home tab are made based upon the interaction of two factors unique to the customer:
The implicit factor: This is based upon the listening habits of the customer (i.e. the type of music they listen to and the frequency with which they listen to it).
The explicit factor: How the customer actually rates music that they listen to.

Also counting towards the implicit factor will be any click-throughs on Inbox content that the customer has made (for more information please refer to section 2.2.1.4—Recommendations on the Buzz tab)

See FIG. 12 Screen capture—rating an item. In terms of the explicit factor Customers are pushed recommendations for music similar to other music that they have rated as Love it, and are not recommended any content that is defined as similar to music they have rated with Hate it.

2.2.1.3. Making Music Recommendations

These implicit and explicit factors for each customer are combined, and mixed with known relationships between Artists and other Artists, Tracks and other Tracks and so on. The outcome is a list of personalised recommendations to the customer.

Over time, as we collect information on which Artists, Albums, tracks and Playlists are popular (or not), these recommendations will become even more tightly geared to what the customer is most likely to find relevant. The system will automatically push to the customer the most popular Artist, Albums or Tracks that have direct relationships with the top Artists/Albums and Tracks that the customer listens to or purchases.

2.2.1.3.1. The Importance of 'Recency'

It is important that recommendations are only made based upon the customer's recent listening habits, and not their listening habits for all time. This ensures that the suggestions are the most relevant to the customer at the time of creation, and do not consist of a clouded swathe of very broad suggestions that are influenced by a customer that may have, say, very changeable and diverse tastes.

In terms of MusicStation, recency is defined by the last N Artists/Albums/Tracks or Playlists that the customer has listened to or purchased. The actual value of N is configurable based on observations, enabling fine-tuning over time of the recommendation process.

2.2.1.4. Recommendations on the Buzz Tab

2.2.1.4.1. Recommendations through News

See FIG. 13 Screen capture—News. All News content (news stories, events notifications, promotions for particular Artists etc.) is personalised to the customer based upon the same implicit and explicit factors described for the Home tab. Additionally, as described previously, where users click-through on News content, e.g. a promotion linking to an Artist homepage, this event is tracked, and is then used as a 'positive vote' for that Artist in the overall recommendation process.

2.2.1.4.2. Recommendations through Buzz Members

See FIG. 14 Screen capture—Buzz member recommendations.

The Buzz tab contains two main elements that contain recommendations directed at each individual customer. These are described in the table in FIG. 15.

Recommendations for members (i.e. MusicStation customers) are made by linking customers whose listening and rating history for music is similar (internally the system measure the 'affinity' of customers to all other customers, and select those with the highest level of affinity for the customer in case).

If a customer selects a recommended member then they are able to listen to, and rate, their Shared Playlists.

2.2.2. Supporting Logical Structures for Making Recommendations

We will have three main structures to support the making of these recommendations.
Associated Tracks Matrix
Associated Artists Matrix
Associated Customers Matrix We will discuss the physical infrastructure of systems in a later section. For the moment it is enough to consider that these structures will be frequently refreshed, every 24 hours.

2.2.2.1. Supporting Structure 1—Associated Tracks Matrix

The Associated Tracks Matrix is a matrix of correlations representing how strongly associated pairs of Tracks are in the system, based on ratings, and customer plays.

2.2.2.1.1. Stage 1—Produce counts of Track associations

For Tracks we will build a matrix like the one above, representing:

Counts of customers who have either/or fully played, or have rated as Love It!, the Tracks in the pair.
Important Notes and Rules The matrix in FIG. 16 only considers a universe of 5 Tracks. We are likely to be considering 500,000 for go-live.

In order to be included as a count in 1), the user in question must have listened fully (as defined by the licensing agreements) AT LEAST TWICE. The rationale behind this is that, if a customer listens to a Track more than once, then they probably like it. If they only listen to the Track once then they may only be exploring new music, but not be impressed enough to ever go back to it.

If a customer rates two Track pairs highly, and listens to both more that twice, then this will have the effect of adding 2 to the corresponding intercept in the matrix. This is the maximum influence that one user can ever have on a Track intercept pair.

A Track that has been rated as Love It!, but never played, still counts towards an association.

This matrix covers all Tracks, and all ratings and plays, across all services, within the global MusicStation offering. The same applies to the Artists Associations Matrix described further on.

You will note that half the matrix is duplicated across the diagonal. Therefore, in theory, only half of the matrix is needed.

2.2.2.1.2. Stage 2—Weight the Track associations

We now need to take the matrix from Stage 1 and apply weightings and produce correlations that take account of the fact that some Tracks might just simply be popular to ALL customers (and hence are not necessarily highly correlated for individual associated pairs).

The formula that we apply to do this is known as a TF·IDF formula.

A description of how the TF·IDF formula works, in the context of keywords belonging to a document or web search, is outlined here:

TF=Term Frequency

A measure of how often a term is found in a collection of documents. IF is combined with inverse document frequency (IDF) as a means of determining which documents are most relevant to a query. TF is sometimes also used to measure how often a word appears in a specific document.

IDF=inverse document frequency

A measure of how rare a term is in a collection, calculated by total collection size divided by the number of documents containing the term. Very common terms ("the", "and" etc.) will have a very low IDF and are therefore often excluded from search results. These low IDF words are commonly referred to as "stop words".

$$\text{Weighting} = \text{frequency} \times \log_2 \left( \frac{1}{p(T_1)p(T_2)} \right)^3$$

Notes on this equation:

The TF=frequency (or the intercept value in the Stage 1 matrix).

The IDF is represented by the latter (log) part of the equation, and is a base-2 logarithm.

$P(T_1)$ represents the overall probability of Track 1 appearing at least once in the different pairings in the matrix (i.e. it is simply how many times it occurs at least once in a pairing, divided by the total number of Tracks).

The IDF is raised to the power of 3. This is not a fixed constant, but is something that can be experimented with in order to refine the recommendations. A well-known online music-recommender uses the value of 3 for this constant, and so we would be wise to follow their knowledge and lead.

As an example of the equation's use, if we wish to calculate a weighting for Track 1 and Track 2 from the Stage 1 matrix, then we would perform the following calculation $$\text{Weighting}(T_1, T_2) = 12 \times \log_2 \left( \frac{1}{\frac{3}{4} \times \frac{2}{4}} \right)^3$$

This gives a weighting for Track 1 and Track 2 of 34. We can now produce a new Weightings Matrix, shown in FIG. 17, including the sum of all the weightings at the end of each row and column.

2.2.2.1.3. Stage 3—Normalize the weightings

We now need to normalize the weightings. Essentially all this means is that we create a new matrix where every weighted correlation in the matrix is divided by the overall sum for the correlations in that row or column.

Using the example of Track 1 and Track 2 again, we would simply divide 34 by 110.5, providing a normalised weighting of 0.31.

The result of this is that we now have a set of normalized weightings lying between 0 and 1 as shown in FIG. 18.

In the resulting table, the nearer the value is to 1, then the higher the correlation between the Tracks.

In the world of recommendations, the values in the table are now called Pre-Computed Associations (PCAs), by virtue of the fact that they are correlations, at that they are reproduced on a regular basis (but generally not updated in an ongoing manner due to the amount of number crunching involved).

2.2.2.2. Supporting Structure 2—Associated Artists Matrix

The Associated Artists Matrix is a matrix of correlations representing how strongly associated pairs of Artists are in the system, based on ratings, and customer plays, e.g. as shown in FIG. 19.

The Associated Artists Matrix of PCAs will essentially be built in exactly the same way as that for Tracks.

The criteria for inclusion in the Artist Plays Matrix is that the customer must have fully played at least one track from that Artist at least twice. Again, the maximum influence a single customer can have on the matrix is a an additional value of 2 (in the instance where they have both rated a pair of Artists as Love It! And have fully listened to at least one Track from both Artists at least twice.

N.B. Ratings for Tracks or Albums by this Artist have no influence on the Associated Artists Matrix.

2.2.2.3. Supporting Structure—Associated Customers Matrix

The Associated Customers Matrix is a matrix of correlations representing how strongly associated pairs of Customers are in the system, based on ratings, and customer plays. See e.g. FIG. 20.

The Associated Customers Matrix of PCAs can be built as part of the same process for generating the Associated Artists matrix.

The criteria for inclusion in the Associated Customers Matrix is that the customer must have fully played at least one track from the same Artist* at least twice. Again, the maximum influence a single customer can have on the matrix is a an additional value of 2 (in the instance where they have both rated THE SAME pair of Artists as Love It!, and have fully listened to at least one Track from both Artists at least twice.

N.B. Choosing common Artists here is likely to be beneficial over choosing common Tracks since the implications for calculations and processing power will be lowered.

2.2.3. Making Recommendations

This section describes how the described structures are used to generate recommendations fro:

- "More like this" Track, Album or Artist
- Tracks "You might like"
- Albums "You might like"
- Artists "You might like"
- Playlists "You might like"
- "Recommended Members" as listed on the Buzz Cool Members screen
- Recommended Playlists as listed on the Buzz Cool Playlists screen—is this the same list as Playlists you might like?
- "Find in Playlists?"
- Inbox—editorial and promotional All the functionality described runs at run-time on a per-request basis, based upon the calculated PCAs.

See FIGS. 21, 22, 23, 24 and 25.

2.2.4. Generating Starred Ratings

This section explains how we generate the 5-star ratings for Artists/Albums/Tracks/Playlists.

2.2.4.1. Inputs to the Rating System

There will be two inputs to the star-ratings system—explicit ratings (i.e. Love It! and Hate it!), and implicit ratings (i.e. number of listens to Artists/Albums/Tracks, specifically the number of times a customer has fully-listened to that Artist/Album or Track, and at least twice).

It is recommended that, where possible, the ratings be mad up of a 50/50 split of explicit and implicit measures.*

* This will also have the advantage that customers cannot simply abusively rate stuff to get it to appear with a higher or lower star rating.

2.2.4.2. Calculating the 5-Star Rating for Artists/Albums/Tracks/Playlists

2.2.4.2.1. Calculating the Explicit Rating Value

The explicit rating for an Artist/Album/Track/Playlist is simply based upon the proportions of customers who rated the Artist/Album/Track as Love It! against those who rated it as Hate It!. It is calculated as follows:

1) Take the number of customers who have rated the Artist/Album/Track/Playlist as Love It!.
2) Divide the value in (1) by the overall number of customers who have rated the Artist/Album/Track/Playlist (i.e. either as Love It! or Hate It!)
3) Multiply by 5 to provide a rating value out of 5.

For example, consider that for Angels—Robbie Williams, we have 45 Love It! ratings and 18 Hate It! ratings. The rating value is then:

$$\text{Rating\_value} = \left(\frac{45}{45+18}\right) \times 5 = 3.57$$

2.2.4.2.2. Adjusting the Rating Value to Handle Low Number of Ratings

I order to avoid abuse, and to prevent lots of 0 or 5 star ratings appearing in the system in situations where only a few customers have rated an Artist/Album/Track/Playlist, we should always include two phantom ratings of Love it! and HateIt! in the calculation. Thus the final calculation becomes:

$$\text{Rating\_value} = \left(\frac{45+1}{(45+1)+(18+1)}\right) \times 5 = 3.53$$

2.2.4.2.3. Calculating the Implicit Rating Value

For calculating the implicit rating value we need to create a baseline for comparison.

The most sensible baseline is one that represents the average number of plays per customer for all Artists/Albums/Tracks/Playlists that have been fully played at least once by each individual customer (i.e. it is not fair to include Artists/Albums/Tracks/Playlists that have never been listened to within the calculation). We can that take this baseline to represent a 2.5 rating within the system, and adjust all other ratings up or down accordingly by normalising the distribution to around the 2.5 rating value.

As an example, if the average* number of plays per customer for the Track Angels—Robbie Williams is 12.90, and the average number of plays for all Tracks (that have had at leas one full play) per customer is 4.66, with a standard deviation of 4.23, then we would do the following:

Average plays per customer for Angels–Robbie Williams=12.90

Normalized plays(around a mean of 0)=(AV. PLAYS–OVERALL AV. PLAYS)/(STDEV)

Therefore, normalized plays(around a mean of 0)= (12.90–4.66)/4.23=1.95

Therefore, normalized plays(around a mean of 2.5 stars)=2.5+1.95=4.45

(N.B. It is feasible that, in very extreme circumstances, this value could be <0, or >5. In this case we will cap the value at 0 or 5 accordingly)

The overall representation of how this works in a universe of 6 Tracks is represented in FIG. 26.

* N.B. Use the MEAN average initially, but we should also experiment with the MEDIAN average since the latter will have the effect of removing the influence of individual customers who just play one Artist/Album/Track/Playlist in an obsessive manner (!)

2.2.4.2.4. Calculating the Overall Rating Value

The overall 5-Star rating is calculated by simply taking the average of the implicit and explicit ratings, and rounding up to the nearest half star (round up since we want to be positive in what we present!).

Thus the overall rating for Angels–Robbie Williams= (3.53+4.45)/2=3.99

Therefore Angels–Robbie Williams receives a 4-star rating.

2.2.4.3. Calculating Ratings for Customers

The ratings for customers will be based upon a 50/50 average of:

1) The ratings and number of listens that a customer has had to their shared Playlists.
2) The number of friends the member has.

The former is calculated in a similar manner to that described in section 2.2.4.2, and likewise, for the implicit part, only considers Playlists that have been listened to by other customers and at least twice. Once we have the overall ratings for all the customer's playlists then we will simply take an average of all of them to produce a final rating (5 star or other more desirable representation).

The second part is calculated as the mean number of friends with respect to the average number of friends for the entire service data set, i.e.:

Normalized friends(around a mean of 2.5)=2.5+(AV. PLAYS–OVERALL AV. PLAYS)/(STDEV)

2.3. Search Function

This whitepaper describes the search interfaces, processes and results sets that make up the MusicStation music search. Due to the nature of the mobile working environment the search mechanism within MusicStation has been designed so that it is simple and intuitive to use, whilst at the same time being an extremely powerful feature. Emphasis is placed upon providing relevant and accurate results quickly to the MusicStation customer base.

At the same time as this, it should be remembered that much ongoing automated work is being done in the background to push relevant Artists, Albums, Tracks and Playlists to the customer under the You might like, Recently Added and Featured Artists/Albums/Tracks/Playlists menu options. The contents of these menu options are updated constantly and are based upon a customer's unique tastes and their purchasing and listening habits.

2.3.1. Search Interface
2.3.1.1. Basic Search

The basic search provides quick but powerful access to the MusicStation music database. The search is performed by the customer entering a keyword (or set of keywords) and then further refining their search by one of:
- Artist
- Album
- Track Additionally it is possible to further restrict the search to non-classical music only or classical music only, with the default being the selection previously used. Otherwise the system will search both.

2.3.1.2. Advanced Search

The Advanced Search screen allows for extensive and finer control to be employed over the search process. Using the Advanced Search screen it is possible to filter the result set by:
- Artist, Album or Track
- Genre
- Chart position (highest)
- Minimum customer rating
- Language
- Country In addition it is possible to search the following fields for classical music:
- Work Title
- Album Title
- Composer
- Soloist/Performer
- Conductor
- Orchestra/Ensemble
- Record Label

2.3.2. General Principles to Support Searching in MusicStation

There are ten basic principles that have been adhered to in creating the MusicStation search. These principles are provided here with examples where appropriate.

2.3.2.1. No Dependence on Non-Alphanumeric Characters

Different customers will use non-alphanumeric characters in different ways. For example some may use a hyphen as a separator in an Artist title. Others may simply use a space. In the mobile environment entering non-alphanumeric characters can sometimes be tricky and is prone to error. Therefore, for the purposes of search, there is no dependency on non-alphanumeric characters, and by way of example, the following are all considered to be equivalent:
- s club 7
- s-club-7
- sclub7

2.3.2.2. No Dependence on Character Case

This simply means that, for example, the following are considered equivalent
- sclub7
- S CLUB 7
- S Club 7

2.3.2.3. International Variations of Characters are Treated as Equivalent

Different customers will use non-English characters in different ways. For example a British person may search for:
- Bjork ... when what they really should be searching for is:
- Björk In MusicStation such discrepancies do not matter since the search system matches international variation of English letters to their English alphabet equivalents (and vice versa).

2.3.2.4. Numerics are Treated as the Same as their Written Equivalents (and Vice Versa)

In an Artist search a customer may enter, for example, "50 Cent" or "Fifty Cent". Both these cases are handled by the system.

2.3.2.5. Abbreviations and Different Ways of Writing Words do not Matter

Internal mapping tables ensure that commonly used abbreviations and equivalent representations are understood. Thus the following keywords are all be considered by the system as equivalent:
- Boys to Men
- Boys 2 Men
- Boys II Men In a similar vein "and" and "&" are considered to be equivalent.

2.3.2.6. There should be No Dependence on Correct Positioning of "the"

We are not concerned about how "The" is used. For example the following keywords are all be seen as equivalent by the system and the correct result will be returned:
- The Rolling Stones
- Rolling Stones, The, or simply:
- Rolling Stones

2.3.2.7. Customers do not Always Enter the Full Set of Keywords

Someone searching for "Rage Against the Machine" may simply enter "Rage" as a keyword and expect MusicStation to return a sensible set of results to choose from.

2.3.2.8. Customers do not Always Spell Words Correctly

Though we are primarily looking for an exact match we recognize that customers often mis-spell words. We use fuzzy-logic and phonetic matching techniques to suggest search Artists, Albums or Tracks to the customer when all else fails.

2.3.2.9. If they Know What they want then Take them there

If a customer searches for "rage against the machine" and this results in 1 result being returned then they will be forwarded automatically to the "Rage Against the Machine" Artist Homepage. We will not present them with a result set containing a single Artist that they must then click on.

2.3.2.10. We Will Learn from Use of the System and Optimize it Accordingly There may be variations of Artist, Album or Track names that customers search for, that are quite different to the one stored in the database. Structures exist to ensure that when we see a new variation in a search keyword, we are able to match it to the intended Artist, Album or Track name, thus ensuring that all future searches using that variation are successful.

Similarly, when sorting the search results will make use of knowledge of the popularity of the results (as played by customers) ensuring that the most popular (and hence the most likely result for the intended search) are nearer the top. When this is occasionally not correct the customer may choose an alpha-sorted view instead.

2.3.3. The Search Process

The following is a description of the search process from the point where the customer enters their search keyword(s) for an Artist search.

N.B. The same principles below are also applicable to the Album or Track searches.

1) An exact match for the entered search keyword(s) is searched for, but based on the underlying principles outlined in Section 2.3.2—General Principles to Support Searching in MusicStation.
2) We then search for instances of the search keyword(s) within the Artist names. For example, given the search keyword "BOB MARLEY", valid matches are:
    a) "BOB MARLEY *"
    b) "* BOB MARLEY *", and
    c) "* BOB MARLEY"
    (where * is a 'wildcard' representing any sequence of characters)

Matches of type (a) are viewed as higher priority in the returned results list than those of type (b) and (c).

If (1) and (2) returns only 1 match then we go direct to Artist homepage (and the Album Homepage for Albums, and the Now Playing screen for Tracks).

Otherwise we list matches from 1), followed by matches from 2) ranked by popularity and then alphabetically.

If we have found matches from the above then we leave the search routine. Otherwise we move on to approximate matching:

We repeat steps 1) to 4), but this time by making use of phonetic and fuzzy-logic matching to find matches that sound similar to the keyword or are spelt slightly differently. Any matches that are returned from this process are preceded by the header. "No exact matches found. Did you mean:" so that it is clear to the customer that the search results are not precise matches. The result set is again ranked by popularity and then alphabetically.

2.3.4. Finding in Results

In instances where the results list is large the customer may search for more specific items by using the 'Find' option on the 'More popup' menu to navigate through the list looking for a specific string. When the customer submits the first occurrence of it is found. The next result can be moved to quickly by use of the 'Next' option on the left-hand soft-key.

2.3.5. Refining the Search

It is possible to refine a search from the results set page using an option on the 'More popup' menu. What this means is that the user may search again (in either the Basic or Advanced Search) but with the search keyword box and all pre-selected filters maintained allowing for them to be quickly refined.

2.3.6. Format of the Search-Results Set

When a search results in a search result-set being returned the count of elements in the set will be presented in the top right of the page.

The format of the actual results themselves is different dependent on whether the search was for an Artist, Album or Track. These formats are described in greater detail in this section.

2.3.6.1. Artist Search

The top Artist Name matches are returned, sorted by popularity of the Artist as measured by the system. These are followed by further matches of similar (but lower) popularity, sorted in alphabetical order.

2.3.6.2. Album Search

The Album search will return results in the following format:

Album Name—Artist Name (Year of Release)

Having the 'Year of Release' ensures that, for example, re-releases (which may contain bonus or updated tracks) can be easily distinguished from the original.

The top matches are returned sorted by popularity of the Album as measured by the system.

These are followed by further matches of similar (but lower) popularity, sorted in alphabetical order.

2.3.6.3. Searching Tracks

The Track search will return results in the following format:

Track Name—Artist Name (Track Length)

Having the 'Track Length' (in mm:ss) ensures that Tracks having the same name (but of different length) can be distinguished. This can often occur with re-mixes on different Albums.

N.B. Having the Album Name here is deemed as unnecessary and undesirable due to the overall length of the string that would result in what is a tightly restricted environment. Also, if the same Track occurs on different albums, then it will only be returned once.

The top matches are returned sorted by popularity of the Track as measured by the system. These are followed by further matches of similar (but lower) popularity, sorted in alphabetical order.

2.3.7. Find in Playlists

At suitable points in the system, when a Track is being referenced, the customer can search for that Track within Playlists by using the 'More popup' option 'Find in playlists'. A list of Playlists shared by other MusicStation customers (or contained within other system-published Playlists) is returned, sorted by popularity.

2.4. Multi-Language Support

This document describes how we manage and use messages to build a client build for a specific device, service and client version.

2.4.1. Development

Each client version released by Development has a default set of messages used by the client.

Figure 27:
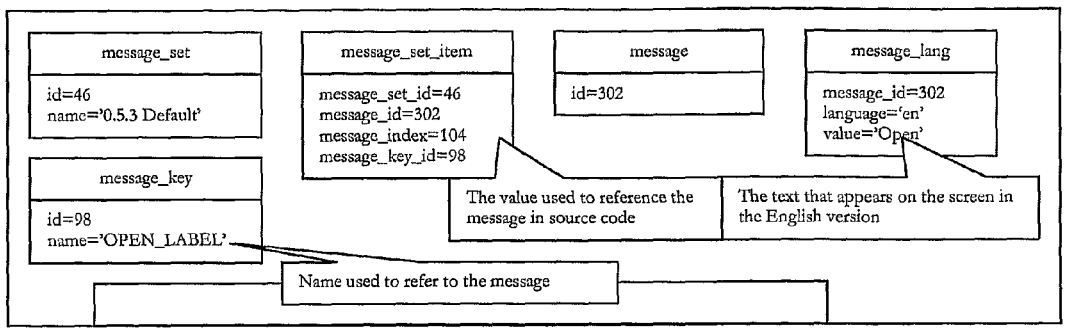
FIG. 27 is Properties of a message.

This message set is maintained during the development of a release by the developers. Each message in the message set is text or a label that appears somewhere in the client. See FIG. 27 Properties of a message.

A message is added to the default message set by adding a record to message_set_item with the next available message_index. The message index is used in the source code to access messages in the message set. The index is defined as a constant in the Message object:

public static int OPEN_LABEL_INDEX=104;

This constant can then be used to get the message in the currently selected language:

openCommand.setLabel(messageSet.getMessage(OPEN_LABEL_INDEX));

This message set is set as the default message set for a client version.

Figure 28:
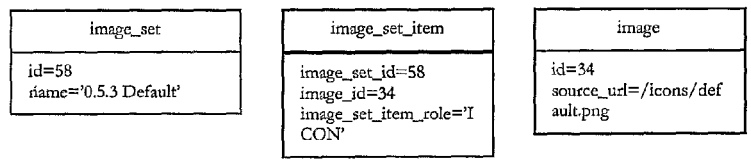
FIG. 28 is Properties of an image.

Images that are packaged in the build are defined in the default image set. Images are selected from this set based on the image role. See FIG. 28 Properties of an image.

Figure 29:
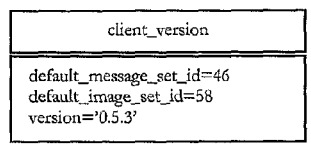
FIG. 29 is Properties of the client version.

The client version is released with the default message and image sets. See FIG. 29 Properties of the client version.

2.4.2. Client Version Release

The following records are packaged with a client version release from development to the Build System:
- The default message set and message set items
- The messages and message keys used by the default message set
- The message langs in English and any other test languages
- The default image set and image set items
- The images used by the default image set

2.4.3. Message Translation

Figure 30:
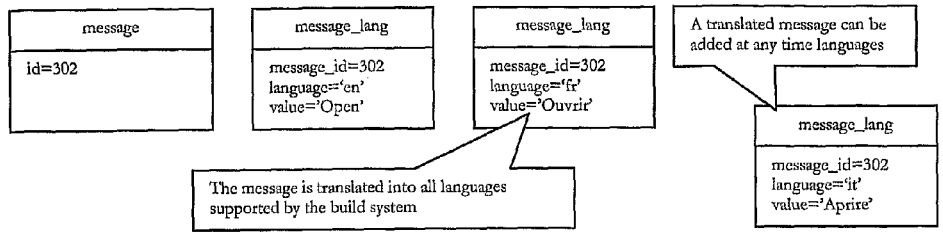
FIG. 30 is Translated messages.

Translated messages can be loaded into the Build System at anytime. A language is available for selection by the build user when each message in the default message set has a message lang for that language. See FIG. 30 Translated messages.

When adding a message to a service message we enforce that a message lang record exists for all languages supported by the service. Similarly if a build user selects a device to use with that service we ensure that all device messages have a message lang for all languages supported by the service.

Because a client build is built for multiple languages but we can only include one icon, logo and splash screen in the jar there's no need for translation of images. The images defined for a service are in the default language for that service.

2.4.4. Device Messages

Figure 31:
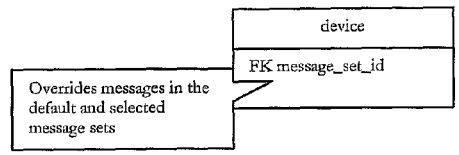
FIG. 31 is Device Message properties.

A message set can be defined for a device. This allows us to override messages in the default message set for the selected device. See FIG. 31 Device Message properties.

Figure 32:
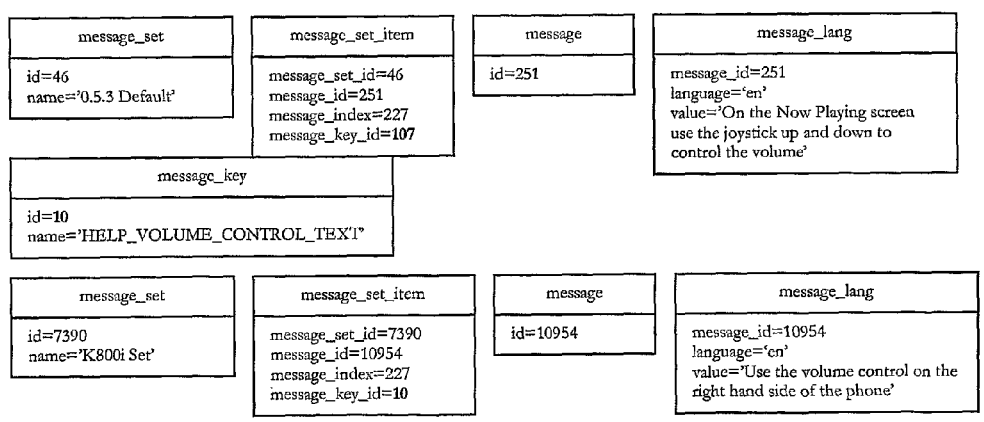
FIG. 32 is Device Message/Help Message properties.

For example a help message may be specific to a particular device: see FIG. 32 Device Message/Help Message properties.

At time of build, messages defined for the selected device override messages in the default message set that have the same message key.

2.4.5. Service Messages

Figure 33:
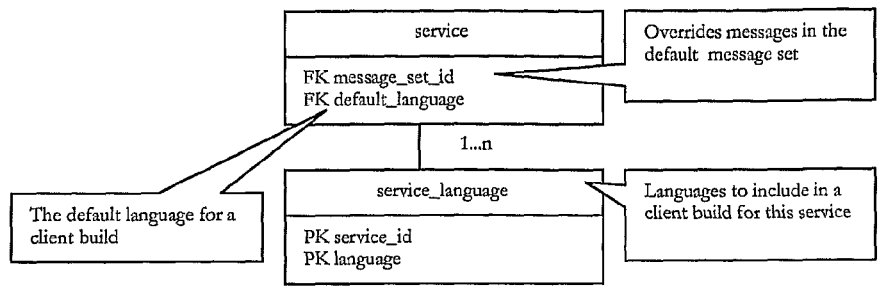
FIG. 33 is Service Messages.

Messages can also be defined for a service. These messages override the default and device message sets although in practice messages should be either device specific or service specific and not both. See FIG. 33 Service Messages.

A service also has a default language and a set of service languages. These are set as the default language and supported languages for the client build however the build user is able to edit these before doing the build if the build needs a different default language or only a sub-set of the languages.

2.4.6. Service and Device Specific Message and Images

Figure 34:
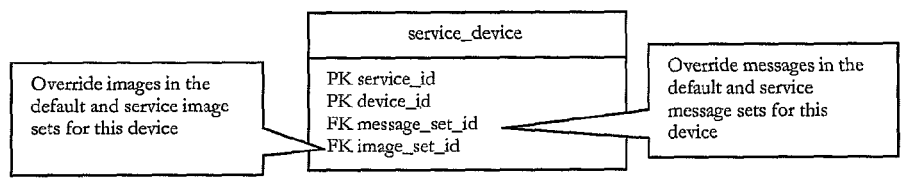
FIG. 34 is Service and Device Specific Messages.

In some instances we want to specify that a message or an image is specific to a particular device and a particular service. For example we may want to use an service icon that has been manually resized on a set of devices. See FIG. 34 Service and Device Specific Messages.

2.4.7. Message Substitution

Any service or device property that can be referenced in the database is available for substitution into the default message set. For example to substitute the customer support phone number:

To get help please call ${service.company.companyAddress.customerSupportTelephone}

The default message set supports substitution and this is hidden from the build user. When they view the default message it will have the phone number already substituted in.

Device and service messages also support substitution. The tools that manage device and service messages should hide the syntax from the build user.

If a substituted value isn't defined for a device or service the build user is required to set the value before the build can proceed.

2.4.8. Client Build

The user has chosen the client version, device and service. The default message set for the version provides the base for the messages selected for the build. These messages are then overridden by the device and service messages sets respectively. These are then overridden by any messages specified in the service_device message set.

The selected languages for this build are then used to filter the message Lang records for the supported languages.

Figure 35:
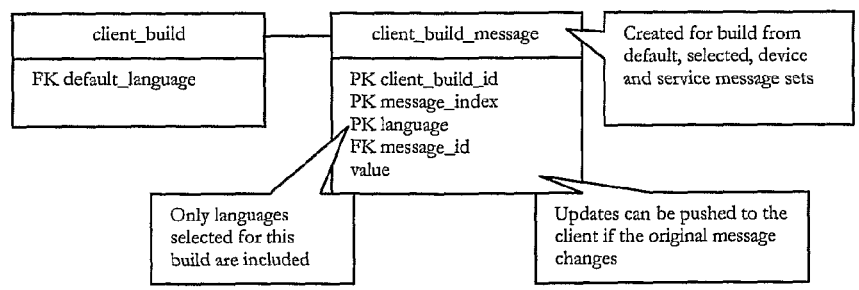
FIG. 35 is Client Build message.

A client build message is created for each message in each language and copied into the client build message table for this build. See FIG. 35 Client Build message.

Taking a copy of the message at build time allows us to:
- Keep a record of any substitutions made
- Update messages without having to duplicate locked messages A client build image is created for each image in the default image set and then overridden with any images in the service image set. These are then overridden by any images specified in the service_device image set. These images are then resized and renamed and packaged in the jar.

Client build messages and images form part of the client build definition and are published to a Production Server when that client build is published to it.

2.4.9. Publishing Client Builds

For each client build the following message related tables are released to the Production System:
- Client_build: The record for this client build
- Client_build_message: The records for this client build
- Message: Each message referenced in client_build_message
- Message_key: The key for each message
- Message_lang: The message_lang for each message in each supported language.
- Client_build_image: The records for this client build
- Source image files: Each image file referenced in client_build_image

2.5. Roaming network selection

When the phone is "Roaming" a user will experience additional charges when using MusicStation. These charges will be applied when a user downloads tracks or when MusicStation updates menu items and images while the phone is roaming. A user can configure the Roaming behaviour for MusicStation.

2.5.1. Configuring Roaming Behaviour

See FIG. 36 Screen capture—Roaming options

Within MusicStation a user can configure the Roaming behaviour for MusicStation. See FIG. 37.

Figure 38:
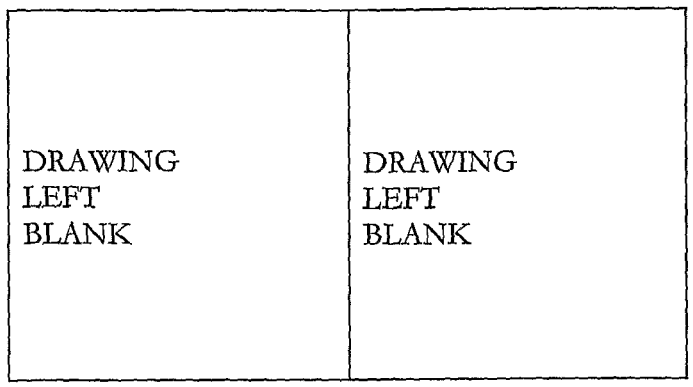
FIG. 38 is Screen capture—Roaming Warnings.
Figure 39:
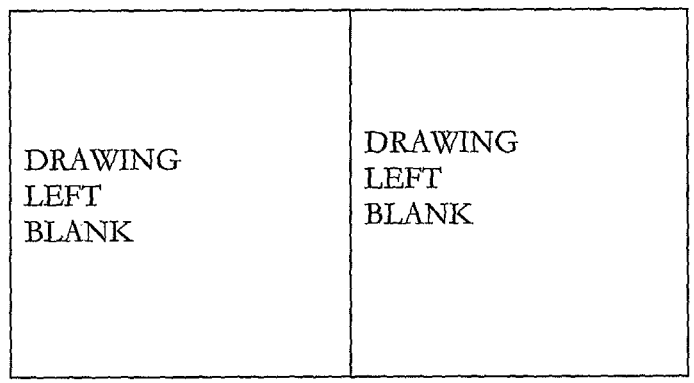
FIG. 39 is Screen capture—Roaming Warnings—Ask prompt.

If the Roaming behaviour for Menu & picture updates is set to Ask they will be shown a warning message which will ask them to approve/deny downloads, updates and additional charges while roaming for a given session. See FIG. 38 Screen capture—Roaming Warnings When the user attempts to download a track while Roaming and the Roaming behaviour for tracks is set to Ask they will be shown a warning message which will ask them to approve/deny downloads, updates and additional charges while roaming. This action, approval/denial, will configure the settings for the current session. See FIG. 39 Screen capture—Roaming Warnings—Ask prompt

2.5.2. Roaming Warnings and Errors

Billable actions can be classify in two categories:
- Track Downloads—downloading of audio files.
- Menu and picture updates—updating of menus includes items such as Chart listings, You might like recommendations, Cool members and Buzz playlists. Updating of pictures such as a changed image on a Buzz profile or downloading new images for artist and album pforiles.

The follow process will occur for every connected billable action for each new session of MusicStation.

The server should examine the response headers of all requests coming from the client.

When roaming is detected and the user selects a billable action then examine the roaming option set for that type of action on the Options menu.

If that action is marked as On (allow) on the Roaming options menu then the action will be performed as normal.

If that action is marked as Off (disallow) on the Roaming options menu then a popup will be displayed explaining that it is blocked.

If that type of action is marked as Ask on the Roaming options then the first time in a session that an action of this type is selected then the Roaming Warming will be displayed. Subsequent actions will then be treated based on the answer that the user provided.

2.5.3. Roaming Warnings 2.5.3.1. Roaming Options set to Ask

Figure 40:
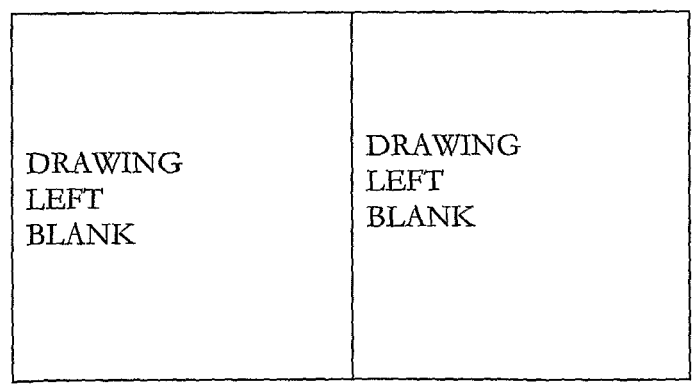
FIG. 40 is Screen capture—Roaming Warning—Ask prompt.

When billable actions are set to Ask on the Roaming Options menu the following Roaming Warning is displayed. The user will be prompted to select a setting for this type of billable action while roaming. See FIG. 40 Screen capture—Roaming Warning—Ask prompt If the user selects Don't Allow then the all subsequent actions in this area will display the Roaming error for the rest of this session or until Reset Location is selected If the user selects Allow then all subsequent actions in this area will go ahead with no further prompts, for the rest of this session or until Reset Location is selected If the user selects Terms & Conditions a WAP page display terms and conditions for MusicStation use. Closing the WAP browser returns to MusicStation at the above prompt.

As soon as the user returns to their home network this warning would no longer be displayed.

2.5.3.2. Roaming Options Set to on

Figure 41:
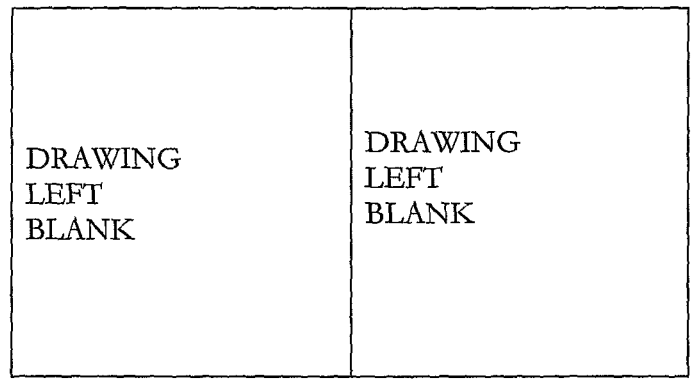

When billable actions are set to On on the Roaming Options menu the following Roaming Warning is displayed the first time a user performs a billable action in a roaming session. The user may have set the roaming preferences some time in the past and forgotten that they had allowed these chargeable actions. See FIG. 41 Screen capture—Roaming Options set to On.

The user is warned that they will be charged for either track downloads or menu and picture updates. Track downloads and/or menu and picture updates will proceed. These options can be changed on the Roaming options menu.

2.5.3.3. Roaming Options Set to Off

Figure 42:
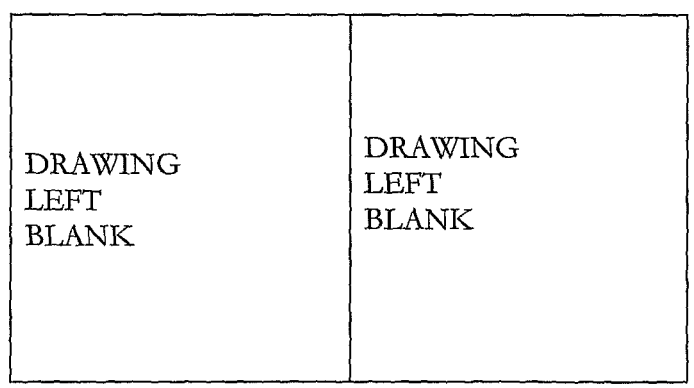
FIG. 42 is Screen capture—Roaming Options set to Off.

When billable actions are set to Off on the Roaming options menu the following Roaming Warning is displayed the first time a user performs a billable action in a roaming session. See FIG. 42 Screen capture—Roaming Options set to Off The user is warned that Track downloads and/or menu and picture updates will not proceed. These options can be changed on the Roaming options menu.

2.5.4. Detecting Roaming

The following process describes how MusicStation detects that a phone is roaming:

Every HTTP request from the MusicStation client to our server goes through the MNO's gateway They have configured the gateway to add certain information to the header. For example:

X-WSB-Identity:$(MSISDN); X-TELENOR-SGSN:$(RADIUS:SGSN-IP-Address); X-bearer:$(BEARER_TYPE)

The second field here is the IP address of the SGSN. It is the IP address of the gateway which the handset is communicating through.

We compare this IP address with a list of IP addresses of the gateways on the MNO network If the IP address is not on this list then this means that the handset is roaming The server makes this evaluation by looking up the IP address in the list and if it decides it is roaming it then it pushes that status back to the client which will then run through the rules and user prompts described in 2.5.2. Roaming Warnings and Errors.

3. Community Features

In addition to an end user's ability to interact with the server in an individual capacity the client and server also provide certain community functionality whereby users can interact with one another. Each user has the ability to create an individual profile, send 'friend' requests to other users and thereafter send their playlists or recommendations by artist, album or individual tracks to confirmed 'friends'.

3.1. Registration

The first step in participating in the community features is the requirement for a user to register a unique profile within the community environment (also known as Buzz)

3.1.1. No Member Name Defined

When the user attempts to access the community features but the user has not registered their Buzz user name then the Buzz home page displays an invitation for the user to register with Buzz. Member name is only mandatory field:

customer_preference.nickname

In addition the user can optionally enter a catchphrase and/or select an image as their avatar:

customer_preference.catchphrase
customer_preference.avatar_image_id

If member name is unique in this service, and passes the swear word filter then the Buzz home page shows the newly defined details for this member.

If member name is not unique in this service the client returns to the screen, replacing the user entered member name with the suggested member name for the user to either accept or modify.

When the user has provided a member name then the Buzz home page shows the previous details for this member and a count of the user's confirmed friends and the number of listens to their shared playlists:

Customer_count.friend_count
playlist_count.play_count 3.1.2. Member Name Defined When the user has provided a member name then the Buzz home page shows details for this member.

customer_preference.nickname
customer_preference.avatar_image_id
customer_preference.catchphrase
customer_data.calculated_rating
Customer_count.friend_count (count of customer_to_customer where customer_id=${customerId} and customer_to_customer.friend_status=APPROVED)
play_count_otherplaylist (sum of playlist_count.play_count where playlist.owning_customer_id=${customerId})

Rating is computed from their popularity. The algorithm is included in 2.2 Recommendations.

Menu options give access to shared playlists and ranked community members (3.4 Buzz Cool Members) who will be of interest to this member. They also give access to the user's own playlists and their friends (3.6.1 Buzz Friends).

3.2. Edit My Profile

An option exists via the context sensitive menu that allows the user to edit their profile, which is displayed on their Buzz profile screen and can be viewed by other members if appropriate options are set. It is displayed when the user selects an "Edit My Profile" option from the context sensitive menus within the Buzz Main screen. The user can edit their Member Name, their catchphrase, their image and viewing options:

- Show Profile—controls whether this member's profile is ever visible to other members. The default is Yes.
- Show my top tracks—controls whether this user's favourite artists are listed on their member profile screen. The default is Yes.

3.3. Shared Playlists

A menu option gives access to shared playlists which will be interesting to this user.

"You Might Like" playlists are other users' shared playlists which have been selected for this user by the Recommendation Engine. See 2.2 Recommendations.

For each shared playlist the client displays the Shared playlist name, the star rating and the member who created the playlist:
- playlist.name
- playlist.owning_customer_id
- customer_info.recommend_playlist_set_id
- playlist.image_set_id
- playlist_data.calculated_rating

3.4. Buzz Cool Members

A menu option gives access to members who will be interesting to this member. "You Might Like" members are other members who are similar to this member. See 2.2 Recommendations for detail of how this list is created. Only members who have the "Show Profile" option set on their Edit My Profile screen and are not already confirmed friends of the user will be listed here with the following details:
- customer_preference.nickname
- customer_preference.avatar_image_id
- customer_info.recommend_customer_set_id
- customer_data.calculated_rating
- count of playlist where owning customer_id=${recommendedCustomerId}

3.5. Another Member Profile

A user can view details of another member of the Music-Station service. When a member is opened from a list of members (e.g. from the 3.4 Cool Members screen) aspects of their profile are displayed. This screen can never be shown for a member who has not yet signed up to Buzz and set up at least their member name. The view includes a list of all of this member's playlists that they have shared. Opening one of these displays the playlist.

For each playlist the screen shows the rating and the number of times that a track from that playlist has been listened to with a qualifying play. If there are no shared playlists then the message "This member has not yet shared any playlists." is displayed in this section under the Shared Playlists heading.

In addition, a list of the other member's top tracks is displayed. This section (including the title) is only shown if the member being displayed on this screen has the "Show my top tracks" flag set on the 3.2 Edit My Profile screen. The list displays this member's top 5 tracks. This is the all time top 5 most played tracks by this member listed with most popular at the top. The user can select Play on any of these tracks. The fields included are:
- customer_preference.nickname
- customer_preference.avatar_image_id
- customer_preference.catchphrase
- customer_data.calculated_rating
- play_count_otherplaylist (sum of playlist_count.play_count where playlist.owning_customer_id=${customerId})
- Customer_count.friend_count (count of customer_to_customer where customer_id=${customerId} and customer_to_customer.friend_status=APPROVED)
- playlist.name
- playlist_data.calculated_rating
- playlist_count.play_count
- playlist.image_set_id

3.6. Buzz Add as Friend

This screen is displayed when a user selects "Add as Friend" option from the context sensitive menu anywhere a member is selected. The user can send a message as part of their friend request.

When the Add as Friend option is selected against a member, and the member is not yet this user's friend a friend request screen is displayed with fields for the name of the member the friend request is going to and a text body where the member can enter some text which will be sent to the other member as an introduction as to who they are. Fields include:
- customer_preference.nickname
- customer_to_customer_request.body

3.6.1. My Friends

A "My Friends" menu option displays a list of this member's friends. If the user has no friends then this displays the message "Your list of friends will be shown here". In addition a list of this member's pending friends requests is displayed. This title and list is not shown if there are no pending requests. Fields include:
- count of customer_to_customer where customer_id=${customerId} and customer_to_customer.friend_status=APPROVED
- from customer_to_customer_request where friend_status=REQUESTED

3.6.2. Add Friend by Name

A user can select an "Add Friend by Name" menu option to add another user by their profile name. This option is only available if this user has done the Buzz registration and registered their member name. The user needs to enter the member name of the friend to send friend request to. Fields include:
- customer_preference.nickname
- customer_to_customer_request.body When the member selects "send" and a member with that name is found (whether that member has their Show Profile option set or not) a When the member selects "send" and no member of that name is found the user is notified and asked to re-enter the member name.

When the member selects "send" and that member is already this user's friend the user is again notified to this effect

3.6.3. Add Friend by Telephone Number

This screen is displayed when a user selects an "Add Friend by Number" option. The user needs to enter the phone number of the friend to send friend request to. We assume that they are entering without the country code and the default country code will be that of the country that the service is associated with. Fields include:
- customer_person.mobile_msisdn
- customer_to_customer_request.body When the member selects "send" and a member with that number is found (whether that member has their Show Profile option set or not) a When the member selects "send" and no member of that number is found the user is notified and asked to re-enter the member name.

When the member selects "send" and that member is already this user's friend the user is again notified to this effect 3.7. Send Track or Playlist This screen is displayed when a user selects a "Send to Friend" option on a track or playlist anywhere in the context sensitive menus. The user may select one or more friends to send the track or playlist to. The user must have their own member name set and at least one friend for the Send to Friend option to be enabled. Fields include:
  mail_attachment.track_id
  customer_preference.nickname
  customer_mail.customer_id
  mail.body A list of this member's friends is displayed. The user clicks a friend to select and clicks again to deselect. Any number of friends may be selected. For each friend their rating, number of friends and number of listens are displayed.

On selecting send a confirmation message is displayed and the user is returned to their initial screen.

3.8. Send a Message

The client also has the capability od sending a message without the addition of content identification. The message screen displays the following fields:
customer_mail.customer_id
customer_preference.nickname
mail.body 3.9. Who's Listening This screen is displayed when a user selects a "Who's Listening" option from the More menu on a track, album, artist or playlist anywhere in the menus. The screen shows the last ten members registered with Buzz who played the item that this user selected Who's Listening option on. What is displayed depends on the type of objects the option was selected against as follows:
  Track—the last 10 members to play that track
  Album—the 10 members to play a track that is in that album
  Artist—the last 10 members to playa track by that artist
  Playlist—the last 10 members to play a track from that playlist.
The fields are:
  customer_track order by last_play_date
  customer_release order by last_play_date
  customer_artist order by last_play_date
  customer_playlist order by last_play_date 3.10. Inbox Included in the community views is an "Inbox" that displays all messages to a user including messages and recommendations from other users.

3.10.1. Inbox Track Recommendation Message Arrived

When a member sends this user a track a message will appear in the Inbox with the following fields defined:
  mail.kind=MESSAGE
  mail.from_customer_id
  mail.sent_date
  mail.kind=TRACK RECOMMENDATION
  mail.from_customer_id If the user opens a message by selecting it then a message screen is displayed with the following fields:
  mail.from_customer_id
  customer_preference.avatar_image_id
  mail.sent_date
  mail_attachment.track_id Recommended tracks. Albums, artists or playlist names appear highlighted in the message and as a user scrolls through the message each subsequent one is highlighted.

Clicking on a track name has the same behaviour as if the user had selected Add to Playing on a track in a track list. I.e. the track will be added to the end of the current playlist and a popup displayed notifying the user of this.

3.10.2. Inbox Playlist Recommendation Message Arrived

When a member sends this user a playlist a message will appear in the Inbox with:
  mail.from_customer_id
  mail.kind=PLAYLIST RECOMMENDATION
  mail_attachment.playlist_id If the user opens a message by selecting it then a message screen is displayed with the following fields:
  mail.from_customer_id
  customer_preference.avatar_image_id
  mail.sent_date
  mail.body
  mail_attachment.playlist_id 3.10.3. Inbox Friend Request Message Arrived When another member makes a friend request to this member then a message will appear in this member's inbox. When opened they have chance to approve or deny it. We do this within a popup since the user is being asked for interaction. The message heading displays:
  customer_to_customer_request.to_customer_id
  customer_to_customer_request.fiend_status=REQUESTED
  Opening the message displays:
customer_to_customer_request.to_customer_id
customer_to_customer_request.body
  Selecting continue displays a pop-up with the options:
  Approve—only displayed if Friend Request highlight (don't grey out since for vast majority of Inbox items this option is not relevant)
  Deny—only displayed if Friend Request highlight
  Block—only displayed if Friend Request highlight
  Report Abuse—only displayed if Friend Request highlight
  The users response is stored in:
  customer_to_customer_request.response (APPROVED, DENIED, BLOCKED, ABUSED)

3.10.4. Inbox Friend Request Response Arrived

When a member responds to a friend request from this user then that response will appear in this member's inbox. There are three possible responses that this member will see depending on whether the other member accepted, denied or blocked the friend request:
  customer_to_customer_request.friend_status The table in FIG. 43 shows the title, content and result of the responses.

3.10.5. Inbox Text Message Arrived

A text message is similarly displayed in the Inbox and the relevant fields are:
  mail.from_customer_id
  customer_preference.avatar_image_id
  mail.sent_date
  mail.body 3.11. General Message Alerts and Expiry 3.11.1. Message Alerts When a message or messages arrive for a member then we display one of the small popups at the base of the screen. The popup will be displayed once for each group of messages that arrive, and can be displayed as soon as the server has passed those messages to the client. The next messages will be checked for and displayed 2 seconds after the client has snapped back to the Now Playing screen so as not to interrupt the user flow. If there is no Current Playlist then the popup is displayed 2 seconds after when the client would have snapped back if there had been a Current Playlist.

After one popup has been read and acknowledged then if any more messages arrive during this session then another popup will be displayed.

Messages sent while this member was offline will therefore likely be displayed soon after they start the application.

3.11.2. Message Expiry

Read messages will be expired 1 day after they have been read.

Unread messages will be expired 5 days after the user has been alerted to their existence.

Unread messages will be expired 30 days if the user has not been in the application and hence not been alerted to their existence.

Expired messages will be removed from the Inbox at a convenient time. It is not essential that the expiry periods are adhered to exactly. For example they might be removed from the Inbox at the start of the next session after their expiry. An additional field is therefore defined for the date mail is received:

customer_mail.received_date

4. Graphic User Interface (GUI) Features

Appendix 1 describes the GUI.

5. Communications Architecture 5.1. mCom 5.1.1. Overview

MusicStation client applications are required to connect to the MusicStation server to download and upload various data. The protocol that MusicStation uses to connect to the server must be capable of being implemented on a variety of client technologies, e.g. Java, Symbian, and Windows Mobile. It must also solve the issues documented in the document "Connected MusicStation Issues and Requirements"

5.1.1.1. Protocol History

MyFone used HTTP to transfer data. This experience showed up several issues with the HTTP request and response having to pass through operator gateways. Operator gateways and various mobile phones regularly interfered with the HTTP headers, usually by failing to forward them. This is one of the key factors that led to the creation of this protocol.

To transfer several files in one response, this protocol took inspiration from MIME. An earlier revision of this document used MIME like boundaries to separate the different files in the response. This was changed to use the offset and length notation in the header. This allows a client to quickly access the data objects. Only the header needs to be parsed, and not the body contents. (see section 3.2.7)

Previously status codes used a binary representation to allow them to be extensible whilst still being understood by older clients. This has been simplified to use integer values that can be easily understood by humans as well as by the client. The server sending the most appropriate status code to the client addresses the issue of introducing new status codes. The server will only ever send status codes that the connected client version understands.

It was previously not possible to uniquely identify acknowledgments if the same file had been requested several times in a session, or if the acknowledgement was sent in a different session to the session that the data file was sent in. The acknowledgement id principle used in Sent and Put lines solves this issue.

5.1.1.2. Protocol Overview

The client must initiate all communication because of the way in which mobile phones connect to the internet. As the mobile phone does not have a static IP address, and because it will usually connect via a mobile operator gateway there is no way for the server to initiate the communication. MIDP2.0 handsets could use the Push Registry functionality to send an SMS to the application requesting that the client makes a request to the server, but this functionality may not be available on all target handsets and client platforms, so therefore the MusicStation protocol should be based upon the client initiating the communication.

The protocol must be able to run over HTTP and TCP/IP socket connections. These are the two most commonly available connections made available to us by the client platforms.

The protocol will assume a reliable transport layer. The protocol will not need to be able to re-request individual packets of a particular response. Therefore UDP socket connections will not be a supported transport mechanism. To support an unreliable transport layer would require a lot of extra functionality in the MusicStation protocol and TCP is available on all clients that have UDP.

The protocol must be able to support the client transferring data to the server as well as the client making requests for data from the server. This is required so that error data, logging data, usage data, playlist information and user related data can be transferred from the clients to the server.

As the MusicStation is a request/response protocol it is modelled closely on HTTP, borrowing several of HTTPs features.

The MusicStation protocol is text based using the ASCII character set only, this is so that it can be implemented on many different client platforms without any of the encoding issues associated with binary data.

Figure 44:
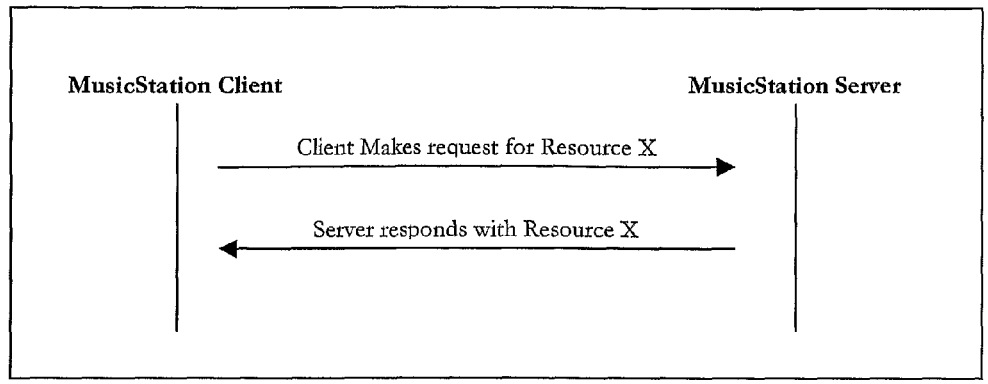
FIG. 44 is Request/response flow between client and server.
Figure 45:
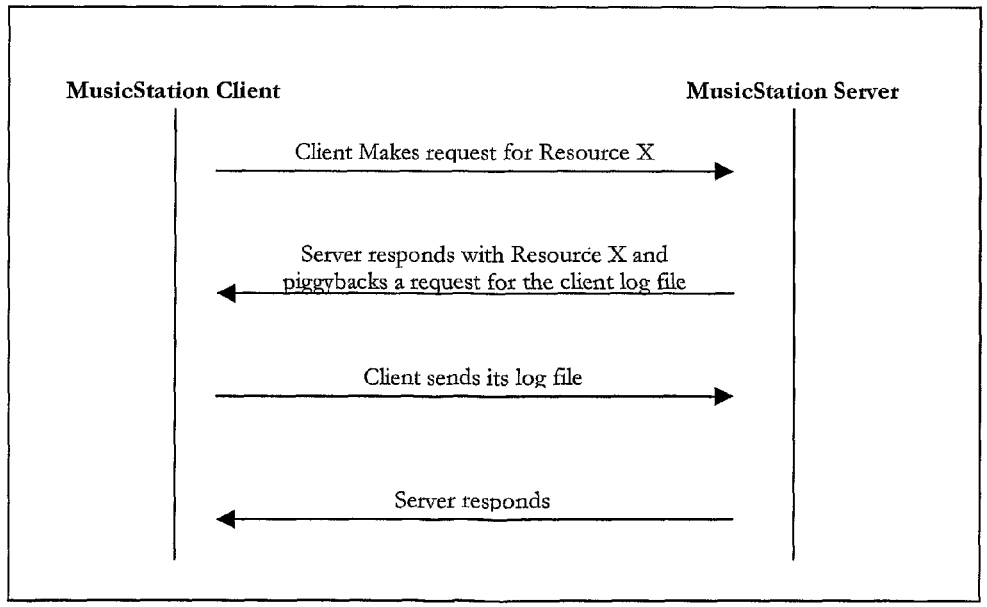
FIG. 45 is Server sending a request to the client.

The diagram below shows the request/response flow between the client and the server. This is an example of a simple request from the client being fulfilled by the server. All client/server communication happens in this same basic way. See FIG. 44 Request/response flow between client and server The next diagram shows how the server sends a request to the client. As the client/server communication must always be triggered by a client request, the only way for the server to make a request from the client is for the server to piggyback the request on a response it sends to the client. See FIG. 45 Server sending a request to the client.

Note that in normal operation the server will always respond to a client request, even if there is no data in the response. The response may include just a status code (see 'The Server "Response" protocol' section).

Robot clients and requests exceeding a requests per minute threshold are not normal operation, and the server has no obligation to respond to these requests. Real clients that do not receive a server response are expected to retry the request after a reasonable time.

Like HTTP the MusicStation Protocol uses a header to hold the meta-data about the body of the message, which contains the actual data being transferred. This document describes the protocol, which is concerned with just these headers. The body of the message can differ for the various client implementations. Like HTTP the header and body are separated by an empty line.

5.1.2. The Client Request Protocol 5.1.2.1. Header 5.1.2.1.1. The Protocol Identifier The first part of any request will be the protocol identifier. This is so that the server receiving this request can validate that the data it has received is indeed from a client. The protocol identifier should be short so that it does not put an overhead on the request. The protocol identifier used by MusicStation is:
MSTP
This stands for MusicStation Transfer Protocol.
5.1.2.1.2. The Protocol Version Number Along with the protocol identifier is the protocol version number. This protocol identifier is entirely separate from the client version number, the server version number and the data objects used by the client version number.

There can be many different versions of the client application that will all use the same protocol version number.

The protocol version number will be in the form major.minor

The minor number should be increased for incremental changes to the protocol, and the major number should be increased with significant changes to the protocol. Initial development versions of the protocol will have a major number of 0. This will be incremented to 1 on the first production release of the protocol.

The server software should always be able to handle every released version of the protocol so that it is backwardly compatible with all older client versions.

The protocol version number will be on the same line as the protocol identifier, and separated from the protocol identifier by a forward slash.
MSTP/0.1
This line indicates that this is version 0.1 of the MusicStation protocol.
5.1.2.1.3. The Request Identifier Each request sent by a MusicStation client will include an identifier. This identifier must be unique to this request in the current session. There is no requirement for the request identifier to be globally unique. This request identifier can be any string up to 32 characters long.

This could be implemented as an integer starting at 1 and being incremented for every request made by the client.

This request identifier is required so that the server can identify duplicate requests from clients. MyFone experience has shown that mobile phone client requests can sometimes be very unreliable. This means that the client must be able to automatically retry a request if it has not received a response within a reasonable amount of time.

When the client has not received a response, this could be because the request never got as far as the server, or it could be because the server's response got lost in the operator gateway on it's way back to the client.

By including the request identifier it is straightforward for the server to identify duplicate requests.

The client must send the same request identifier for any re-tried requests.

The request identifier can come at any point underneath the request identifier and request version number.
MSTP/0.1
RequestId: 123456
This identifies a request by this client. If the client retries this request, the request id in the retry must by 123456.
5.1.2.1.4. Client Name and Version Number Every request must include the client name and version number. This information can then be used on the server to perform a look up of the abilities of this client. This means that new abilities can be added at any time to the client without having to change the information given in the protocol.

For example, if a client identifies itself as the MIDP version 0.4.6 client, then the server knows which format it need to return the data objects in. The server also knows what music encoding is supported by this client. And the server knows that this client does not support encrypted music files.
MSTP/0.1
RequestId: 123457
Client: MusicStation 0.4.6 MIDP Nokia/N70
This identifies the client as the Java client version 0.4.6 running on a Nokia N70 handset. The server can then look up which abilities this client has.
The format of this string:
"MusicStation" [major].[minor].[micro] "Variant name" "Platform identifier"
See FIG. 46 for details.
5.1.2.1.5. User's Globally Unique Identifier Every request must include the user's globally unique identifier. The one exception to this is the initial registration request. If a request does not include the user's globally unique identifier, then the server will respond with notification that the client is required to register.

This globally unique identifier allows the server to lookup various information about the user.

The client should not construct the globally unique identifier. The identifier will be created by the server during the registration process, and then assigned to the client. The client must then include this identifier in every subsequent request.
MSTP/0.1.
RequestId: 123458
Client: MusicStation 0.4.6 MIDP Nokia/N70
UserGUID: AB12YZ
This identifies the user with the Globally Unique Identifier AB12YZ. The server can use this information to look up user details such as preferred language, territory, operator and branding.
5.1.2.2. Data Requests
5.12.2.1. Basic Data Request Most of the requests from the client will be a request for data from the client. For example the client may request the latest news from the server.
MSTP/0.1
RequestId: 123459
Client: MusicStation 0.4.6 MIDP Nokia/N70
UserGUID: AB12YZ
Get: inbox.data
This is an example of a request for the inbox.data data object file.
5.1.2.2.2. Data Request with Path Information Data requests may also have path information associated with them. This uses a syntax similar to HTTP URLs. A/(forward slash) character is used as a directory separator.
MSTP/0.1
RequestId: 123459
Client: MusicStation 0.4.6 MIDP Nokia/N70
UserGUID: AB12YZ
Get: games/namethattune/question.data
This is an example of a request for the question.data data object file which has the path games/namethattune.
5.1.2.2.3. Data Request with Query Data requests may optionally include parameters that the server will use to construct the data object to be returned to the client. This request data is included by using HTTP query string syntax.
MSTP/0.1
RequestId: 123460
Client: MusicStation 0.4.6 MIDP Nokia/N70
UserGUID: AB12YZ
Get: advncedSearch.data?type=artist&query=artist%20name&country=uk&language=en This is an example of a request for the advanced search results. The requested resource has a ? (question mark) character to separate the name of the requested resource from the parameters for this resource. The parameters are name/value pairs. Each name/value pair is delimited by a & (ampersand) character, and the name and value part are separated by an = (equal sign).

The values have been URL encoded, so that the space character in the search term "artist name" has been replaced by the URL encoded version %20.

5.1.2.2.4. Data Request with Multiple Requests

The client may request multiple resources from the server at the same time. To do this, the client sends several GET lines, one for each resource requested.

MSTP/0.1
RequestId: 123461
Client: MusicStation 0.4.6 MIDP Nokia/N70
UserGUID: AB12YZ
Get: inbox.data
Get: charts.data This is an example of a request for the inbox.data file and a request for a charts.data file. A situation like this may occur when the client is making a request for a resource it requires immediately (in this example inbox.data), and is also required to update a resource in the background (in this example charts.data).

The GET lines should be ordered in the priority that the client would like the receive the resources in the server response.

Occasionally the client may have a partial response cached, and require only some of the data returned from the server. In cases like this, the client may want to make a request for only a certain part of the data.

The client can do this by using the range parameters on a GET line. The range parameters are separated from the requested resource name by a; (semi colon) character.

If there is more than one range parameter then the range parameters are separated by a; (semi colon) character.

The range parameters are from and to. Both of these should be followed by an = (equal sign) character, and then an integer number of bytes.

5.1.2.2.5. Partial Data Request

Below is an example of a partial request for the inbox.data file. The client is requesting all of the inbox.data file from the 34th byte onwards.

MSTP/0.1
RequestId: 123462
Client: MusicStation 0.4.6 MIDP Nokia/N70
UserGUID: AB12YZ
Get: inbox.data; from=34

Below is an example of a partial request for the inbox.data file. The client is requesting all of the inbox.data file from the 128th byte up until the 256th byte.

MSTP/0.1
RequestId: 123463
Client: MusicStation 0.4.6 MIDP Nokia/N70
UserGUID: AB12YZ
Get: charts.data; from=128; to=256

When making a range request, the client should not expect the returned data to be of the range asked for. The server response will include the details of the range returned, and the client should use the range information in the server response, and not the range information in it's own request for further processing. This is because the server may have a reason for returning a different range of data. For example if the data has changed since the client last requested it.

5.1.2.3. Sending Data to Server

On occasions the client may need to send data to the server. For example, to send error information to the server. The client can do this by using the put line.

A Put line has several parts. Each part is separated by a; (semi colon).

Put: error.data; ackId=1; offset=0; length=160; type="application/octet-stream"

where: see FIG. 47 for details of error data.

This is an example of the client sending error data to the server. See FIG. 48.

The block of zeros and ones signifies the body of the message. This is the binary data that is being transferred by this protocol. The format of this data is outside the scope of this protocol because the format will differ depending on the client implementation technology.

The data in the body starts at position 0, and has a length of 160 bytes. The offset and length values in the Put line reflect this information.

The content type in the Put line tells the server how to interpret this data.

5.1.2.3.1. Send Data with Multiple Puts

The client may be required to send multiple resources to the server at the same time. In a similar way to using multiple Get lines, the client may send multiple Put lines.

See FIG. 49 for an example of the client sending error data and a photo to the server.

In the body of the request, the error data is shown in bolder text to the photo data. The length and offset positions in the request tell the server the offset into this data, and the length of the data.

5.1.2.3.2. Send Data with Parameters

In a similar way to the Get line, the Put line also supports parameters on a Put.

The syntax for this is the same as the Get line syntax, which is modelled on the HTTP query string syntax.

In FIG. 50 is an example of the server sending a Jpeg photo with a single parameter (name="Fave Tracks").

Note, although the Put line is very similar to the Get line, the Put line does not support the range values From and To. A failed Put will require a full resend of the data. The client will know whether the Put has failed because it will not receive an acknowledgment receipt from the server (see 'The server "Response" protocol' section)

5.1.2.3.3. Client Acknowledgements

So that the server can always have perfect knowledge of what data exists on each client, the client is required to acknowledge the receipt of every piece of data sent to it by the server. This is done by sending one Ack line for each data file successfully received and stored.

The Ack line parameter is the ackID assigned by the server when it sends the file.

MSTP/0.1
RequestId: 123466
Client: MusicStation 0.4.6 MIDP Nokia/N70
UserGUID: AB12YZ
Ack: 2006061911030001CHARTS This request shows the client acknowledging that it has successfully received and stored the data file which had an assigned acknowledgment id of 2006061911030001CHARTS.

The client must only acknowledge fully received files. It must never acknowledge partially received files. If a client partially receives a file, it should make a Get range request for the rest of the data. Once all of the data has been received and stored, the client can then send the acknowledgement for this data.

5.1.2.3.4. Client Acknowledgment with Multiple Acks

A request may include multiple acknowledgement lines.

MSTP/0.1
RequestId: 123466
Client: MusicStation 0.4.6 MIDP Nokia/N70
UserGUID: AB12YZ
Ack: 2006061911030001CHARTS
Ack: 2006061911030001INBOX This request shows the client acknowledging that it has successfully received and stored the data files with acknowledgement ids of 2006061911030001CHARTS and 2006061911030001INBOX.

5.1.2.3.5. Not Acknowledged Notification

If the client does not successfully receive and store a data file it has requested, it should send a Not Acknowledged notification to the server.

MSTP/0.1
RequestId: 123466
Client: MusicStation 0.4.6 MIDP Nokia/N70
UserGUID: AB12YZ
Nak: 2006061911030001CHARTS This request shows the client telling the server that there was a problem with the receiving or storing of the data file with acknowledgement id 2006061911030001CHARTS. The server will now know that this file does not exist on the client.

Usually when the client sends a Nak, it is very likely to have some accompanying error data that explains the reason for the Nak. If the server receives a Nak, and no error data, it may want to ask the client to send the log file details. If the client persistently sends Naks to the server, the server may want to increase the logging level on the client to help identify the cause.

5.1.2.4. Session Identifier

Each request the client sends to the server should include a session identifier. The client should not remember this session identifier between restarts. On the first request after starting up, the client should not include a session identifier. The server will respond by sending back a new session identifier. The client should then include this identifier in every subsequent request until the user closes the client.

MSTP/0.1
RequestId: 123467
Client: MusicStation 0.4.6 MIDP Nokia/N70
UserGUID: AB12YZ
SessionId: FJSKNBKSKSDKFLSH
Get: inbox.data This request shows the client has previously been assigned a session identifier of FJSKNBKSKSDKFLSH.

For more details on how the client gets this session identifier see the 'Server "Response" protocol' section.

5.1.3. The Server Response Protocol
5.1.3.1. Header
5.1.3.1.1. The Protocol Identifier The protocol identifier used in the server response should be identical to the client request protocol identifier. Clients should check this identifier so that they know the response if in the MusicStation Protocol format.

The protocol identifier used by MusicStation is:
MSTP

5.1.3.1.2. The Protocol Version Number

The server can support many different versions of the protocol at the same time. The server should always respond with the same protocol version number as the client used in the request. This is because this is the only protocol version number the server can be sure that the client supports.

Along with the protocol identifier, the client should check the protocol version number in the response to so that they know the protocol version being used is a version that they understand.

MSTP/0.1

This is an example of the server sending the MusicStation Transfer Protocol identifier and using protocol version number 0.1.

5.1.3.1.3. Response Status Codes

With each response the server will send a status code. The status codes are shown in FIG. 51.

The status codes are always 4 digits. This is to allow enough codes to allow for future expansion. 3 digit codes have not been used to avoid confusion with HTTP status codes.

The status codes are extensible, new codes can be added at any time. The server will make sure that clients are only ever sent status codes that the client understands.

The status codes are grouped into 2 sections. Codes starting with the digit 1 (i.e. 1000-1999) are to be used for codes relating to a successful operation. Codes starting with the digit 2 (i.e. 4000-5999) are to be used for a failed operation.

Within the failure range of codes, there are two further groups. Codes starting with the digits 4 (i.e. 4000-4999) are to be used for failure when the client is at fault. Codes starting with the digit is 5 (i.e. 5000-5999) are to be used for failure when the server is at fault.

This example below shows a successful response from the server.

MSTP/0.1
StatusCode: 1000

5.1.3.1.4. The Response Identifier

So that the client can verify that the response it receives is in response to the request it made, each response from the server will echo the client's request identifier.

MSTP/0.1
StatusCode: 1000
ResponseId: 234567

This example shows the server response to the client request with a request id of 234567.

5.1.3.2. Setting the Session Identifier

The first request from the client each time it is started up will not contain a session identifier. The server should respond to this request with a newly assigned session identifier.

MSTP/0.1
StatusCode: 1000
ResponseId: 234568
SetSessionId: FJSKNBKSKSDKFLSR

This response shows the server setting the session id to FJSKNBKSKSDKFLSR.

If the client receives any response with a SetSessionId line, then the client must start using the new session id immediately. There may be cases where the server assigns a new session id to a client that already has a session id. For example this could happen when the session has timed-out on the server.

5.1.3.3. Sending Data

Most responses from the server are likely to include at least one data object file. Theses data files are sent in the body of the response.

For each Get line sent in the request by the client, the server should return a Sent line.

The server must generate an acknowledgement id that it sends along with the data. This is so that when the server receives an Ack line, it knows which data is being acknowledged. It is the servers responsibility to generate these acknowledgement ids in a way that uniquely identifies the data file sent.

The Sent line must include the byte offset position into the body of data where the client can find the data, it must also include the length of the data and the content type of the data. Byte offset and length are used in the MusicStation protocol because they make for relatively straightforward processing. This has been used in preference to a boundary parameter as used in multipart MIME.

This response in FIG. 52 shows the server sending the news1.data file.

5.1.3.3.1. Sending Multiple Data Files in a Response

The server may also send multiple data files in a single response. This is done with multiple Sent lines in the same way as the client sends resources to the server with multiple Put lines.

The response in FIG. 53 shows the server sending the news2.data and news3.data files.

In the body of the response the data is shown in bold text. The client knows which body data is for which data file because of the offset and length parameters on the Sent line.

5.1.3.3.2. Partial Data Request

If a client request was for a certain range of data, and the server sends only this range of data, then the server response must indicate which range of data has been sent. See FIG. 54.

This response shows that the data returned at is the data from byte 160 to the end. There are 40 bytes of this data, and they are positioned at 0 bytes into the body of the data (i.e. the start of the body).

Note that the offset value is an index into the body of the data and is not to do with the range values.

The range to value may be used in a Sent line to show that the data in the response does not go to the end of the data file.

The client should always read the response headers and use these to process the data rather than the client sent request headers. This is because the range requested might not be the range returned if the server has a reason to return the full data file.

5.1.3.3.3. Push Data to the Client

The server may also send Sent lines for data it wants to push to the client. This is done by the server sending a Sent line that the client had not sent a corresponding Get line in the request. See FIG. 55.

This response shows the server sending the news1.data and the command.data file. Any pushed data should always follow the requested data in the response body.

5.1.3.4. Acknowledgements

5.1.3.4.1. Acknowledging Received Data

When the client sends data to the server (for example error data), the server must acknowledge the receipt of this data so that the client knows the server has successfully received this data.

MSTP/0.1

StatusCode: 1000

ResponseId: 234569

Ack: 3

This response shows the server acknowledging the receipt of the data file which the client sent in a Put line and the client assigned a acknowledgment id of 3.

5.1.3.4.2. Sending a not Acknowledged Notification

Equally the server can negatively acknowledge the receipt of the data if there has been an issue receiving or storing the data. This will allow the client to resend the data.

MSTP/0.1
StatusCode: 1000
ResponseId: 234569
Nak: 4

This response shows the server acknowledging the failed receipt of the data file which the client assigned an acknowledgement id of 4.

5.1.3.4.3. Acknowledgment Requests

If the server has sent data to the client, and then in the next request with a different request id from the client the server did not receive an acknowledgement for that data, then the server can ask the client to acknowledge whether it has received the data or not.

This is done by the server sending anAckRequired line in the response.

MSTP/0.1
StatusCode: 1000
ResponseId: 234574
AckRequired: 20060619111230NEWS2

This is an example of the server asking the client to acknowledge the data file that was previously sent with an acknowledgement id of 20060619111230NEWS2.

Note that the server is not required to ask for acknowledgements of data files, the client should send the automatically. The AckRequired line is used when the connection is less than perfect and a previously sent acknowledgement from the client has not reached the server for some reason.

5.1.4. Connection Levels

Clients will have varying levels of connection speed, reliability, bandwidth and latency.

Each client data object request will have a predefined priority level associated with it.

The client will dynamically change it's connectivity level threshold based upon the available bandwidth and the number of successful connections.

The priority levels are

IMMEDIATE—The client must send this request immediately, and not queue this request. This should be used for requesting data objects that are required to show the screen requested by the user.

SOON—This client may send this request immediately if the network speed/bandwidth is available. This information is useful to the server in deciding what data objects to push to the client.

WHENEVER—The client does not need to need to send this information to the server in any time critical period. The server needs to be informed of this information, but the data can be sent along with the next request.

The client can calculate its bandwidth based upon the time it takes to transfer a large amount of data. This is probably best done when transferring an audio file.

The client can calculate its connectivity threshold based upon the bandwidth and the number of successful connections, and the number of connections that are interrupted to send a higher priority request.

Clients with a good connectivity will have a connectivity threshold that allows all messages of priority SOON or above to be sent immediately.

Client with a poor connectivity will have a connectivity threshold of that only allows IMMEDIATE messages to be sent immediately.

5.1.5. Command Data Objects

In MusicStation MIDP 0.4.6 the only data objects that exist are content data objects. A new type of data object is required in the connected MusicStation version. These are required so that the server can request or send various data to the client. These data objects are sent by the MusicStation Transfer Protocol, but are not part of the MusicStation Transfer Protocol. They are not part of the protocol because different command objects will be used for different client implementations, but the same transfer protocol will be used for all implementations.

5.1.5.1. Server Command Data Objects

In addition to content data objects and image files the server needs to be able to send the following commands to the client Please send total file space size to the server.
Please send remaining file space size to the server.
Please send log file to the server.
Please send errors to the server.
Please change client logging level.
Set property.
Get property.
Please delete a file.
Please send details of what files you have.
Please send bandwidth details.
Please change connection level.
Please request data file.
Please request audio file.
Registration data.

Items are likely to be added to this list as new functionality is added to the client and server.

It's worth noting that the server will frequently be more aware of the client's connection details than the client is. For example a MIDP client on a Nokia N80 has no way of knowing whether the HTTP connection is via an operator gateway, or whether it's via a Wireless LAN. The server will know whether the client connection is via an operator gateway because the connection will be coming from a known operator IP address range.

5.1.5.2. Client Command Data Objects

The client needs to be able to send the following data to the server

Playlist data.
Image files.
Total file space.
Available file space.
Log file data.
Current logging level.
Error info.
Info on which files have been deleted to free up space for other files.
Current bandwidth level.
Data file used.
Screen shown.
Property value.
Current client time.
Registration data.

5.1.5.3. Timings

The server will be recording the time that various client events have occurred.

Clients should report times to the server in the number of seconds since midnight GMT on 1 Jan. 1970.

For Example, in MIDP1.0, this can be obtained by:
Calendar.getInstance(TimeZone.getTimeZone("GMT")).getTime( ).getTime( )

The MIDP specification says that the GMT timezone must be supported, but if for some reason it is not supported, then the handset can simply use
(new Date( )).getTime( ) to get the client time.

Each client stores timing data using it's own time settings. When this data is transferred to the server, the server can then convert and store these event timings in it's own format.

The server will do this by comparing the clients local time, with it's own time. The delta between client reported times and server times can then be calculated.

The current client time command object must contain the time that the data is sent to the server so that the server calculated time is as accurate as possible.

5.2. Client Data Synchronisation

5.2.1. Introduction

Most screens in MusicStation are populated by data. This data is transferred from the server and stored locally in files on the client. When data on the server changes the files on the client need to be updated to reflect those changes. Also, the user is able to create and modify files on the client, for example adding tracks to a playlist. These changes need to be reliable communicated back to the server.

The user can also make changes to data through Music-Mate. These changes may conflict with changes made on the device. The client and server need to be able to synchronize their data and the server will handle any conflict resolution.

5.2.2. Data Objects

Data Objects are the basic unit of object that is passed between the server and client and client and server. They encapsulate the representation of some entity that is displayed within the client interface (such as an artist, album, etc) or data and needs to be sent back to the server (like a user-defined playlist). They are passed between the server and client and are stored securely on the phone. Data objects can be delivered to the client by the server at anytime that it needs to update something on the client.

The data objects are able to write themselves to a file and these are used to transfer data between the client and server. The file header contains the data object version used to write the file. The latest versions of the data objects are able to read and write files in all supported versions. The version is passed to each read and write method and this allows us to switch what gets read or written based on the version.

Using this method the server is able to write data object files for older versions of the client. The target version is set in the file header and then each write method ensures that the output is in the format for that version.

The server is also able to read files written by an older client using the same method. When the file is read into the data object the read method uses the version to switch what attributes are read from the file.

Data objects contain the data used to populate screens in MusicStation. They use methods that allow them to write and read themselves to and from a file or stream. They are used to transfer data between the client and server and to load and store data locally in files on the memory card.

5.2.2.1. Data Object Groups

Figure 56:
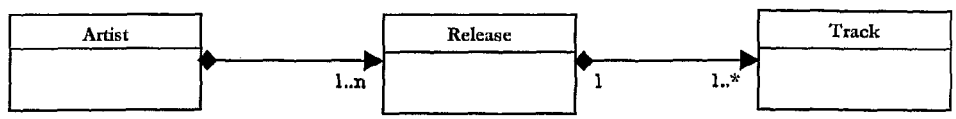
FIG. 56 shows that Artist data object which contains a collection of Releases. In turn, a Release contains a collection of Tracks.

A data object can contain a collection of other data objects, for example an Artist data object contains a collection of Releases. In turn, a Release contains a collection of Tracks. See FIG. 56.

Data object can also store lists of objects, for example ArtistGroup stores a list of Artists. The 'My Artists' screen uses an ArtistGroup data object to display all artists owned by the user. Because Artist contains Releases and a Release contains Tracks, Artist and Release are also data object groups.

5.2.2.2. Data Object Views

A data object view provides a sorted and filtered view of a data object group. All screens in MusicStation that are populated by data are backed by one or more views. Any changes to a data object group are propagated to the view, which is responsible for updating the screen to reflect these changes.

This allows us to display a screen immediately before a data object is loaded. As the data object is loaded in the background these changes result in updates to the screen, for example the list of Artists on the 'My Artists' screen grows as each Artist is loaded.

5.2.3. Data. Object Files

Each data object group is stored locally in a file. For example, the 'My Artists' ArtistGroup is stored in its own file. If the user owns 100 artists, each with an average of 2 albums* containing 10 tracks this data object soon becomes very large. When this ArtistGroup object is written it will create a large file and when it is read back from the file it will take a while to populate.

Figure 57:
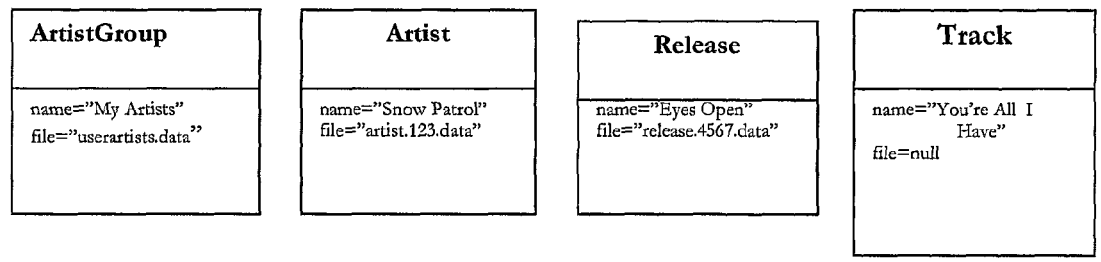
FIG. 57 shows that an alternative method is to store each collection of objects in its own file. So in our 'My Artists' example the list of Artists is stored in a file (userartists.data) but the list of albums for each artist is not. The list of albums is stored in a separate artist file, one for each artist (e.g. artist.123.data). Each album is then stored in its own file (release.4567.data) that contains the tracks.

*The user doesn't have to own both albums but both albums exist in the artist data object An alternative method is to store each collection of objects in its own file. So in our 'My Artists' example the list of Artists is stored in a file (userartists.data) but the list of albums for each artist is not. The list of albums is stored in a separate artist file, one for each artist (e.g. artist.123.data). Each album is then stored in its own file (release.4567.data) that contains the tracks. See FIG. 57.

Figure 58:
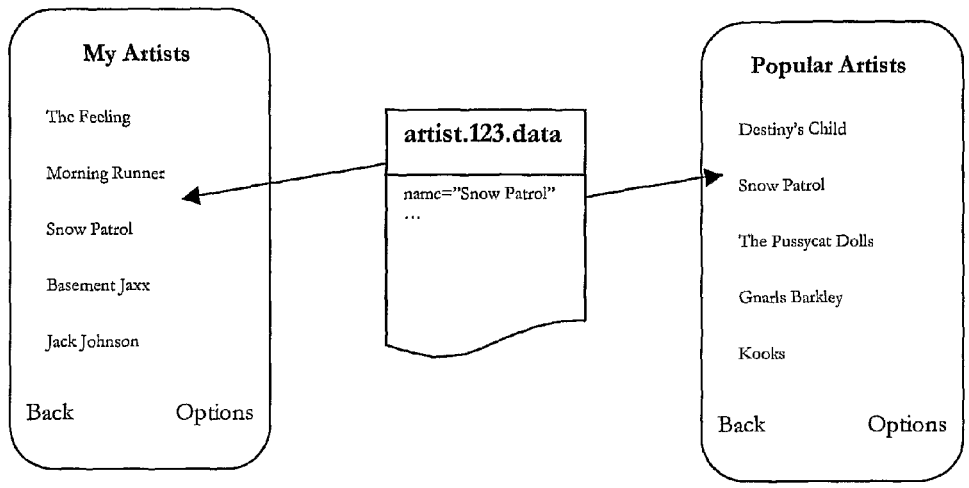
FIG. 58 shows how object groups can use the same data object without having to duplicate the data.

Because each data object is stored in its own file, object groups can use the same data object without having to duplicate the data. For example 'Snow Patrol' are in the 'My Artists' group and the 'Popular Artists' group. If the user buys 'Chasing Cars' from the 'Eyes Open' album we only have to update the 'Eyes Open' album data file. When the user navigates to 'Popular Artists' then 'Snow Patrol' the screen will show that the user has bought 'Chasing Cars'. See FIG. 58.

However this approach presents its own set of issues. Because the 'My Artists' data file only contains a list of artist ids, we need to open each artist file and read the name of each artist to populate the 'My Artists' screen. There are several major problems with this approach. Firstly, we need every artist file stored locally so any missing files need to be downloaded from the server. Without these files we are unable to display the artist names. Secondly, it's relatively expensive to open a new file connection for each artist in the list so this approach will be slow.

Figure 59:
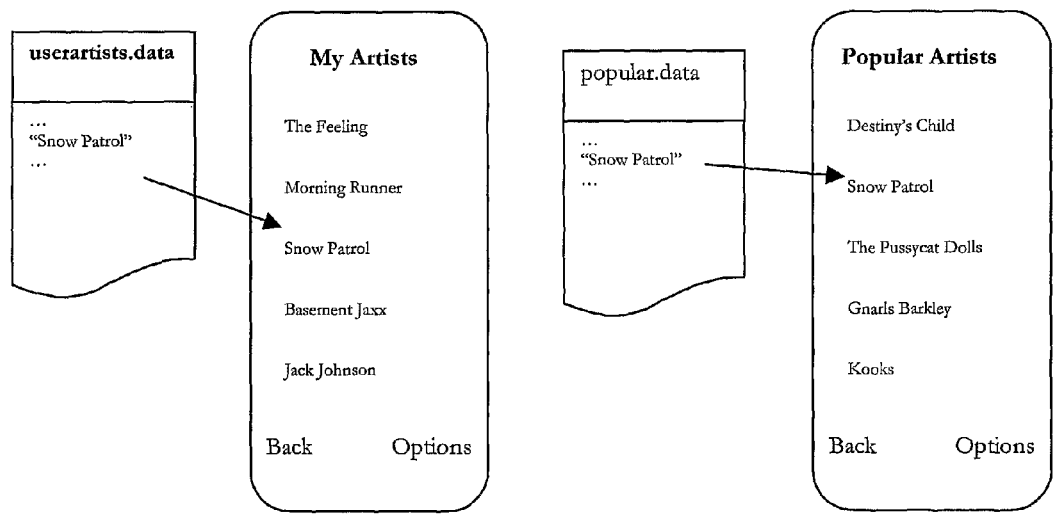
FIG. 59 shows that one can store the artist name as well as the id in the 'My Artists' data file.

To avoid this we can store the artist name as well as the id in the 'My Artists' data file. This means we can build the 'My Artists' list quickly. However we are then introducing redundancy because the name is now stored in both the artist group data file and the artist data file. See FIG. 59

We also may want to sort or filter the list on another property. For example 'Search Results' show user owned artists at the top of the list. To do this we need the owner property as well as the name to display the list. This is more redundant data that we are adding to the group data file.

Because an object can be stored in many groups we need to be aware of this redundancy and make sure that either the client or the server takes responsibility for the updates. In general the server will be responsible for these updates and they will be transferred to the client in response to a client request. Whenever it is possible for these changes to occur when the client is offline, the client will take responsibility for propagating these changes. In these cases, the client will update the local files whether online or offline. For example when a customer modifies a playlist image, any playlist groups that contain that playlist must be updated.

5.2.4. Data Object Transfer

Data objects are transferred between the client and the server using the Connected MusicStation Protocol. It is expected that most communication with the client will be over HTTP therefore the client will be responsible for making the initial request.

5.2.4.1. Client Request

The client won't always know where objects are duplicated on the memory card. For example the Popular Artists' group was pushed to the client however the client has never opened 'Popular Artists' and is unaware that when the user buys 'Chasing Cars' by 'Snow Patrol' that the 'Popular Artists' data file needs to be updated to reflect this. However the server does have this knowledge because it built the 'Popular Artists' data file and sent this file to the client.

Figure 60:
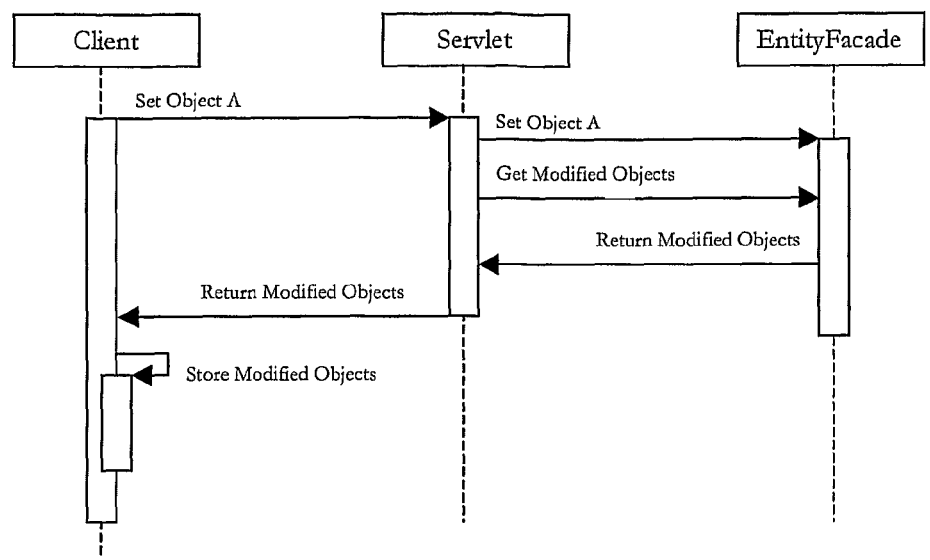
FIG. 60 is Client sets object and gets all modified objects.

For this reason the server is responsible for updating files on the client when records on the server are modified. When the customer purchases 'Chasing Cars' the server will calculate which data files on the client contain 'Chasing Cars' and therefore need to be updated. The server will then either push these updated objects with the purchase response or send commands to the client to update these files when it can. It is preferable that the response contains all data objects that have been modified as a result of the request. See FIG. 60: Client sets object and gets all modified objects.

5.2.4.2. Data Object Push

Figure 61:
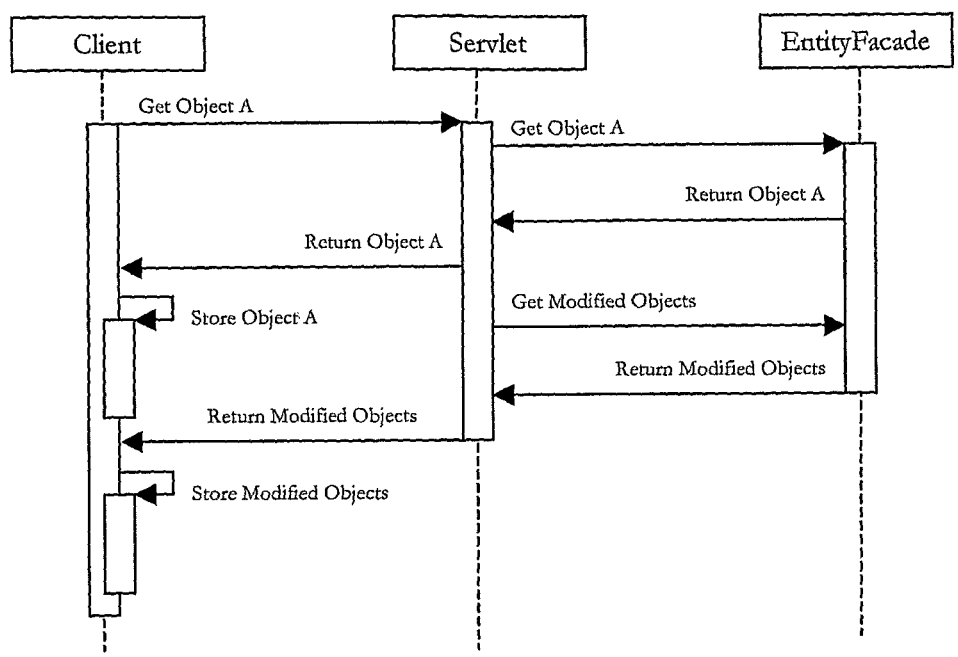
FIG. 61 is Client requests object and gets all modified objects.

When records are updated on the server whilst the client is offline and these changes need to be propagated to the client the server will push these to the client on the next request. For example, if the customer purchases 'Chasing Cars' from MusicMate, when the client next connects to the server any objects that need to be updated will be pushed to the client. See FIG. 61 Client requests object and gets all modified objects.

5.2.4.3. Offline Mode

When the client is offline, the customer is prevented from performing most actions that can modify data. For example, they are not able to buy a track.

Figure 62:
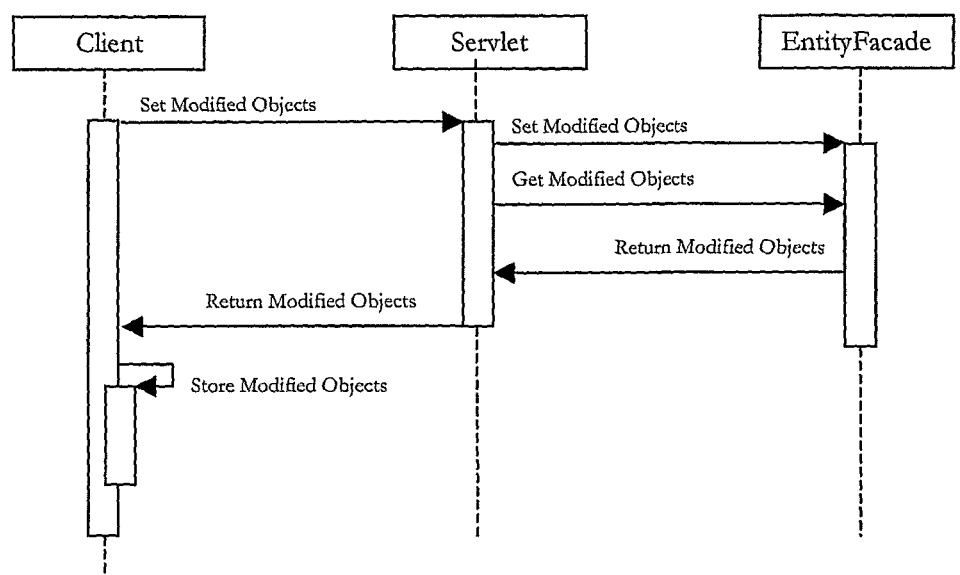
FIG. 62 is Client sends objects modified in offline mode.

However, they should be able to create, edit and share playlists. The client needs to maintain a list of files that have been edited on the client but have not been sent to the server. When the client is next connected it must send these files to the server. All changes made by the client are sent to the server when the client next connects. The server will then return any modified files to the client. See FIG. 62 Client sends objects modified in offline mode.

5.2.5. Change Log

The server maintains a list of objects that have been sent to the client. When one or more of these objects are modified on the server, the modified objects must be delivered to the client as soon as possible. Similarly the client maintains a list of objects that have been created or modified on the client and need to be updated on the server.

The object_change_log table is where changes that don't need to be sent immediately are stored. This is for general system wide changes such as adding a new artist. This table also handles merging changes made from several databases. These changes are communicated when a user session is next created.

Customer specific changes occur in customer object_change_log. These changes are communicated to the client immediately.

5.2.5.1. Server Objects

The changes to objects on the server are stored in the object_change_log table. Whenever a record is inserted, updated or deleted that may affect one or more object data files one or more records are inserted into this table. This table also allows for changes to made in a separate database, for example on a staging server, and then when the changes are imported the object_change_log is also imported. See FIG. 63 object change log.

The list of data objects that exist on the client are stored on the server in the customer_object table. Whenever a session is created for the client we query the customer_object and the object_change_log tables to determine which objects have changed for this customer. It is possible that this query could return several change records for a single object. In this case we only need to consider the last change record. The objects that have changed need to be returned to the client. See FIG. 64 customer object.

Objects that need to be returned to the client are inserted into the customer object_change_log table. Records may also be inserted into this table when changes occur for objects that affect only one customer. For example when the customer purchases a track and we need to update object data files that reference that track. See FIG. 65 customer object change log.

Whenever we receive a request from a client we'd like to return all modified objects in the response. In some situations (where bandwidth is limited or the objects are large) we may send a command to the client to request the modified objects later. In situations where many objects need to be returned to the client, the priority field is used to determine which objects are sent first.

To get the list of modified objects for a client we select from the customer_object_change_log table where acknowledgement_date is null.

At first glance it appears that the object_modified_date would be duplicated for each object_guid and could be separated into another table. However for performance reasons object data files on the client contain data from more than one table and an object may need updating on one client and not on another. For example, artist lists contain ownership information for each artist so that they can be sorted with user owned artists at the top. When a customer buys a track by an artist only that customer's artist list has been modified and needs to be updated.

One or more of the following methods could be used to update the object_change_log and customer_object_change_log tables:

Database trigger on a table could populate the object_change_log table when data was added, updated or deleted.

Batch process populates the object_change_log table for example on an import of new content data.

Entity Listeners or callback methods are used on EJB persist, update and remove events.

In most cases callback methods are the most appropriate however for large inserts, for example a data load, it may be more efficient to use another method.

5.2.5.2. Client Objects

The client must also keep a log of changes that need to be sent to the server. The client maintains this list in RMS. Each change is stored in a ChangeLogRecord object. See FIG. 66.

The objectGUID will be the same GUID used to identify the object on the server unless the client has added this object. In which case the client will assign a temporary GUID that will be used until the server updates the object with its new server generated GUID.

Whenever the client connects to the server it will send all of the objects in the change log. The server should respond with an acknowledgement for each object. When the client receives an acknowledgement it will then delete the corresponding ChangeLogRecord.

5.2.6. Conflict Resolution

When conflicts occur because the same object has been modified on the client and server the server is responsible for resolving the conflict. The server communicates the resolution to the client by sending it the updated object.

We'll attempt to minimize the number of situations where conflicts can occur by making the server responsible for most updates. Only in a few cases will the client be able to modify objects and send the changes to the server.

In the prototype the client modifications are limited to:
1. Create playlist
2. Edit playlist
3. Delete playlist
4. Edit customer profile (catchprase, icon)
5. Rate track When designing the conflict resolution strategy we need to bear in mind the following types of conflict:

Update conflicts occur when the update to a record conflicts with another update.

Uniqueness conflicts occur when the update to record violates a uniqueness constraint with a conflicting record.

Delete conflicts occur when a record is updated that has also been deleted.

5.2.7. Use Cases

Whenever an object is updated or deleted the object_change_log or customer_object_change_log tables must be updated to reflect this change. Because object data files on the client contain redundant data it's likely that a change will affect more than one object.

5.2.7.1. Server Changes 5.2.7.1.1. Artist Releases a New Album

The artist 'Snow Patrol' releases the album 'Eyes Open'. Every client that contains the artist data file for 'Snow Patrol' needs to be updated.

First we insert change records for 'Snow Patrol' and 'Eyes Open' into the object_change_log table. See FIG. 67.

When a customer who has the 'Snow Patrol' artist file connects to the server and a session is created the customer_data_object table is joined with the object_change_log table to find any objects that have been modified for this customer.

SELECT FROM customer_object, object_change_log
WHERE
customer_object.object_guid=object_change_log.object_guid AND
customer_object.deleted_date IS NOT NULL AND
customer_object.object_modified_date<object_change_log.object_modified_date;

This query returns the 'Snow Patrol' object_change_log record. This record is inserted into the customer_object_change_log table. See FIG. 68.

The customer_object.modified_date field is also updated to '18/07/2006 13:16:33'.

The 'Snow Patrol' data file is then sent to the client and the customer_object_change_log.acknowledgement_id field is set. When the client acknowledges the file then the customer_object_change_log.acknowledgement_date field is set.

5.2.7.1.2. Artist is Removed

The artist 'Cliff Richard' is removed from MusicStation. Every client that has stored the 'Cliff Richard' data file or has a list that contains 'Cliff Richard' needs to be updated.

The object_change_log table is updated and a deleted record is inserted for the following objects:
Artist
Artist.getAlbums( )
Artist.getLists( )
    Artist.getAlbums( ).getLists( )
Artist.getPlaylists( )

5.2.7.1.3. Customer Shares a Playlist

The customer decides to create and share a new playlist 'Sunday Stroll'. The client sends the new playlist to the server. Any changes are sent on the next request to the server. As you are browsing tracks to add to the playlist it is likely you are communicating with the server, and each time the changes will be sent.

When the Playlist object is created the object_change_log table is updated and a record is inserted into customer_object_change_log for every client that has the customer's data object file.

5.2.7.1.4. Customer Changes 1 Customer Shares a Playlist

The customer decides to create and share a new playlist 'Sunday Stroll'. The client sends the new playlist to the server. Any changes are sent on the next request to the server. As you are browsing tracks to add to the playlist it is likely you are communicating with the server, and each time the changes will be sent.

When the Playlist object is created the object_change_log table is updated and a record is inserted into customer_object_change_log for every client that has the customer's data object file.

5.2.7.1.5. Custome Customer shares a playlist

The customer decides to create and share a new playlist 'Sunday Stroll'. The client sends the new playlist to the server. Any changes are sent on the next request to the server. As you are browsing tracks to add to the playlist it is likely you are communicating with the server, and each time the changes will be sent.

When the Playlist object is created the object_change_log table is updated and a record is inserted into customer_object_change_log for every client that has the customer's data object file.

5.2.7.1.6. Customer Changes Language

The customer selects a different language. We'd like all files that contain language specific data to be updated.

Both the messages property file and editor captions need to be updated to reflect this change. Only playlists display editor captions on the client and so for any playlist on the client that has an editor caption a record is inserted into customer_object_change_log.

5.2.7.1.7. Customer Adds Track to Playlist Whilst Server Deletes Track

A user adds a track T to a playlist whilst offline. Meanwhile the server deletes track T.

When T is deleted a record is inserted into object_change_log. When the client sends the updated playlist we'll compare the changes with the records in object_change_log and delete the track from the playlist and send it back. The customer won't be informed of this, the track will just disappear.

5.2.7.1.8. Customer Adds Track to Playlist Whilst Server Renames Track

A user adds a track T to a playlist whilst offline. Meanwhile the server renames track T.

When T is renamed a record is inserted into object_change_log. When the client sends the updated playlist we'll compare the changes with the records in object_change_log and rename the track on the playlist and send it back 5.2.8. Device Memory Management The device is able to communicate to the server how much memory there is left for storage.

The server will use this information to decide if any files should be deleted from the client when delivering updates.

The object_last_used field in the customer_object table stores the date the client last used a particular object. This field is populated from log data sent from the client to the server. The server uses this data to determine which files should be deleted. The server may also use other methods to predict which files should be deleted, for example a story no longer exists in any list.

The client also maintains a list of last used files and is able to delete these itself before it runs out of memory. This list is stored in RMS and references files by relative path and filename. The path and filenames will be short because we intend to remove any meaning from the names. This acts as a safety valve in case there's a problem with the deletion logic on the server.

5.3. Incomplete Downloads 5.4. Client Logging

We need to log user actions, events and exceptions on the client and send them to the server in order to:
Debug information during testing
Provide information for customer support
Collect usage data for reports and recommendations 5.4.1. Logger The Logger object is used to control logging on the client. It is a DataObjectSet and can be synchronized with the server using MSTP.

Logger contains the following attributes:
Level: The level at which logs are stored, events at a lower level are discarded
    DEBUG: Events that are useful to debug the application
    INFO: Informational messages that highlight the progress of the application
    WARN: Indicates that there's a potential problem
    ERROR: An error occurred but the application managed to continue
    OFF: Nothing is logged
Priority. Controls the frequency that logs are sent to the server
    MIN: When the client next makes a request to the server or when maxSize is reached.
    NORMAL: Every 5 minutes (or as MIN)
    MAX: Every 30 seconds (or as MIN)
This behaviour will be controlled by properties and can be tuned
MaxSize: The maximum number of records to store on the client
TimeOffset: The time difference between the server and client
LogRecords: The logs themselves The Logger contains a LogRecord for each client log. The LogRecord contains the following attributes:
Message: Readable description of what happened
Level: The level of this log
Date: The server time calculated using the client time and timeOffset
SessionId: The server sessionId when this event occurred (if any)
EventTypeGuid: The identifier in the event_type table for this event (if any)
Parameters: The parameters that are pertinent for this event
See FIG. 69.

5.4.2. Client Debugging

Whilst the client is in testing we need to allow the testers to easily view the client logs so that they can understand what was going on when the error occurred and can include these in Mantis bug reports.

The client will log the following:

Tasks including all parameters required to run the task

Commands including all parameters required to run the command

Exceptions including all relevant information

Each LogRecord will be logged as an incident and can be viewed by the tester using the Incident Monitor's web interface. Because each record is logged using the server time the incidents can be ordered by date to give a list of client and server actions in the sequence that they occurred.

5.4.3. Customer Support

When the customer contacts customer support we need to push the Logger object from the client to the server so that customer support can see the last LogRecords generated by the client. The client needs to initiate the push, which it may not do for a while if the log priority is set to MIN. Therefore we need a method for commanding the client to post the Logger object. We need to log enough information to recreate the user's situation. This information will be stored in the LogRecord.parameters Hashtable. If the eventTypeGuid attribute is set a record will be inserted into the customer_event table and the parameters inserted into customer_event_val. We will use a queue to insert into customer_event and customer_event_val so that event logging doesn't delay the response to the client. The exception is when the customer_logger.priority is set to MAX In this case we want to see events as they happen and these records will be inserted directly into the database.

5.4.4. Usage Data

Client usage data is populated using triggers on the event table. So for example when we receive an event for the customer plays a track the customer_track.play_count is incremented.

5.4.5. Database Requirements

Customer support needs to be able to control the logging generated by the client and the frequency that it's sent to the server. This is controlled using the customer_logger table. See FIG. 70.

Whenever this table is changed a record is inserted into customer_object log so that the updated Logger object can be pushed to the client.

6. DRM

6.1. Introduction

MusicStation is a mobile phone based software application which allows users to discover, manage and listen to music on their phone on the move using the mobile network Omnifone takes MusicStation to market primarily in partnership with Mobile Network Operators (MNOs) whilst working closely with the music industry to ensure the widest and best range of music is available to MusicStation users. Such vast libraries of digital music media are extremely valuable and need to be protected from theft and abuse whilst enabling valid paying users seamless access. Digital Rights Management (DRM) provides a method to control and facilitate the legitimate distribution and use of digital media.

The primary handset technology platform for MusicStation is Java 2 Platform Micro Edition (J2ME). This platform was chosen because it provides the widest mobile phone handset reach. This document describes the methods used by Omnifone's J2ME MusicStation handset application and associated network services to distribute protected content and securely issue the rights to use that content.

MusicStation's DRM is an implementation of the Open Mobile Alliance (OMA) DRM v2 specification. This specification has been widely adopted by both the mobile & music industries as their preferred method of protecting content for mobile devices. Whilst OMA DRM v1 has been widely adopted by handset vendors, at the time of writing, there are very few handsets which support OMA DRM v2. For this reason the OMA DRM v2 implementation discussed in this document is that which Omnifone has built into the MusicStation handset application and the associated MusicStation network services.

6.1.1. DRM Overview

Figure 71:
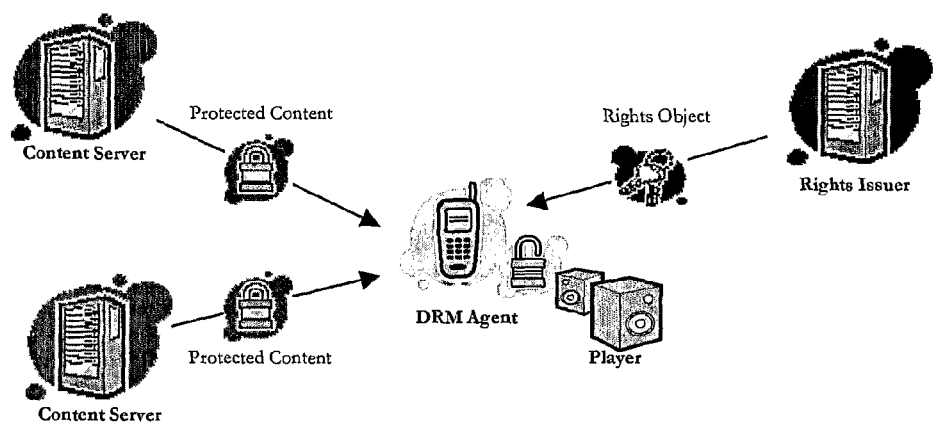
FIG. 71 is DRM Overview.

Before content is delivered, it is packaged to protect it from unauthorised access. A Content Server (CS) delivers DRM Content, and a Rights Issuer (RI) generates and delivers associated Rights Objects. The Content Server and Rights Issuer embody roles in the system. Depending on deployment they may be provided by the same or different actors, and implemented by the same or different network nodes. For example, pre-packaged protected content can be distributed across multiple Content Servers for efficient delivery of content. See FIG. 71 DRM Overview.

A Rights Object governs how DRM Content may be used. It is a document specifying permissions and constraints associated with a piece of DRM Content. DRM Content cannot be used without an associated Rights Object, and may only be used according to the permissions and constraints specified in a Rights Object.

Like all OMA v2 systems, MusicStation DRM makes a logical separation of DRM Content from Rights Objects, known as "separate delivery". DRM Content and Rights Objects may be requested separately or together, and they may be delivered separately or at the same time. For example, a user can select a piece of content, pay for it, and receive DRM Content and a Rights Object in the same transaction. Later, if the Rights Object expires, the user can go back and acquire a new Rights Object, without having to download the DRM Content again.

Rights Objects associated with DRM Content have to be enforced at the point of consumption. The DRM Agent, inside of the MusicStation handset application, embodies a trusted component of the application, responsible for enforcing permissions and constraints for DRM Content on the device, controlling access to DRM Content on the device, and so on.

A Rights Object is cryptographically bound to a specific DRM Agent, so only that DRM Agent can access it. DRM Content can only be accessed with a valid Rights Object, and so can be freely distributed. This enables, for example, "super-distribution", as users can freely pass DRM Content between them. To access DRM Content on the new device, a new Rights Object has to be requested and delivered to a DRM Agent on that device.

6.1.1.1. Protection of Content Objects

The DRM Content Format (DCF) is a secure content package for DRM Content, with its own MIME content type. In addition to the encrypted content it contains additional information, such as content description (original content type, vendor, version, etc.), Rights Issuer URI (a location where a Rights Object may be obtained), and so on. This additional information is not encrypted and may be presented to the user before a Rights Object is retrieved. Only the media content (e.g. music file) is encrypted in the DCF file.

The Content Encryption Key (CEK) needed to unlock DRM Content inside a DCF is contained within the associated Rights Object. Thus it is not possible to access DRM Content without a Rights Object. DRM Content can only be used as specified in a Rights Object. MusicStation DRM includes a mechanism allowing a DRM Agent to verify the integrity of a DCF, protecting against modification of the content by some unauthorised entity.

6.1.1.2. Protection of Rights Objects

A Rights Object is protected using a Rights Encryption Key (REK). The REK is used to encrypt sensitive parts of the Rights Object, such as the Content Encryption Key. During delivery, the REK is cryptographically bound to the target DRM Agent. In this way only the target DRM Agent can access the Rights Object, and thus the CEK. Rights Objects are therefore inherently safe.

6.2. MusicStation on the Handset

Irrespective of which provisioning method was used, the MusicStation application ends up being resident on the user's mobile phone handset. Each MusicStation handset application installation is a tailored build of software potentially unique to each different phone model and handset firmware version. The software builds are created and managed by Omnifone's patented Device Adaptive Architecture (DAA) and delivered to the correct handset using Omnifone's sophisticated application provisioning software described below.

6.2.1. MusicStation Provisioning

Working with the MNO there are two ways that the MusicStation mobile handset application is "provisioned" onto the phone, both of which are dealt with in detail in this chapter. The preferred method for distributing the MusicStation application to a handset is to preload (preinstall) the application on the device before it reaches the end-user. Experience of delivering this type of application has shown that discovery by end-users can be as high as 93% when preloaded in the most desirable manner with a hard-key (music button) on the phone which starts the service. Similar experience in OTA provisioning of this type of application by MNOs has shown success rates (i.e. ratio of successfully connected users to requestors) to be an order of magnitude lower than when the application is preloaded.

6.2.1.1. Application Preload (Preinstall)

Typically this type of device customisation is done by the handset vendor at the request of the MNO and performed before the handset leaves the vendor's premises. It can also be performed by handset distributors, such as Mobiltron, who have customisation capabilities in the supply-chain or perform the same in cells at the warehousing facilities of the MNO.

Wherever this preload is performed it is supported by Omnifone's Preload Provisioning tool, the Preloader. The Preloader is a network-connected desktop application used by staff at the preloading facility. Access to the Preloader is controlled by a Software License, a userid & password and filtered by a list of authorised IP addresses. Access to the Preloader can be revoked at any time either by user, Software License or by organisation.

The Preloader provides an authorised party with access to the latest and most appropriate MusicStation client software builds. Omnifone can control which software builds any Preloader has access to by vendor and model. The Preloader enables the easy location, download and local storage of the correct MusicStation client software build for integration into the handset customisation tools and processes of the installing party.

In-built into the Preloader is a notification system which can alert installers to the fact that new software builds are available for download.

6.2.1.2. Over-The-Air Delivery (OTA)

Due to an open OTA API, Omnifone supports a number of touch points and mechanisms by which a user might acquire MusicStation OTA. These include, but are not limited to:

(MNO) WAP portal request.
SMS text in request.
Web based request.
IVR acquisition.
Web services link.
Deep MNO network integration such as when SIM is first seen on network.

Irrespective of request mechanism, the MusicStation application is delivered by offering the end-user a WAP download page either directly inside a WAP portal they are already surfing or via WAP push if the application was requested via another method.

6.2.1.3. Application Reinstall

The MusicStation application contains the ability to force a full reinstall of the application if so instructed to do so by the Server. In this instance the MusicStation application is redownloaded using OTA WAP download. If the application reinstall is mandated by the Server the old version of the application will not run.

6.2.2. MusicStation Handset Application Embedded Metadata

Inside each MusicStation handset application is a set of information and metadata automatically inserted and used for a variety of purposes as described here.

6.2.2.1. Handset Vendor, Model, Version and Firmware Revision

Every MusicStation handset application is built for a specific handset vendor, model, version and firmware revision combination. Metadata identifying this combination is embedded in every MusicStation application build. As such the Server knows exactly what type of handset configuration each MusicStation application is running on. This is the case even if the Server has never communicated with this particular MusicStation application before.

6.2.2.2. Software License

Every MusicStation handset application is built specifically for a particular MusicStation Service. To affect this every MusicStation handset application has a "Software License" embedded inside it. The Software License is a 512 bit random number which, when presented to the Server, is used to relate this application instance to a particular MusicStation Service. Each Service is either locked or unlocked, only unlocked Services are usable by end-users.

6.2.2.3. MusicStation Root CA Certificate

Each MusicStation application has the MusicStation Root CA Certificate embedded within the application. This certificate, described in much more detail in later sections of this document, is used to sign and validate messages sent between the MusicStation handset application and the Server.

6.2.3. Application Permissions & Signing

J2ME implements a security model which means that certain functions that you would normally expect a software application to have access to (e.g. accessing memory/file systems, or accessing the network) are actually restricted. Clearly an application like MusicStation makes extensive use of such features and as such needs access to these common but security protected features of a handset.

In order to provide the MusicStation application with access to these restricted functions, the application is "signed". The signature and resulting PKI certificate of the signer is stored in the JAD file of the application. When the MusicStation application is run, this signature is examined and the certificate is validated to one of the protected domain root certificates already on the handset for these purposes. If the application is correctly signed the restricted features become available.

The root certificates already on the phone are generally either root certificates from the phone manufacturer, mobile network or certificate authority such as Verisign.

6.2.4. DRM Pertaining to the MusicStation Application Itself

There are a number of ways in which hackers attempt to break DRM systems. One of these ways is to reverse engineer the software code which implements the DRM. It is for this reason that the MusicStation handset application is always installed using the DRM resident on the phone to protect the software from being removed.

Although advanced DRMs such as OMA v2 are not present on many handsets, OMA v1, which supports the required "forward-lock" content control mechanism, is present on the majority of handsets. Forward-lock does as it suggests, it disables the forwarding or transferring of the content item, in this context the MusicStation handset application, from the phone. Whether MusicStation is preloaded or OTA installed, it is installed as an OMA v1 forward-lock protected file.

To further secure OTA deliveries of the MusicStation application, only OTA requests for application downloads confirmed to issue from the MNO network gateways are supported. This ensures that the application code is only ever downloaded over a particular MNO's mobile Internet to a phone rather than being issued from the general Internet. This is implemented by confirming that the source or routing IP addresses found in the network communications headers and metadata are those gateways stored in the Service database and known to be those of the MNO.

6.2.5. Preloading Music

Music content can be preloaded on to a phone at the same time as the application is instilled. This content is either free for promotion and might not be DRM'd, or it is for purchase and subject to the same DRM as would have been applied if the music were downloaded OTA via MusicStation. Preloaded content enables MusicStation to come out of the box playing.

6.3. Using MusicStation for the First Time

Before a MusicStation application can be used by its owner it must first connect to the MusicStation Server so that it can be registered with the appropriate MusicStation Service and issued with a Client Certificate (and an associated Client Private Key) so that it may access the DRM protected music content which it downloads. In order to be issued with Rights Objects (containing the access rules and the keys to access the DRM protected content) the MusicStation application must also register with the Rights Issuer, this two-step registration process is described in this chapter.

6.3.1. MusicStation Service Registration

The first time MusicStation starts it knows that it needs to connect to the MusicStation Server in order to register with a Service and be equipped with a Client Certificate and the Client Private Key so that it may access DRM protected content. In order for the registration to occur the Server needs to be able to uniquely identify the device. The "2-pass" MusicStation Service Registration Protocol is the protocol by which this is achieved. This protocol includes identification of the device and the subscriber followed by the secure transfer of the Client Certificate and the associated Client Private Key from the MusicStation Server (the Certificate Authority) back to the Device. As it is imperative that only this MusicStation Device can access the Client Private Key, the registration protocol uses HTTPS secure communications.

6.3.1.1. Service Registration Request

The MusicStation application attempts to access the handset's IMEI, Bluetooth Address, IMSI and the subscriber's MSISDN so that it might provide information to the Server to uniquely identify the Device and the user. The request parameters sent to the Server are described in the table in FIG. 72: Service Registration Request Parameters. †One of IMEI, Bluetooth Address or IMSI must be supplied to identify the device or SIM card at the server.

6.3.1.2. MNO Added Metadata

As communications from the MusicStation handset application to the MusicStation Server are routed through the networking equipment of the MNO the following subscriber and potentially also handset identifiers are added to the HTTP request headers. This information is extracted from these headers and used by the MusicStation Server for added identification purposes. See FIG. 73. †One of MSISDN or Party ID must be supplied to identify the subscriber at the server.

6.3.1.3. Service Registration Process

When the MusicStation Server receives a Service Registration Request message these steps are followed.

6.3.1.3.1. Registration from MNO Home Network?

When the Server receives a registration request it checks that the mobile data network that the MusicStation handset application is currently being used on is the MNO's home network. This is done using a set of database stored records of the IP addresses of the MNO's home network gateways and Internet traffic routing equipment.

The normal setting is to only allow Device registrations on the MNO's home network or on other specific networks such as that of a third-party MNO with whom there is a roaming agreement.

6.3.1.3.2. Customer Credentials Verification

Upon receipt of a request to register a new MusicStation handset application with a MusicStation Service the server will perform the following tests:

Confirm that the Software License is for a valid and active MusicStation Service.

Confirm that the subscriber has been identified, e.g. by MSISDN or Party ID.

Confirm that the MSISDN or Party ID is a customer of this MNO (if the API exists at the MNO).

Optionally confirm that the device has been identified, e.g. by IMEI or Bluetooth ID.

Once these credentials have been confirmed, the server moves on to the PKI stage below.

6.3.1.3.3. MusicStation & Public Key Infrastructure (PKI)

After a MusicStation Service Registration is successfully completed the Device will need to register with the Rights Issuer so that it may request Rights Objects and in turn access DRM content. The Rights Issuer, however, only registers Devices which it can positively identify. This identification is facilitated by the MusicStation Server acting as a PKI Certificate Authority (CA) and generating a public key certificate, the Client Certificate, for each registered MusicStation handset application and thus attesting to the authenticity and identity of each Device. The MusicStation Rights Issuer trusts the CA, it has a copy of the MusicStation Root CA Certificate so that it can confirm that the Client Certificate presented to it by a MusicStation handset application was actually issued by the CA.

Public Key Infrastructure (PKI) is the arrangement used which provides for trusted third-party vetting of, and vouching for, user identities, or in this context MusicStation handset application identities. It allows the binding of public keys to users. This is usually carried out by software at a central location, in this case the MusicStation Server, together with other coordinated software at distributed locations, i.e. the MusicStation handset applications.

PKI arrangements enable users (MusicStation applications, MusicStation Servers, MusicStation Rights Issuers, etc) to be authenticated, and to use the information in PKI certificates (i.e. each other's public keys) to encrypt and decrypt messages traveling between parties in the system. In general, a PKI consists of client software (MusicStation handset application), server software (MusicStation Server) such as a Certificate Authority and operational procedures. A user may digitally sign messages using his private key, and another user can check that signature (using the public key contained in that user's certificate issued by a CA within the PKI). This enables two (or more) communicating parties to establish confidentiality, message integrity and user authentication without having to exchange any secret information in advance.

The authenticity of the CA's signature, and whether the CA can be trusted, can be determined by examining its certificate. This chain must however end somewhere, and it does so at the MusicStation CA Root Certificate, so called as it is at the root of a tree. Root certificates are implicitly trusted (they are sometimes called the Trust Anchor) and are included with many software applications such as web browsers, or in this case the MusicStation Rights Issuer and the MusicStation handset application.

6.3.1.3.4. Client Certificate & Client Private Key Generation

The first step in issuing a new Client Certificate is to generate a new public and private key pair for the MusicStation handset application which is registering. This implementation of PKI uses the RSA 1024 bit public key algorithm.

Once the key pair has been generated the public key is used by the MusicStation CA to build, then issue the Client Certificate. The Client Certificate states that the CA attests that the public key contained in the Client Certificate belongs to the MusicStation handset application noted in the certificate. A CA's obligation is to verify an applicant's credentials, so that users (relying parties, such as the MusicStation Rights Issuer) can trust the information in the CA's certificates. The idea is that if the user trusts the CA and can verify the CA's signature, then they can also verify that a certain public key does indeed belong to whomever is identified in the Client Certificate.

The Client Private Key is not stored on the MusicStation Server, only the Client Public Key so that the server can create messages that only this device can open.

The X.509 standard is used for all MusicStation certificates. X.509 is an ITU-T standard for public key infrastructure (PKI). X.509 specifies, amongst other things, standard formats for public key certificates and a certification path validation algorithm.

6.3.1.3.5. Client GUID

The Client GUID is a unique number (Globally Unique ID) which is generated every time a new MusicStation handset application is registered with the Server. The Client GUID is returned to the MusicStation handset application whereupon it is stored and returned on all subsequent communications and requests to the MusicStation Server or the MusicStation RI.

6.3.1.4. Service Registration Response

The Service Registration Response message is sent from the CA to the Device in response to a MusicStation Service Registration Request message. It carries the protected Client Certificate and Client Private Key over HTTPS. See FIG. 74: Service Registration Response Parameters. †Only mandatory if Status="Success".

6.3.1.5. Post Service Registration Process

After the results are returned for a successful Service Registration the MusicStation handset application performs the following tasks.

6.3.1.6. Client Certificate Storage

The Client Certificate for the device is stored in the application's record management system (RMS) memory store. RMS in J2ME provides a mechanism through which applications can persistently store data and retrieve it later. In a record-oriented approach, J2ME RMS comprises multiple record stores.

6.3.1.6.1. Client GUID Storage

The Client GUID is encrypted, scrambled and stored in the application's RMS. This is used in all future requests to the MusicStation Server and MusicStation RI.

6.3.1.6.2. Client Private Key Storage

The MusicStation handset application uses the J2ME private RMS feature. This means that only the MusicStation application which created the RMS record store has access to it.

MusicStation, however, goes further to ensure the security of the Client Private Key. The MusicStation handset application only stores the Client Private Key after encrypting it as an extra security measure in the unlikely event that RMS becomes compromised. More over the application further obfuscates the Client Private Key using certain techniques prior to and during its storage in RMS.

6.3.2. Rights Issuer Registration

Immediately after the Device acquires its Client Certificate it will attempt to register with the Rights Issuer (RI). A device must be registered with a MusicStation Service before it can register and obtain Rights Objects from the RI. Successful completion of the RI registration process allows the Device to acquire a Domain Key (DK). The DK is a 128-bit AES symmetric key used to protect the Rights Encryption Keys (REKs) of the Rights Objects delivered to the Device.

The RI Registration Protocol is a complete security information exchange and handshake between the Device and the RI. The RI Registration Response message is sent from the Rights Issuer to the Device in response to a RI Registration Request message. This message completes the Registration protocol, and if successful, enables the Device to establish a RI Context for this RI. The RI Context consists of information that was negotiated with the Rights Issuer, during the 2-pass RI Registration Protocol. This RI Context is necessary for a Device to successfully acquire Rights Objects.

6.3.2.1. DRM Domains

A Domain is a set of one to many Devices that possess a common Domain Key distributed by a Rights Issuer. Devices in the same Domain can all access the same Domain Rights Objects (RO) and potentially then the music protected by those ROs.

In MusicStation the DRM Domains are network-centric. The RI defines the Domains, manages the Domain Keys, and controls which and how many Devices are included and excluded from the Domain. Typically each MusicStation handset application has its own DK and only one MusicStation Device is in each Domain.

6.3.2.2. RI Registration Request

The RI Registration Request message is sent from the Device to the Rights Issuer to initiate the 2-pass RI Registration Protocol. See FIG. 75 MusiStation RI Registration Request Parameters.

6.3.2.3. RI Registration Response

The RI Registration Response message is sent from the Rights Issuer to the Device in response to a RI Registration Request message. When the registration is successful it results in a Domain Key being delivered to the MusicStation handset application. This DK is encrypted using the Client Public Key found in the Client Certificate sent to the RI in the request. This way the DK can be securely transferred to the Device as only the Device has access to its Client Private Key which is needed to decrypt and access the DK. See FIG. 76: RI Registration Response Parameters. †Only mandatory if Status="Success".

6.3.2.4. Post RI Registration Process

After a successful RI Registration Response is received, MusicStation encrypts and obfuscates the returned Domain Key and stores it in the application's private RMS. The DK is subsequently used by MusicStation to access DK encrypted Rights Encryption Keys (REKs) in order to access sensitive parts of Rights Objects (ROs).

6.4. Listening to Music

In order to listen to music a MusicStation Device needs both the music file, stored as DRM protected content in the DRM Content Format (DCF), and the RO containing the Content Encryption Key (CEK) to unlock the DRM.

It is possible that at any one time neither the DCF nor the corresponding RO is on the Device. ROs contain URLs for the DCF and DCFs contain the URLs for the RO such that if you have one you can acquire the other. If neither are on the Device then the track listing shown in the MusicStation application also contains the URLs for both the RO and the DCF, so oftentimes both files are requested simultaneously after a track has been located in a search or whilst browsing.

6.4.1. Rights Object Acquisition

The 2-pass RO Acquisition Protocol is the protocol by which the Device acquires Rights Objects. This protocol includes mutual authentication of the Device & RI, integrity-protected request and delivery of ROs, and the secure transfer of cryptographic keying material necessary to process the RO.

6.4.1.1. RO Acquisition Request

The RO Acquisition Request message is sent from the Device to the RI to request Rights Objects. This message is the first message of the 2-pass RO Acquisition Protocol. See FIG. 77: MusicStation RO Acquisition Request Parameters.

6.4.1.2. RO Acquisition Response

The RO Acquisition Response message is sent from the RI to the Device in response to a RO Acquisition Request message. It carries the ROs containing the protected Content Encryption Key (CEK) for the music DCF in question. See FIG. 78 MusicStation RO Acquisition Response Parameters. †Only mandatory if Status="Success".

6.4.1.3. Client Certificate Revocation

Once per Device session the RI checks with the CA that the Device's Client Certificate is still valid. The CA maintains a certificate revocation list (CRL), a list of Client Certificates that have been revoked and should not be relied upon. Whenever a certificate is used it must be checked against this list to check the revocation status. The certificate will be revoked if the CA has improperly issued a certificate, the private key has been compromised, the user has violated the CA's usage policy or the MusicStation administrator has denied access to this Device for any reason.

6.4.2. Content Download

This section describes how music content is prepared, protected and downloaded to MusicStation Devices from the MusicStation Content Server.

6.4.2.1. Content Preparation

Before music content is made available for download from the MusicStation Content Server (CS) it is protected from unauthorised access by encryption. Encrypting a music file creates a new file known as a DRM Content Format (DCF).

In MusicStation music content encryption is performed using a 128-bit RC4 symmetric Content Encryption Key (CEK). Every DCF has a different 128-bit RC4 CEK. Thus if there are 1,000,000 tracks in the music library and each track is available in 10 distinct file formats (to cater for different phone flavours and music capabilities/codecs) there are 10,000,000 distinct CEKs, one per physical file. This means that even if the CEK to one DCF is compromised, no other DCF is compromised as a result.

6.4.2.2. Content Acquisition Request

Since every DCF is inherently secure, DCFs can be transported using insecure transport protocols. For this reason MusicStation Devices request music content using HTTP. See FIG. 79 Content Acquisition Request Parameters.

6.4.2.3. Content Acquisition Response

The response from the MusicStation Content Server is typically the binary stream of the DCF file requested over HTTP. This is predominantly the entire file but sometimes the file transfer can be interrupted by broken mobile network coverage. In these situations the MusicStation handset application makes a subsequent Content Acquisition Request but this time, using the Range parameter, it only requests the part of the DCF that it does not already have.

As the DCF byte stream arrives at the Device the MusicStation application progressively writes the file to the handset's file system. Both internal and external (removal media) memory is utilised. When MusicStation's allocation of combined internal & external memory is full, MusicStation removes the track which has not been played for the longest period of time. This is repeated until there is enough space available for the newly requested track.

All music content is stored in the original DCF protected format in which it was downloaded. In order to access the music inside any DCF, the corresponding RO is required so that the CEK may be accessed.

6.4.3. Playing Music Content

In order to play music through the MusicStation application the music track DCF and the corresponding RO are required to be on the phone. First the RO is examined to see if the user has the right to play the music. If so the CEK is extracted from the RO and used to decrypt the DCF to access the music track which is then played via the phone's media player.

6.4.3.1. Evaluating the Rights Expression Language (REL)

Once a request is made to play a track, for which the relevant RO & DCF exist on the phone, the Rights Expression Language contained in the RO is parsed by the MusicStation DRM Agent. The REL defines the ways in which the content in the DCF associated with this RO can be consumed and used by the user. The rights expressed by the REL can be very rich, examples include:

- Content is free for unlimited playback
- Content can be played once then must be bought.
- Content can be played free for one week then must be bought.
- Content can be played free for one month but not more than 5 times.
- Content can be played an unlimited number of times if purchased.
- Content can be played an unlimited number of times if user is currently inside a valid AYCE subscription period.

6.4.3.2. Decrypting the Content

If the DRM Agent determines from the REL that the user is able to play the music then the 128-bit AES REK is used to gain access to the encrypted CEK for the associated DCF. The 128-bit RC4 CEK is then used to decrypt the DCF to access the original music track. This decrypted track is either stored in non-permanent handset memory for the duration of the track playback or it is progressively delivered in as a decrypted stream to the handset media player depending on the behaviour of the particular phone. Decrypted music tracks are never stored permanently on the handset.

6.5. All-You-Can-Eat Services

Due to MusicStation's sophisticated DRM implementation it is possible to support advanced content access models such as All-You-Can-Eat (AYCE). This allows users who are within a valid subscription period to have unlimited access to download any track and play each track as often as they like.

6.5.1. Subscription Periods

MusicStation supports a wide range of subscription periods such as daily, weekly, monthly or any other period required. A subscription period starts when the MusicStation Server communicates with the MNO billing system and successfully charges the user's telephone bill with the appropriate charge for the subscription period.

The MusicStation Server maintains the state of the user's subscription period by recording the date/time of the successful charge made to the user's bill (prepay or postpay) and the length of the subscription period for which the user was charged. This information is shared with the DRM Agent on the MusicStation handset application and thus the Device knows if the user has a valid subscription or not.

6.5.2. Subscription Expiry

The preferred method for implementing AYCE subscriptions is the rolling subscription method. In this model the MusicStation Server automatically purchases a new subscription when the current subscription period runs out. The user does have the option to cancel a subscription and this causes the automatic re-subscription to be suspended. If the user tries to access content (whether on the Device or not) after the end of the last valid subscription period the user is asked if they want to restart their subscription. If so the rolling subscription starts again.

Where the subscription model is not a rolling subscription, the user needs to confirm that they wish to subscribe for another AYCE period each time the current period lapses.

6.5.3. Parent Rights Object

A Rights Object may inherit permissions from another Rights Object. This mechanism is used, for example, to specify rights for content acquired as part of an AYCE subscription. The RO that inherits permissions is referred to as a Child Rights Object (GRO). The Rights Object that contains the permissions that are inherited is referred to as a Parent Rights Object (P-RO).

The Client Devices verify that the same Rights Issuer issued the GRO and its related P-RO and they both belong to the same Domain before the associated content is made available to the user. The P-RO does not reference any DRM Content directly.

6.5.4. DRM Time

The DRM Agent on the phone ideally has permanent access to an accurate date/time unchangeable by the user (a DRM time). This is not the case with mobile phones so MusicStation has to use various methods to ensure that a reliable DRM time is available to the DRM Agent so that fair access can be given to users performing legitimate changes to their phone date/time whilst resisting those users who may try to fool the system and gain illegitimate access within a subscription service.

Whilst phones may legitimately have their date/time changed at any point (e.g. first time it has been set, changing time zone or daylight saving) the MusicStation Server always maintains a reliable date/time. So whilst there is a network connection the DRM Agent can always access a reliable date/time datum.

Because the MusicStation Server date/time is potentially different from the Device's local date/time the DRM Agent uses timers relative to the local date/time rather than absolute date/times. However it also monitors the local date/time relative to where it knows the local date/time should be based on the timers it keeps. This allows subscriptions to expire without network connections and also identification of local phone date/time changes. Whenever a network connection occurs all the timers and actual date/time knowledge is reset.

Issues potentially occur when users attempt to fool the system by setting their date/time to some time in the past. These issues are successfully countered using the following logic:

When the MusicStation handset application starts, it compares the local date/time with the last application close date/time. If the application open date/time is before the last application close date/time then the difference between these two date/times is subtracted from the relative timer.

The net result is that the longest a determined user can use MusicStation for whilst they have no network connection is an aggregate application usage time equaling the length of time of the paid-for subscription period (e.g. one week). In order to do this they need to note down the time every time they close MusicStation and reset their phone date/time to that time just before and every time they start MusicStation. Clearly the limited reward does not appear to be worth the effort.

The date/time is checked once a minute whilst the application is running to protect against a user changing the date/time whilst the application is open. If the current date/time is before the last date/time then the difference between these two date/times is subtracted from the relative timer.

If a user legitimately changes their local date/time to a date/time in the future and the Device can connect to the Server expiry times are re-synced with the Server. If a connection is not available:

If the future time is still within the valid subscription period then the tracks will play.

If the future time is greater than the license expiry time then, outside of a system configurable threshold, tracks will not play until the Device connects to the Server. It is not possible to distinguish between the user putting their clock forward (whilst MusicStation is not running) and the user not using MusicStation for a long period of time. A reconnection to the server via the data network is required to reactivate the user or renew the subscription.

6.5.5. AYCE Accounting

Accounting for AYCE systems requires an absolute count of every play of every track by every end-user. Track consumption information is therefore required to be transferred back to the Server where all qualifying plays by all MusicStation Devices in a particular Service are aggregated together. These aggregated play counts are used to determine what the royalty payments are to each rights owner whose music has been played in the accounting period. Tracks which are played for less than a preview threshold period, such as 30 seconds, are considered to be free previews and are not included in the royalty payments calculations.

So that MusicStation does not cause unnecessary network traffic, play counts are buffered on the Device until a natural network connection is required by the application. This buffering extends also to 0 G (flights and tunnels etc) where play counts can be buffered for extended periods of time and sent to the server when a connection is finally made.

6.5.6. Blended Models

MusicStation provides for a blended commercial model where users who are in AYCE may still make outright purchases of tracks. If the subscription period ends without renewal, those tracks that the user has purchased may still be accessed.

6.6. Appendix A: Key Management

This is a description of the cryptographic way in which the Rights Issuer issues a Domain Key (DK) to a Device using the public key known only to the DRM Agent in the MusicStation handset application on the Device. Also described is the way that the RI protects the CEK in the RO by using a REK which it delivers to the Device having first been encrypted using the KD previously delivered to the Device.

6.6.1. Distributing $K_D$ under a Device Public Key

This section applies when provisioning a Device with a Domain Key, $K_D$.

$K_D$ is the symmetric key-wrapping key used when protecting $K_{REK}$ ("Rights Object Encryption Key") issued to a Domain D. $K_D$ is a 128-bit long AES key generated randomly by the sender and shall be unique for each Domain D. $K_{REK}$ is the wrapping key for the content-encryption key $K_{CEK}$ in Rights Objects.

The asymmetric encryption scheme RSA shall be used to securely transmit $K_D$ to a recipient Device using the Device's RSA Client Public Key.

C=RSA.ENCRYPT(ClientPubKey, $K_D$)

After receiving C the Device decrypts C using its Client Private Key.

$K_D$=RSA.DECRYPT(ClientPrivKey, C)

6.6.2. Distributing $K_{REK}$ Under a Domain Key $K_D$

This section applies when protecting a Rights Object for a Domain.

The key-wrapping scheme AES-WRAP shall be used. The RI encrypts $K_{REK}$ using $K_D$:

C=AES-WRAP($K_D$, $K_{REK}$)

After receiving C, the Device decrypts C using $K_D$:

$K_{REK}$=AES-UNWRAP($K_D$, C)

APPENDIX 1

Screen Flows

7. Introduction

This appendix provides a description of the screens and user interface of the MusicStation client. It includes a full feature list and, for each feature, a description of the user experience and appropriate screenshots.

The features are broken down into the main functional groups of the application, which generally follow the application's menu structure.

7. Screen Layout and User Interaction

7.1. Registration

See FIG. 80. When MusicStation is started for the first time the user will see a message while the client is registered with the server and the user is provided with a unique identifier or GUID.

7.2. Joining MusicStation

See FIG. 81. When a user first attempts to use any of the chargeable features of MusicStation for the first time they are asked to Join with a optional free trial period. They are then asked to confirm and given an option to view the Terms and Conditions via a wap link. Thereafter subscription is confirmed and they are required to select continue on confirmation. A user that has successfully subscribed is known as a MusicStation member.

7.3. Tabs and Menus

See FIG. 82. The user interface is separated into four tabs. Each tab is focused on a particular core function of MusicStation.

Home—provides the user access to all the content available in MusicStation including Charts and to all the core functions such as Search, Options, etc. It also highlights content the user has downloaded (i.e. both "store" and "library").

Buzz—provides access to the community features and music news.

Lineup—displays the current queue of tracks for download and listening.

Playing—displays details of the track that is currently being played.

The Home tab and Buzz tab consist of multiple screens arranged in a hierarchical menu structure.

7.4. Menu and Tab Navigation

The user uses the joystick to navigate through the tabs and menus of the application. See FIG. 83.

7.5. The More Menu

7.5.1. Accessing Functions

See FIG. 84. Every screen includes a More menu on the handset's right hand soft key which provides access to functions relevant to both the currently selected item and to the screen as a whole. Options that are not currently available are greyed out on this menu and cannot be selected.

The More menu can be closed again by selecting Cancel with the right hand soft key.

7.5.2. Context Sensitive Options

The options available in the More menu are context-sensitive to the currently highlighted item. This table lists the common More menu options and a description of the action the selected More menu option performs. See FIGS. 85 and 86.

Please see Appendix 2: Context Sensitive Menus for a detailed listing of the More menu options available for each MusicStation option.

7.6. Back

See FIG. 87. A screen navigation history is maintained. At any time the user may press the left hand soft key to go back to the previous screen in any given tab. On handsets such as those from Sony Ericsson, if the handset has a hard Back key then that can also be used to go back through the screen history.

7.7. Music Playback

See FIG. 88. Various keys are predefined and associated with music playback functions so that the user can control playback from any screen in the application without having to return to the Playing tab. For example, the [5] key pauses and resumes the music playback wherever the user is within the user interface. See FIG. 89.

7.8. Help

See FIGS. 90 and 91. The user may view the keypad help by pressing the [1] key. This screen displays the actions performed by pressing any numbered key on the handset regardless of the user's location in MusicStation.

7.9. Keypad Lock

See FIGS. 92 and 93. The keypad is locked by the user pressing and holding the [*] key. To unlock the keypad the user presses and holds the [*] again. Music will continue playing while the joystick is locked but no menu options or other music playback control keys will be accessible to prevent accidental use.

7.10. Minimising

Figures 94, 95, 96:
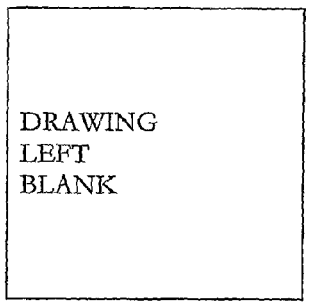

See FIGS. 94 and 95. The application may also be minimised by pressing and holding the [#] key. To stop the music the user must re-open MusicStation.

7.11. Exiting

See FIG. 96. When the user selects Close from the More menu then if music is playing they will be asked whether they want music to continue playing.

- Exit and keep music playing—MusicStation will be minimised and moved into the background on the handset. The user can then continue to use the handset's functions whilst listening to music. The user can return to MusicStation at anytime.
- Exit and stop music—In this case MusicStation will stop music playback and exit completely. The user would need to restart MusicStation to use it subsequently.

8. Basic Concepts

8.1. Lineup

Figure 97:

The third tab or Lineup is a key concept to a user's understanding of MusicStation. It provides a permanent view of the user's current selection of music. Any music the user selects for playing (and by default downloading if not yet on the handset) is added to the Lineup. A user can select any album, playlist or individual track and add it to the Lineup. Any track that is yet to complete downloading is greyed out and the percentage downloaded is displayed alongside. See section 12 for more information. See FIG. 97.

8.2. Playlists

There are several types of playlist within the MusicStation user interface.

| Playlist | Description |
| --- | --- |
| Private Playlist | A playlist defined by the current user for their convenience. |
| Shared Playlist | A playlist created by a user and then shared with the community. Any user can listen, view and rate this playlist. |
| Editorial playlist | A playlist created by the content team related to a particular service. For example, playlists created to highlight a group or story of note at the moment. |
| Automatically Generated Playlist | Playlists which have been automatically generated by MusicStation. These may be personalised to the user. E.g. You Might Like and Top Artists. |

8.3. Rating

Figure 98:
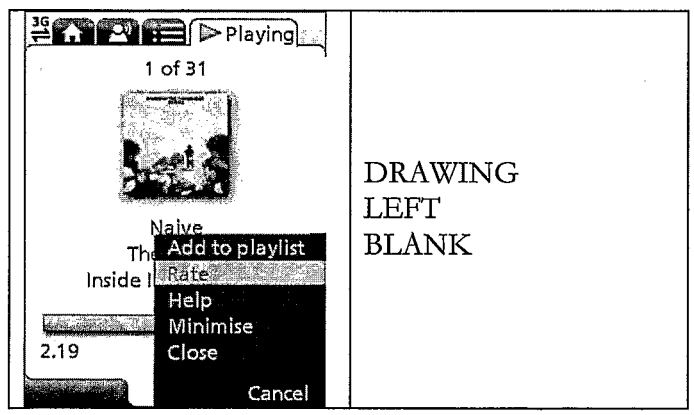

See FIG. 98. MusicStation provides community features including providing recommendations for its users. To allow users to be involved in this process many different items within the MusicStation interface can be rated. The following items can be rated:

- Tracks
- Albums
- Artists
- Playlists
- Other Members

A user rates an item by selecting it in the interface and then selecting the Rate option from the More menu. The user has three ratings to choose from for each item:

- I love it
- Neutral
- I hate it

These ratings are collected from all users and are used by MusicStation to generate star-ratings for those items. These stars can be seen at various places throughout the interface and give the user base a view on the relative popularity of each item. The user ratings are also used to generate recommendations and charts, such as the Top Playlists list (Get NewPlaylists screen).

8.4. Screen Updates

MusicStation includes a component called the Intelligent Background Downloader. This component is responsible for downloading all music and data to the handset. It runs in the background and delivers music for playback, and content for all the dynamic menus. Because it runs in the background it can deliver updated content to any screen without interfering with the user's enjoyment of MusicStation.

For example, news articles listed on the Inbox tab might be updated while the user is listening to music so that when the user next switches to the Buzz tab the latest articles will be there ready and waiting for the user.

9. Top-Level Menus

The user interface is separated into four tabs. Each tab is focused on a particular core function of MusicStation.

- Home—provides the user access to all the content available in MusicStation and to all the core functions such as Charts, Search, etc.
- Buzz—provides access to the community features and music news.
- Lineup—displays the current queue of tracks queue for listening.
- Playing—displays details of the track that is currently being played.

Figure 99:
Figure 100:
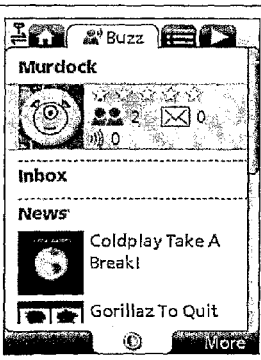

The Home tab and Buzz tab consist of multiple screens arranged in a hierarchical menu structure. The following tables provide a list of the options in the top-level menus of the Home tab and Buzz tab and a cross reference to the section of this document in which they are described in more detail. See FIGS. 99 and 100.

The Lineup and Playing tabs do not have any menus. They are a single fixed view relating to current music. The Lineup displays a permanent view of the user's current selection of music for downloading and playing. The Playing tab just displays the current track

10. Home

10.1. Playlists

Figure 101:

See FIG. 101. The Playlists screen gives the user access to playlists. The user can view and manage their Private and Shared Playlists. The user can also use the Get New Playlists options to view and download playlists provided by the editorial/content team or by other users.

10.1.1. My Private Playlists

Private playlists are those which the user has created but not shared with the MusicStation community. Private playlists are listed underneath the My Private Playlists heading. The user can decide to make any of these playlists public by selecting a private playlist and then selecting the Sham option from the More menu.

10.1.2. My Shared Playlists

Figure 102:

See FIG. 102. Shared Playlists are those playlists which the user has shared with the MusicStation community. Shared playlists are listed underneath the My Shared Playlists heading. The user can decide to make any of these playlists private again by selecting a shared playlist and then selecting the Make Private option from the More menu.

10.1.3. Get New Playlists

Figure 103:
Figure 104:

See FIG. 103. The Get new playlists option provides access to Editorial Playlists, Automatically Generated Playlists, and Shared Playlists from other users. The user can view, play and rate any of these playlists. See FIG. 104.

The lists on these screens are updated nightly or weekly by MusicStation.

| Menu item | Description |
| --- | --- |
| Top Playlists | A list of the most popular Shared Playlists within MusicStation. These are the playlists with the highest star-rating. |
| You Might Like | A list of recommended playlists generated using the user's listening habits and rating activity. |
| Featured Playlists | Playlists formed around some topic such as the season, a special event, an artist new release, etc |
| Celebrity Playlists | Playlists created by or inspired by celebrities. |

10.1.4. Create Playlist

Figure 105:
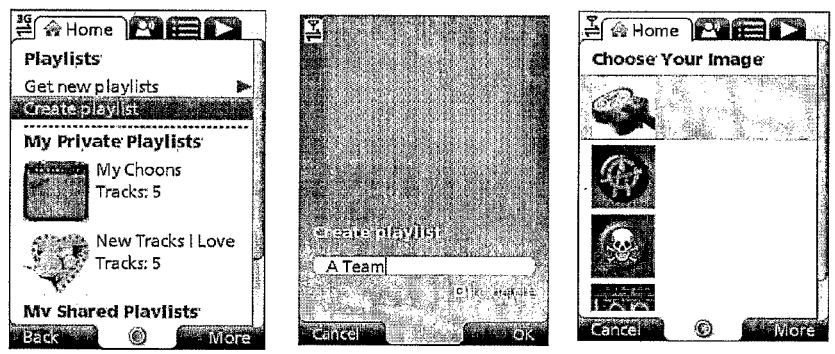

See FIG. 105. Using the Create playlist option, the user can create private or shared playlists. The user provides a playlist name and selects an image for the playlist from a library of images. Once created, the user can add tracks to the playlist using the Add to Playlist options found throughout the interface. A user can also create a new playlist after selecting Add to Playlist 10.2. Delete Playlist The user may delete any of their private or shared playlists by highlighting the playlist and selecting Delete from the More menu.

10.2.1. View Playlist

Figure 106:
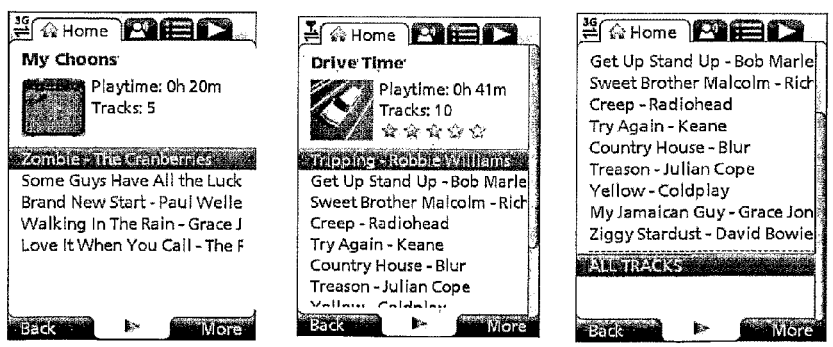

See FIG. 106. The user can view the tracks within a playlist. The user will also see the image associated with the playlist, the playlist's total playtime and the number of tracks in the playlist. If the playlist is a Shared Playlist then its star-rating will also be shown.

At the bottom of each playlist is an ALL TRACKS option that a user can select to add all the tracks in the playlist to a Lineup.

10.2.2. Rate Playlist

The user can rate Shared Playlists. The ratings provided by all users and collectively used to generate Top playlists and You might like . . . lists which are then fed back to the users on their Get New Playlists screen. See section 8.3.

10.3. Artists

Figure 107:
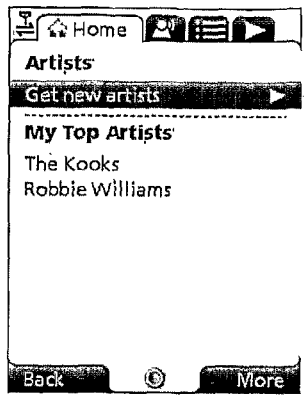

See FIG. 107. The Albums screen gives the user access to all albums available in the MusicStation catalogue. The user can view Artists from which they have downloaded tracks in the past. The user can use the Get new artists option to view and listen to artists of general or personal interest to this user.

10.3.1. My Top Artists

In the My Top Artists section of the Artists screen, the user can view a selective list of their artists from which they have downloaded tracks. The list will be composed of artists that the user has downloaded tracks for. This provides the user with easy access to their favourite artists. It is generally all the artists they have downloaded tracks for but is limited (phone dependent) to ensure it does not get overly long.

10.3.2. Get New Artists

Figure 108:
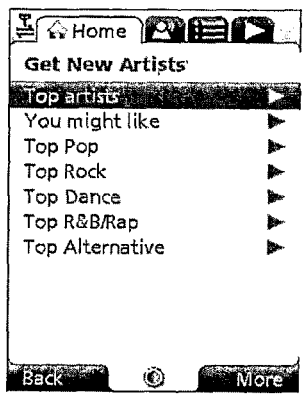

See FIG. 108. The Get new artists option provides access to lists of Artists that have been generated by MusicStation, either automatically, using user listening habits and feedback or editorially. These are based on two main categories: popular artists e.g. Top artists, Top Pop, Top Rock etc and recommended artists e.g. You might like.

The lists on these screens are updated nightly or weekly by MusicStation.

| Menu item | Description |
| --- | --- |
| Top Artists | A listing of the most popular Artists across all users within MusicStation. |
| You Might Like | A list of recommended Artists generated utilising the user's listening habits and rating activity. |
| Top [Genre] | A list of the most popular artists in MusicStation broken down by genre. The list of options will include the top 5 most popular genres in MusicStation. |

Figure 109:
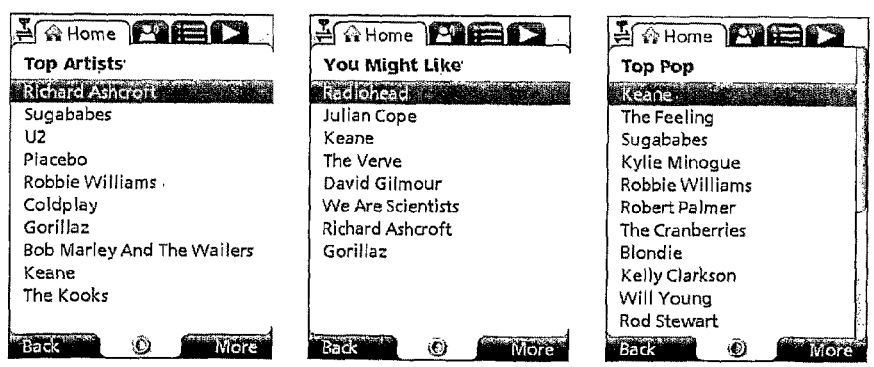

See FIG. 109.

10.3.3. Artist Profile—View Artist

Figure 110:
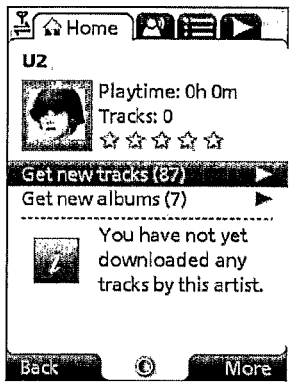

See FIG. 110. The user can view the artist profile including an image, the artist's MusicStation star-rating, the number of downloaded tracks, a list of the downloaded tracks and the total playtime of these downloaded tracks. From this screen the user can view and play all tracks or albums available for this artist.

10.3.4. Artist Profile—Get New Tracks

Figure 111:

See FIG. 111. The user can view the list of all available tracks for the selected artist. From this screen the user can play and rate tracks.

10.3.5. Artist Profile—Get New Albums

Figure 112:
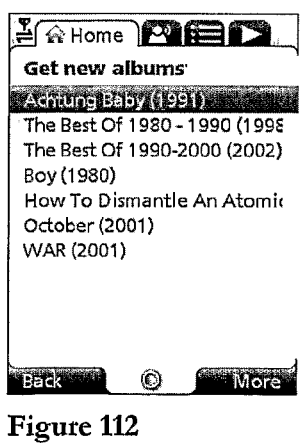

See FIG. 112. The user can view the list of all available albums for the selected artist. From this screen the user can view, play and rate tracks from the album.

10.3.6. Rate Artist

The user may rate any artist using the Rate option from the More menu. See section 8.3.

10.4. Albums

Figure 113:
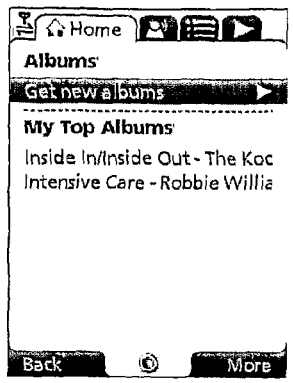

See FIG. 113. The Album screen gives the user access to all albums available in the MusicStation catalogue. The user can view Albums from which they have downloaded tracks in the past. The user can use the Get new albums option to view and listen to albums of general or personal interest to this user.

10.4.1. My Top Albums

In the My Top Albums section of the Album screen, the user can view a selective list of their albums from which they have downloaded tracks. The list will be composed of albums that the user downloads from and listens to frequently. This provides the user with easy access to downloaded tracks.

10.4.2. Get New Albums

Figure 114:
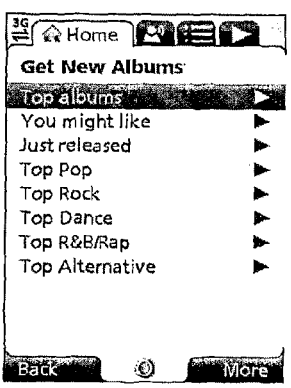

See FIG. 114. The Get new album option provides access to lists of albums that have been generated by MusicStation, either automatically, using user listening habits and feedback or editorially. These are based on two main categories: popular albums e.g. Top artists, Top Pop, Top Rock etc and recommended albums e.g. You might like, Just released. The user can play or view any easily.

The lists on these screens will updated nightly or weekly by MusicStation.

| Menu item | Description |
| --- | --- |
| Top Albums | A listing of the most popular Albums across all users within this service. |
| You might like | A list of recommended Albums calculated using the user's listening habits and rating activity. |
| Just released | A list of albums that have recently been released. |
| Top [Genre] | Gives access to the most popular Albums for this MusicStation service broken down by genre. The list of options will include the top 5 most popular genres for the service |

Figure 115:
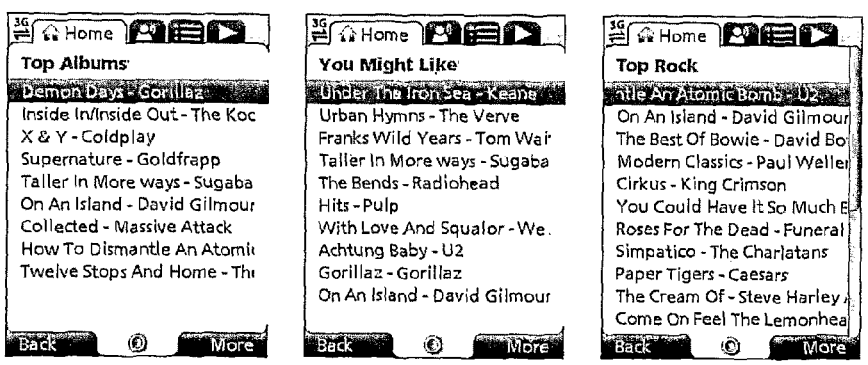

See FIG. 115.

10.4.3. Album Home Page

Figure 116:

See FIG. 116. The user can view the derails of an album including the number of tracks on the album, the star-rating of the album and a track listing. The user can play individual tracks or all the tracks from the album. Using the ALL TRACKS option at the bottom of the Album home page, the user can select to play all tracks from the album.

10.4.4. Rate Album

The user can rate any album within the user interface. See section 8.3.

10.5. Tracks

Figure 117:

See FIG. 117. The Tracks screen gives the user access to all tracks available from the MusicStation catalogue. The user can see a selective list of tracks, which they have downloaded in the past. The user can also use the Get news tracks option to view and listen to tracks of general or personal interest to this user.

10.5.1. My Top Tracks

In the My Top Album section of the Albums screen, the user can view a selective list of their downloaded tracks. The list will be composed of tracks that the user listens to frequently. All tracks in this list can be listened to immediately. The user does not need network coverage to listen to any of these tracks.

10.5.2. Get New Tracks

Figure 118:

See FIG. 118. The Get new tracks option provides access to lists of tracks that have been generated by MusicStation, either automatically, using user listening habits and feedback or editorially. These are based on two main categories: popular tracks e.g. Top Tracks and recommended tracks e.g. You might like, Just released.

The lists on these screens will updated nightly or weekly by MusicStation.

| Menu item | Description |
| --- | --- |
| Top tracks | A listing of the most popular tracks across all users within MusicStation. |
| You Might Like | A list of recommended tracks calculated using the user's listening habits and rating activity. |
| Just Released | A list of recently released tracks. |

10.5.3. Rate Track

The user may rate any track. See section 8.3.

10.5.4. Add Track to Playlist

The user may add any track to a playlist. During this process the user may select an existing playlist or create a new one. See section 10.1.4 Create playlist.

10.6. Charts

10.6.1. Charts Listing

Figure 119:
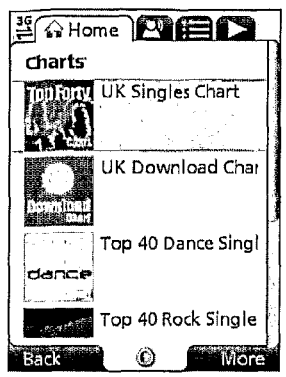

See FIG. 119. The Charts screen provides a listing of charts generated from the listening and rating habits of the users of this service. A selection of charts is available including daily, weekly and monthly.

10.6.2. Chart Details

Figure 120:

See FIG. 120. The user can view the details of a particular chart including its name, the chart's total playtime, the full sequential track/artist listing for the chart and play any track from the chart.

10.7. Search

Figure 121:

See FIG. 121.

10.7.1. Artist Search

Figure 122:
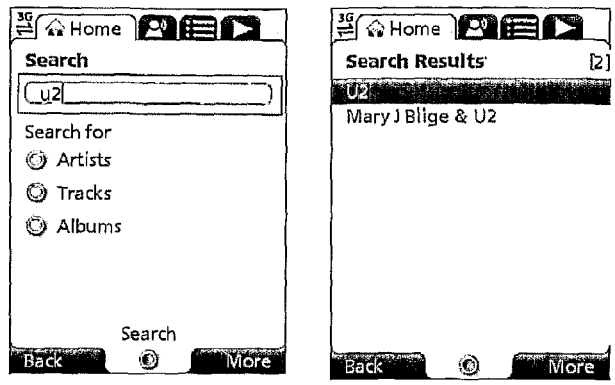

See FIG. 122. The user may search for any artist within the MusicStation catalogue by entering search terms into the Search text box and selecting the Artists radio button on the Smith for menu. The user may then view any artist profile returned by their search.

10.7.2. Track Search

Figure 123:

See FIG. 123. The user may search for any track within the MusicStation catalogue by entering search terms into the Search text box and selecting the Tracks radio button on the Search for menu. The user may then play any track returned by their search.

10.7.3. Album Search

Figure 124:
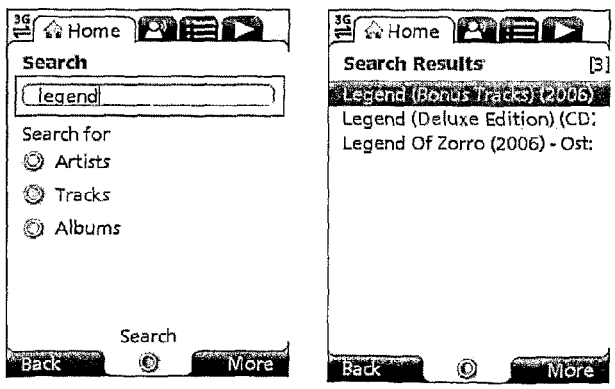

See FIG. 124. The user may search for any album within the MusicStation catalogue by entering search terms into the Search text box and selecting the Albums radio button on the Search for menu. The user may then view or play any album profile returned by their search.

10.8. Play Top Track

Figure 125:
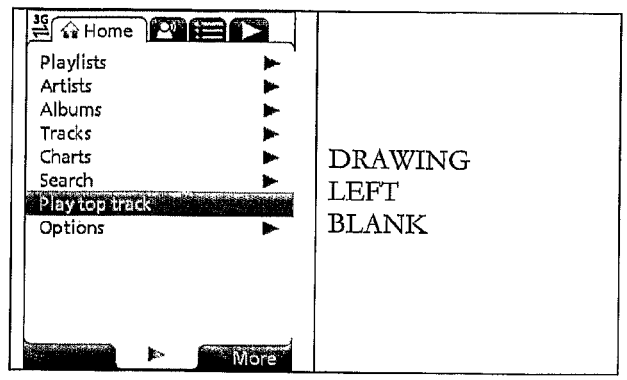

See FIG. 125. The Play Top Trade option on the home menu adds a random track from the list of tracks already on the handset to the end of the Lineup. If the Lineup is empty then this track would start playing immediately. Network coverage is not required for this option as the tracks are already downloaded.

10.9. Options

Figure 126:

See FIG. 126. The Options screen provides the user with access to general information and options to control their MusicStation application.

10.9.1. Membership Status

Figure 127:
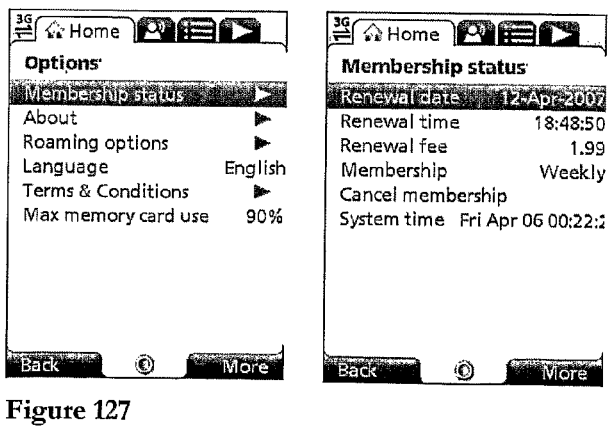

See FIG. 127. This option displays the status of the user's membership. It will show renewal details such as the date and time of the next renewal, the renewal fee and the frequency of the renewal. The user can also cancel their membership using the Cancel Membership option.

The following table describes the different stages in the membership process.

| Membership | Description |
| --- | --- |
| Free access | Use of the application including any free preloaded content is unrestricted. Users can play free content and navigate around MusicStation. |
| Free trial access | When a user first attempts to perform a billable action they will be asked to join MusicStation and normally (depending on the service configuration) be granted a period of free use during which they will have unlimited free access. The user can use all features of MusicStation including music downloads and community. After the end of the free period the user will begin reoccurring charges at the normal rate. |
| Subscribed to unlimited downloads | The subscribing process involves the user accepting the terms and conditions of the service. Once these are accepted the user will have immediate access to all the music within MusicStation for the period that they remain subscribed. |
| Automatic subscription renewal | If the user takes no action then whilst subscribed the user's subscription will be automatically renewed as soon as their renewal date/time comes up. The user will not be informed of the renewal. If the user does not use MusicStation within a grace period of the renewal date then access to all music (including that already downloaded onto the handset) will be prevented until a successful renew occurs. |
| Unsubscribe from unlimited downloads | The user may choose to unsubscribe from the service at anytime by selecting the Cancel Membership option on the Membership Status screen. The user will remain subscribed until their next due renewal date/time at which point their music will no longer be accessible to them. |

10.9.2. About

Figure 128:
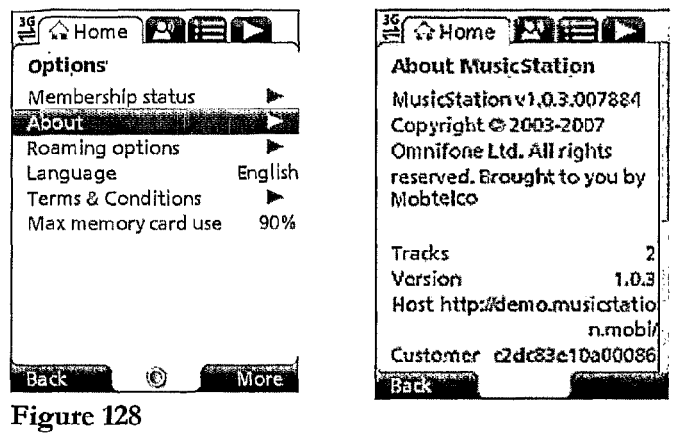

See FIG. 128. This screen displays information about the version of MusicStation. It also displays the total number of tracks that the user has currently downloaded to their handset.

10.9.3. Roaming Options

Figure 129:
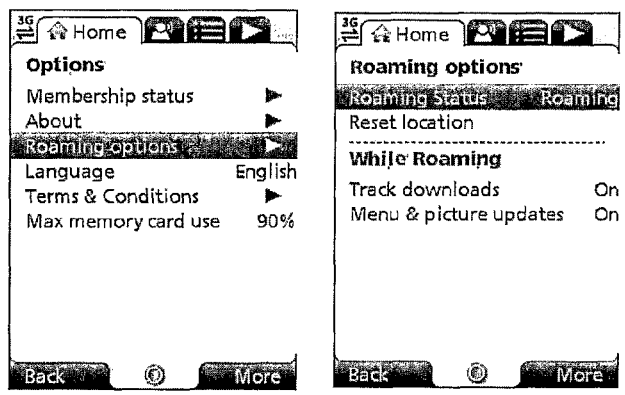

See FIG. 129. The user can configure the Roaming behaviour for MusicStation. When the phone is Roaming the user will experience additional charges when downloading tracks or when MusicStation updates menu items and images.

| Option | Description |
| --- | --- |
| Roaming Status | The phone's current roaming status. This will show Home if the user is not roaming and will show Roaming if the user is roaming. |
| Track Downloads | The user can set this option On to download tracks (with additional charges) when roaming without a prompt. The user set this option to Off to prevent the downloading tracks when roaming or Ask to cause the following prompts. |
| Menu & picture updates | The user can set this option On to update menu items and pictures (with additional charges) when roaming without a prompt. The user set this option to Off to prevent menu and picture updates when roaming or Ask to cause the following prompts. |

Figure 130:
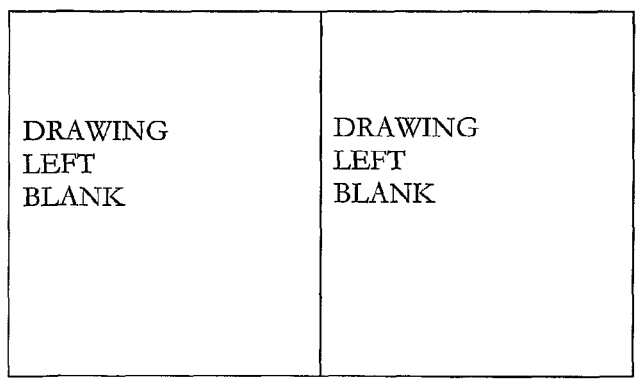

If the Roaming behaviour for Menu & picture updates is set to Ask they will be shown a warning message which will ask them to approve/deny downloads, updates and additional charges while roaming for a given session. See FIG. 130.

Figure 131:
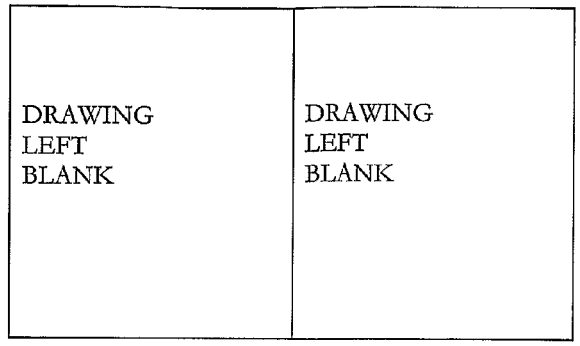

When the user attempts to download a track while Roaming and the Roaming behaviour for tracks is set to Ask they will be shown a warning message which will ask them to approve/deny downloads, updates and additional charges while roaming. This action, approval/denial, will configure the settings for the current session. See FIG. 131.

10.9.4. Language Selection

Figure 132:
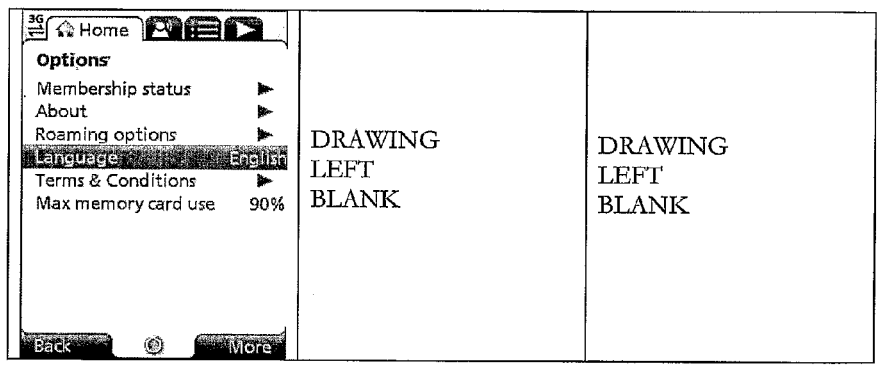

On a service which has multiple languages defined the user can change the language for MusicStation. On changing the language the user will be prompted to restart MusicStation. Confirming the action closes MusicStation. See FIG. 132.

10.9.5. Terms & Conditions

Figure 133:
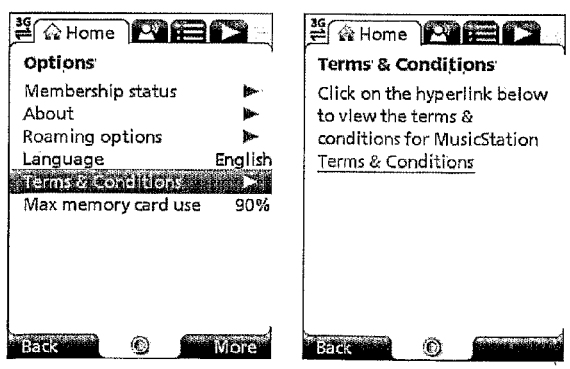

This screen displays a WAP link to the general and service-specific terms and conditions for this MusicStation service. See FIG. 133.

10.9.6. Max Memory Card Use

The user can select the maximum percentage of the memory card that MusicStation will use for storing music and data. The user can set a lower value to leave more room for other uses of the phone (e.g. photos).

11. Buzz

Figure 134:
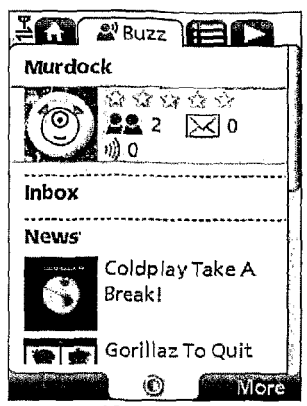

See FIG. 134. The user may choose to create a Buzz profile. This allows them to take part in the full set of MusicStation community features. If the user does not have a Buzz profile then they are unable to communicate with other members.

From the Buzz screen users can view their profile, read news articles and access messages in their Inbox.

11.1. Join the Buzz

Figure 135:
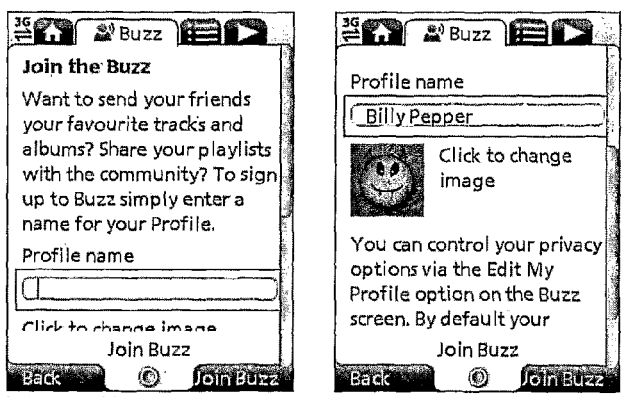

See FIG. 135. When the user attempts to use a community feature that requires a Buzz profile then they are redirected to the Join the Buzz screen and are prompted for a member name they want to register under. They many enter a name and select an image, which will form their profile. The entered name must be unique.

If the Member name is not available then an alternative will be suggested which they may accept or modify.

The user may edit their profile at any time from the My Profile screen.

They may optionally also choose an image and provide a short catchphrase. These items are displayed whenever other users view this member's profile.

11.2. Buzz Members

11.2.1. My Profile

Figure 136:

See FIG. 136. The My Profile screen gives the user access to all aspects of the MusicStation community along with their own personalised content. Before they have created a profile the user will be able to access the News items in the Buzz tab, and view Cool Members and Buzz playlists but will not be able to add friends or send recommendations.

Once they have registered this screen will show

Member name

Image

Star-rating—indication of how other users have rated them.

Listens—number of times other users have listened to one of this member's shared playlists.

Number of Friends

Catchphrase

From the My Profile screen they can view Cool Members, Buzz Playlists and a list of their Buzz Friends.

| Menu item | Description |
| --- | --- |
| Cool members | Popular members, featured members and members that this user may relate to based on similar listening and rating habits. |
| Buzz playlists | Popular playlists, featured playlists, celebrity playlists and playlists that this user may enjoy based on listening and rating habits. |
| My Friends | A list of users that that this user has added as a friend. |

11.2.2. Edit My Profile

Figure 137:
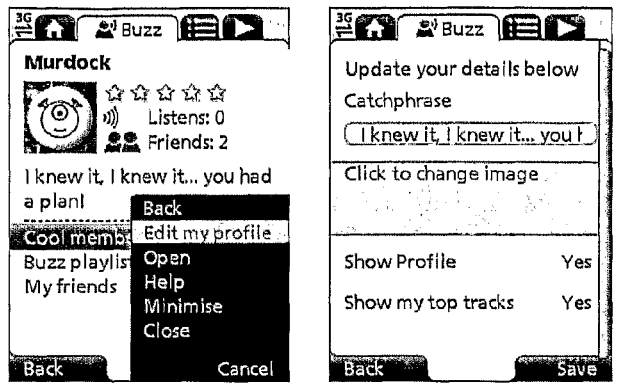

At any time after registering as a Member the user may modify details of their member profile using the Edit My Profile option from the More menu. See FIG. 137.

This allows the user to modify their catchphrase and change their image. It also allows them to specify whether they want their profile to be visible to other users, and if they want their Top Tracks to be listed on their profile screen.

11.2.3. Cool Members

Figure 138:
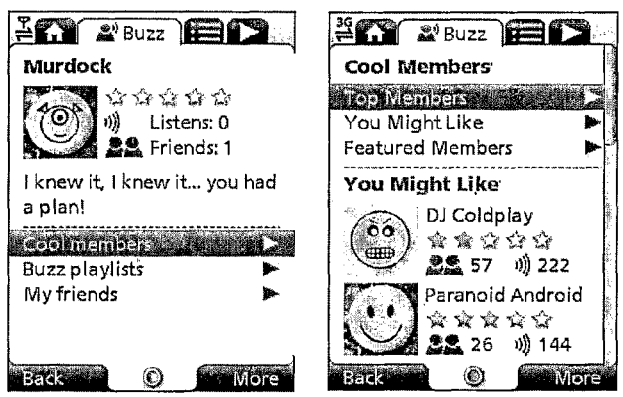

See FIG. 138. The Cool Members option on the My Profile screen gives the user access to various lists of Members.

| Menu item | Description |
| --- | --- |
| Top Members | The most popular members in MusicStation. |
| You Might Like | A list of members that this user may relate to based on similar listening and rating habits. |
| Featured Members | A list of editorially selected members. |

The user may click on any member in these lists to view that member's profile (section 11.2.4).

11.2.4. Buzz Playlists

Figure 139:

See FIG. 139. The Buzz Playlists option on the My Profile screen gives the user access to various playlists including Editorial Playlists, Automatically Generated Playlists, and Shared Playlists from other users. The user can view, play and rate any of these playlists.

Figure 140:

See FIG. 140. The lists on these screens are updated nightly or weekly by MusicStation.

| Menu item | Description |
| --- | --- |
| Top Playlists | A list of the most popular Shared Playlists within MusicStation. These are the most popular playlists based on star-rating and listens. |

| Menu item | Description |
|---|---|
| You Might Like | A list of recommended playlists generated using the user's listening habits and rating activity. |
| Featured Playlists | Editorially selected playlists formed around some topic such as the season, a special event, an artist new release, etc |
| Celebrity Playlists | Playlists created by or inspired by celebrities. |

11.2.5. My Friends

Figure 141:
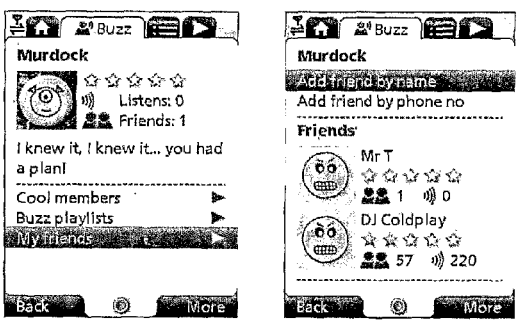

See FIG. 141. The My Friends option on the My Profile screen gives the user access to a list of the users they have added as a friend and any pending friend requests. See section 11.3 for more information on Friends.

11.2.6. View Another Member Profile

Figure 142:

See FIG. 142. This screen displays the details of another Member. A member's profile can only be viewed by another user if that member has enabled the option which makes their profile visible on the Edit My Profile screen.

The Member Profile screen displays a member's:
Member name
Image
Star-rating
Listens (number of times other users have listened to one of this member's shared playlists)
Number of Friends
Catchphrase
A list of their Shared Playlists
My Top Tracks (This user's 5 top tracks)
From this screen a user may
View this member's shared playlists
View this member's top 5 tracks and play them (This option will be shown only if the other member has enabled the option to Show my top tracks when configuring their member profile using the Edit my profile option. See section 11.2.2)
Request to add this user as a Friend
Rate this member 11.3. Friends Buzz Members can recommend items to other Members to which they may also attach a message. However they are only allowed to do this with Members who they have added to their list of Friends. Users can add Friends by sending Friend Requests to other Buzz Members or confirming requests from other members.

A list of Friends may be viewed from their My Profile screen (see section 11.3.2).

All recommendations can be viewed in the Inbox on the Buzz tab. (see section 11.4)

11.3.1. Request to Add a Member as Friend

Figure 143:
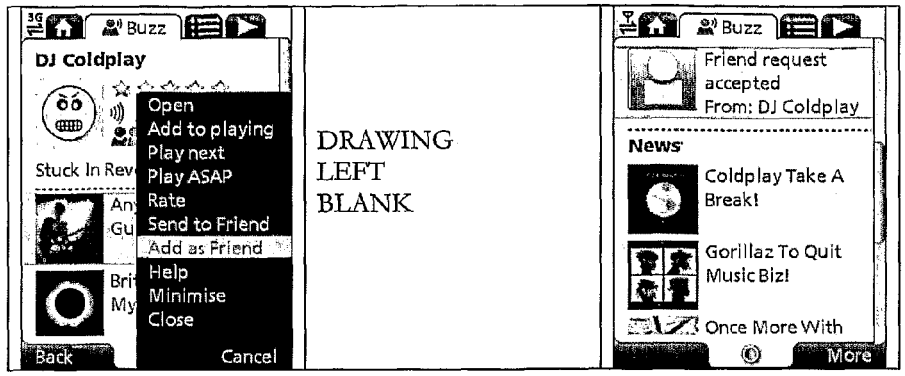

See FIG. 143. Anywhere a member is listed in the user interface a user may select the Add as Friend option from the More menu in order to send a request to that Member to become their Friend. The user may enter a message, which is sent along with the Friend Request. To send the message the user selects the Send option from the More menu. The friend request will be sent to the other member who then has the option of accepting or denying the request.

11.3.2. View List of My Friends

Figure 144:
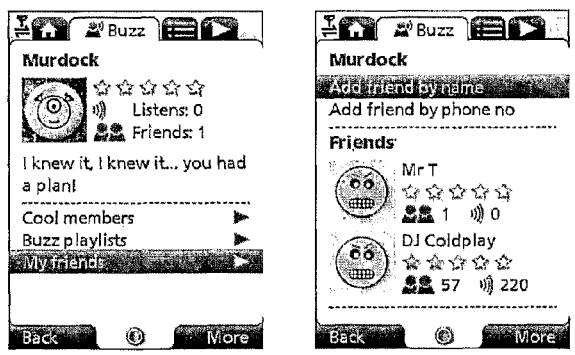

See FIG. 144. A user may view their list of friends at any time by going to their My Profile screen and selecting the My friends option.

11.3.3. View List of My Pending Friend Requests

Figure 145:
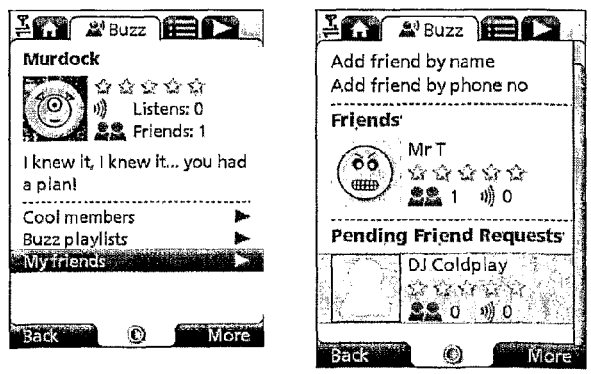

See FIG. 145. A user may view the list of friend requests that they have sent but which have not yet been responded to under the Pending friend requests heading on the My Friends screen available from their My Profile screen (see section 11.3.2).

11.3.4. Request to Add Friend by Name

Figure 146:
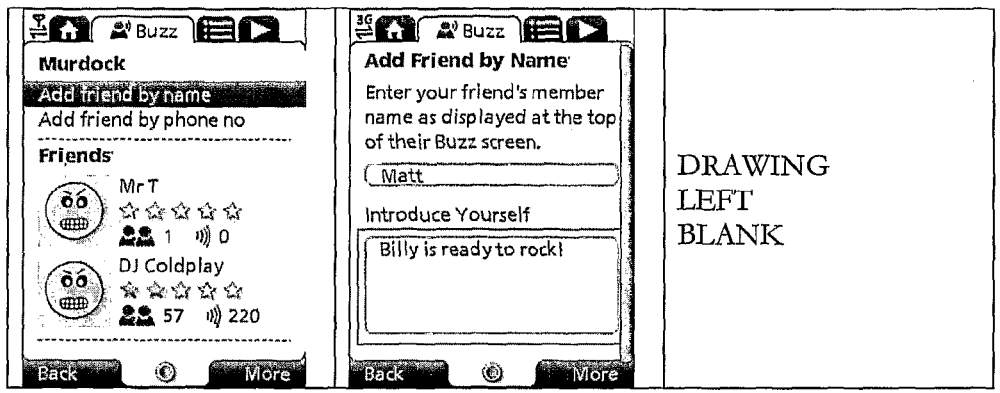

See FIG. 146. If the user knows the name of a member who they want to add as a friend, they may send a Friend Request to that Member by entering that name using the Add friend by name option, accessed from the My Friends menu option from their My Profile screen (see section 11.3.2).

11.3.5. Request to Add Friend by Phone Number

Figure 147:
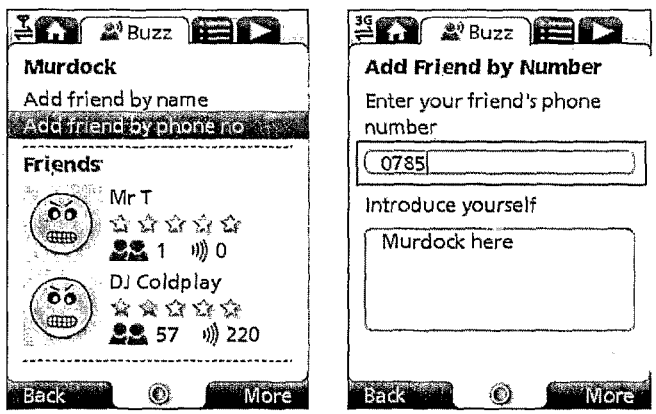

See FIG. 147. If the user knows the mobile phone number of a member who they want to add as a friend, they may send a Friend Request to that member by entering that name using the Add friend by phone no option, accessed from the My Friends menu option from their My Profile screen (see section 11.3.2).

11.3.6. Send Playlist Recommendation to Friend

Anywhere where a playlist is listed in MusicStation the user may use the Send to Friend option from the More menu to send a message to one or more Friends recommending it to them. The recommendation message arrives in that Friend's Inbox (section 11.4.3).

11.3.7. Send Artist Recommendation to Friend

Anywhere where an artist is listed in MusicStation the user may use the Send to Friend option from the More menu to send a message to one or more Friends recommending it to them. The recommendation message arrives in that Friend's Inbox (section 11.4.4).

11.3.8. Send Album Recommendation to Mend

Anywhere where an album is listed in MusicStation the user may use the Send to Friend option from the More menu to send a message to one or more Friends recommending it to them. The recommendation message arrives in that Friend's Inbox (section 11.4.5).

11.3.9. Send Track Recommendation to Friend

Figure 148:
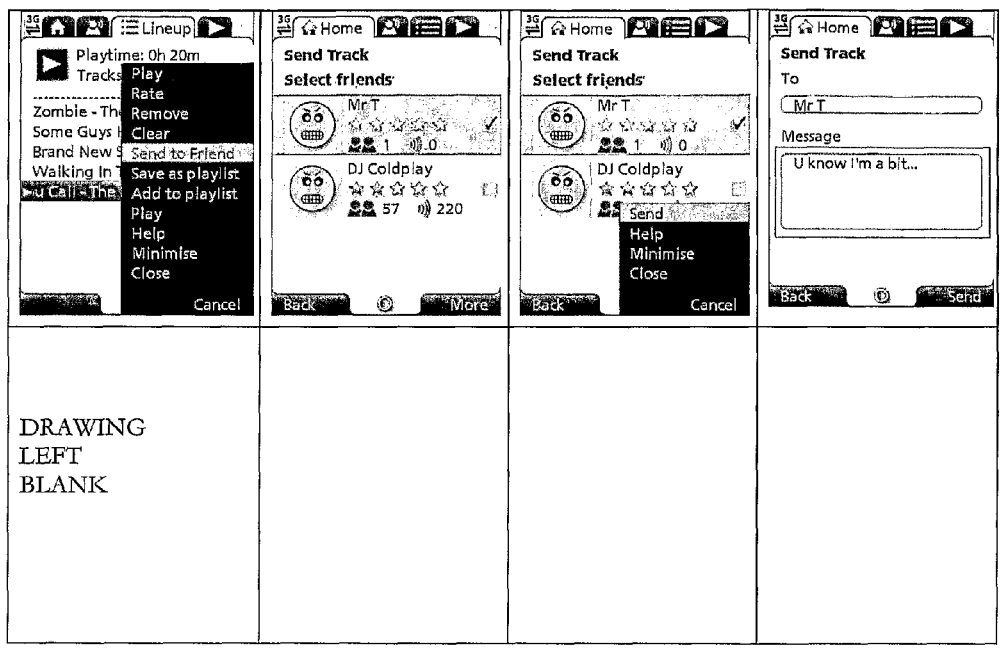

Anywhere where a track is listed in MusicStation the user may use the Send to Friend option from the More menu to send a message to one or more Friends recommending it to them. The recommendation message arrives in that Friend's Inbox (section 11.4.6). See FIG. 148.

11.4. Inbox

The Inbox displays messages and recommendations which have arrived from the user's friends who are also users of this MusicStation service. See section 11.3 for an introduction to MusicStation's Friends functionality.

Messages are downloaded in the background by the Intelligent Background Downloader and appear on in the Inbox without any specific interaction from the user.

11.4.1. Inbound Friend Request Message

Figure 149:
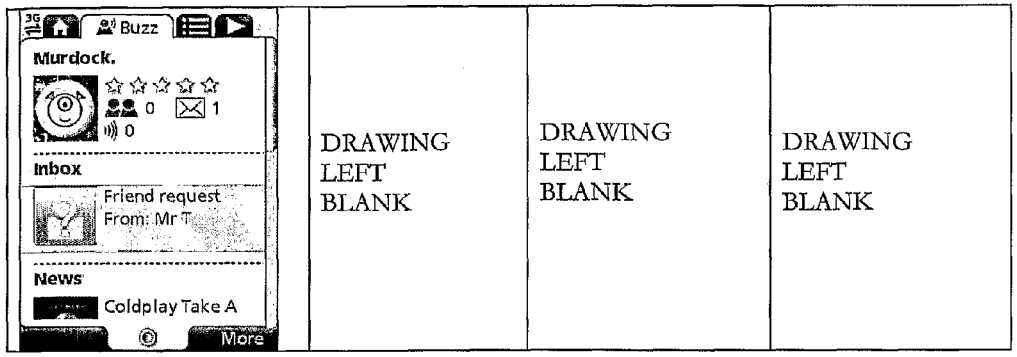

See FIG. 149. When another Member requests to add this user as a friend then a Friend Request will arrive in this user's Inbox. This user can respond to this request in one of four ways.

| Selection | Action |
|---|---|
| Approve | This user is added to the other member's Friend list. The other member is added to this user's Friend list. |
| Deny | This user is not added to the other member's friend list. The other member is not added to this user's Friend list. |
| Block | This user is not added to the other member's friend list. The other member is not added to this user's Friend list. All future friend requests from the other member will be ignored. |

| Selection | Action |
| --- | --- |
| Report abuse | This user is not added to the other member's friend list. The other member is not added to this user's Friend list. All future friend requests from the other member will be ignored. An abuse notification will be raised with the MusicStation support team. |

When this user responds, their response will be delivered to the other member's Inbox. These responses are described in section 11.4.2.

11.4.2. Response from Friend Request

Figure 150:

See FIG. 150. When this user sends a friend request to another member that member has the option to accept or deny the request. Their response is returned to this user and displayed in the Inbox. The three possible responses to a friend request are listed below.

| Title shown in Inbox | Action |
| --- | --- |
| Friend Request Accepted | The other member has accepted the friend request. The other member is added to this user's friend list and this user is added to the other member's Friend list. They can now send each other tracks, playlists and messages. |
| Friend Request Denied | The other member has denied the friend request. No change to either member's friends lists. This user can resubmit their friend request. |
| Friend Request Blocked | The other member has blocked all friend requests from this user. This user will have all friend requests to this other member blocked automatically. The other member will never see requests from this member again. |

11.4.3. Inbound Playlist Recommendation from Friend

Figure 151:

See FIG. 151. When a friend sends a playlist recommendation to this user (section 11.3.6) then the recommendation message will appear in this user's Inbox. The user can open the message and click on the hyperlink in the message to view the playlist.

11.4.4. Inbound Artist Recommendation from Friend

Figure 152:
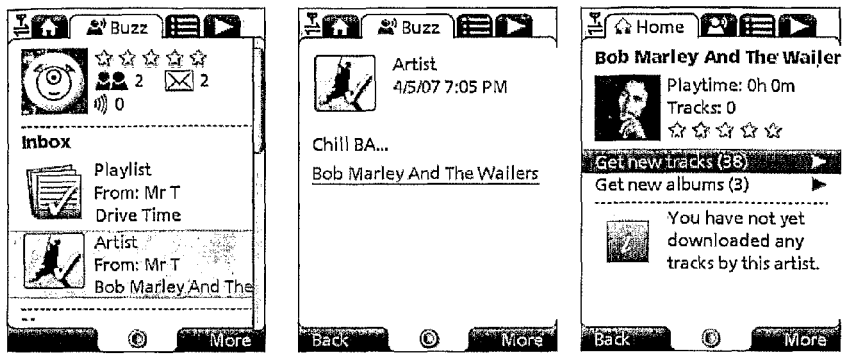

See FIG. 152. When a friend sends an artist recommendation to this user (section 11.3.7) then the message will appear in this user's Inbox. The user can open the message and click on the hyperlink in the message to go straight to the artist profile screen.

11.4.5. Inbound Album Recommendation from Friend

Figure 153:
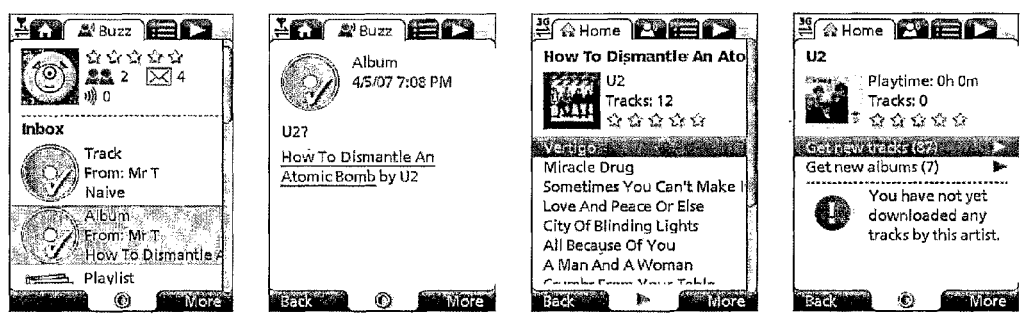

See FIG. 153. When a friend sends an album recommendation to this user (section 11.3.8) then the message will appear in this user's Inbox. The user can open the message and click on the hyperlink in the message to go straight to the album screen. They may also click on the artist name to go straight to the artist profile screen.

11.4.6. Inbound Track Recommendation from Friend

Figure 154:
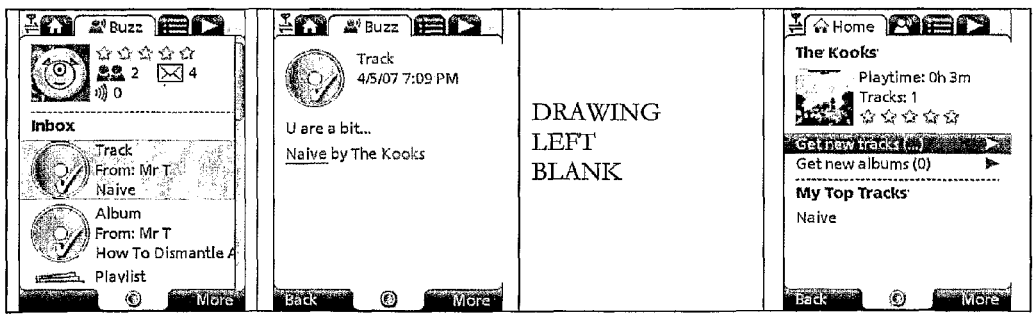

See FIG. 154. When a friend sends a track recommendation to this user (section 11.3.9) the recommendation message will appear in this user's Inbox. The user can open the message and click on the hyperlink in the message to add the track to their Lineup.

11.5. News

11.5.1. List of Editorial Articles

The News section displays a constantly updating list of news articles. Typically six articles will be displayed broken down with two articles of international general interest, two stories of local general interest and two stories based on the listening and rating behaviour of this user. This breakdown can be configured for the demands of the particular service.

The list of articles is updated by the Intelligent Background Downloader during normal use of MusicStation. Articles are added to this list in the background and can be viewed immediately by the user when they next navigate to the Buzz tab.

11.5.2. View Article

Figure 155:
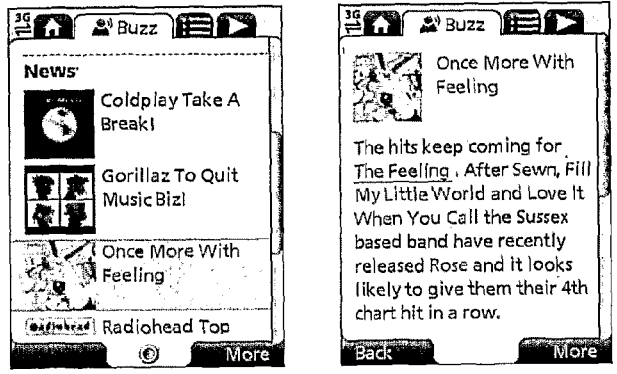

See FIG. 155. To view the article the user selects the article from the list and clicks the joystick button or selects the Open option from the More menu. The article body text is displayed beneath a headline and relevant image.

11.5.3. Hyperlinks in an Article

Figure 156:
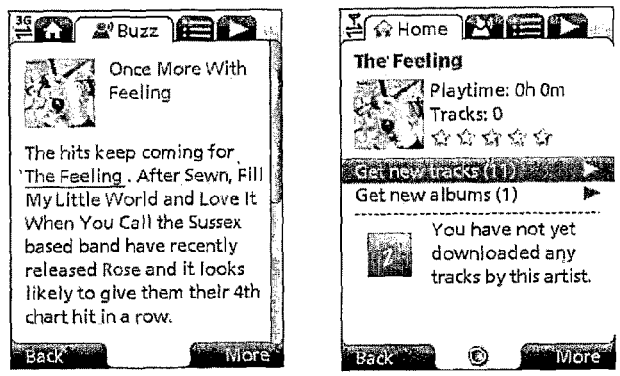

See FIG. 156. Stories may contain hyperlinks to other screens within MusicStation. For example, an announcement of a new album release could include links to the relevant artist and album screens. Hyperlinks are displayed in blue in the article screens. The user may navigate straight to the album or artist by selecting the hyperlink and clicking the joystick button. As a user scrolls up and down in an article using up/down on the joystick the active hyperlink moves between successive hyperlinks.

12. Lineup

Figure 157:
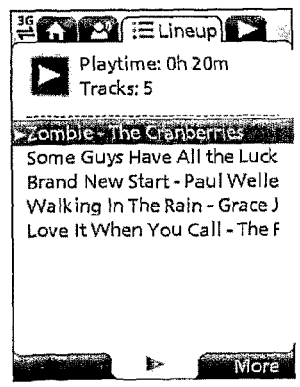

See FIG. 157. The Lineup is a concept central to the MusicStation client. It is the current playlist of tracks a user has queued for listening. Songs on the playlists will be played in sequence. At anytime, the contents of the Lineup can be viewed on the Lineup screen.

The current track is the track in the Lineup that is currently playing. The current track is highlighted with a small blue pointer on the left.

Figure 158:
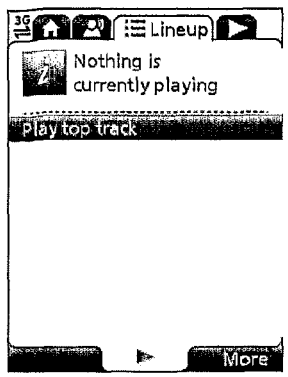

See FIG. 158. When no tracks have been added to the Lineup the option Play top trade is displayed. This option randomly adds and plays a Top track to the Lineup. The Top tracks have already been downloaded and will play immediately.

12.1. Track Download Status

Figure 159:

See FIG. 159. Tracks which have not yet been downloaded will be downloaded in the background. Tracks which are currently downloading or waiting to download are shown in a grey font. The progress of a downloading track is displayed as a percentage from 0-100%.

Tracks play in sequence from the Lineup. If a track is reached which has not yet finished downloading then playback will skip that track and go onto the next track which has been downloaded. Once that track has been downloaded then it will be available to play.

MusicStation intelligently manages the downloading of tracks in the background to optimise the user's experience and ensure that music playback is continuous and the user hears a continuous flow of music.

Tracks download one at a time, although depending on how tracks have been added to the Lineup and whether the user interrupted downloads by exiting the application, there may be multiple tracks shown in a partially downloaded state.

While tracks are downloading the user is able to listen to already downloaded music and is free to navigate around the rest of the MusicStation user interface.

Partially downloaded tracks are saved when MusicStation exits and continue downloading later from where they left off.

12.2. Save as Playlist

Figure 160:

See FIG. 160. The user can save the current Lineup to a playlist. To save the current Lineup as a playlist the user selects Save as playlist from the More menu. They can choose to save the current Lineup as a new playlist or add the tracks to an existing playlist. This saved playlist is saved on the handset and centrally.

12.3. Remove from Lineup

Figure 161:

See FIG. 161. The user can remove a track from the Lineup. To remove a track from the Lineup the user selects the track and then selects Remote from the More menu. If the user removes the Current Trade then the next available track in the current playlist will be played.

12.4. Clear Lineup

Figure 162:

See FIG. 162. The user can clear the current Lineup, removing all tracks from it. To clear the Lineup the user selects Clear from the More menu. Music playback will stop.

12.5. Jump to Track in Current Lineup and Play

The user can select another track to play from the current Lineup. To do this the user navigates to the track using the joystick. The user can start the track by pressing the joystick button or selecting Play from the More menu. MusicStation will start to play the selected track. Only downloaded tracks can be played.

12.6. Adding Music to the Lineup

The user navigates through MusicStation's music catalogue and can select tracks, albums, artists or playlists to add to the Lineup.

Any track can be added to the Lineup by selecting the track with the joystick. Any playlist, album or track can be added by selecting Add to Lineup from the More menu.

If the Lineup is empty then that item will start playing. If the Lineup already contains tracks then the added item will be queued at the end of the Lineup. The user can view the tracks which they have added by going to the Lineup tab.

Tracks, which have not been downloaded, are added to the Lineup before they are downloaded. MusicStation will intelligently manage download of items in the background allowing the user to enjoy a continuous flow of music.

Other options for adding items to the Lineup are provided on the More menu. These options such as Play next, Play ASAP or Play now are described in more detail below.

Figure 163:
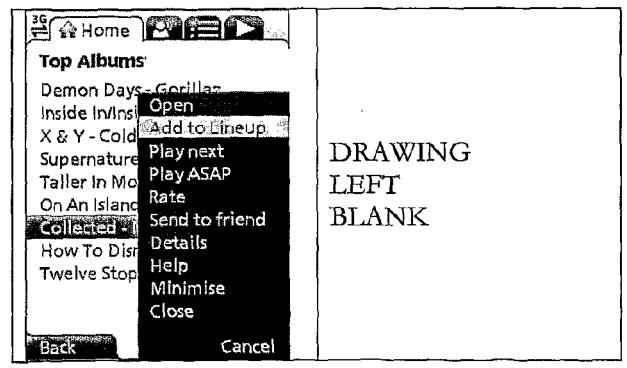

If a user adds a track to the Lineup that has to be downloaded and there are currently no other tracks in the Lineup then the user is prompted with an option to add a top track for immediate playback See FIG. 163.

12.6.1. Add to Lineup

When a user is browsing the MusicStation catalogue they can select Add to Lineup from the More menu to add a track, playlist, a track by a selected artist or album to the Lineup.

| Item | Action |
|---|---|
| Playlist | The user can select any playlist in the interface and add all tracks from that playlist to the Lineup. The user may also add individual tracks from that playlist to the end of the Lineup. |
| Album | The user can select any album in the interface and add all tracks from that album to the Lineup. The user may also add individual tracks from that album to the end of the Lineup. |
| Artist | The user can select an individual track or album from a selected artist to the end of the Lineup. |
| Track | The user can select any track and add it to the end of the Lineup. |

12.6.2. Play Next

When a user is browsing the MusicStation catalogue they can select Play next from the More menu to insert a track, playlist, a track by a selected artist or album into the Lineup after the track that is currently playing.

| Item | Action |
|---|---|
| Playlist | The user can select any playlist and instruct MusicStation to insert it into the Lineup directly after the track that is currently playing. The playlist will then start playing once the current track has finished. |
| Album | The user can select any album and instruct MusicStation to insert it into the Lineup directly after the track that is currently playing. The playlist will then start playing once the current track has finished. |
| Artist | The user can select an individual track or album from a selected artist and instruct MusicStation to insert it into the Lineup directly after the track that is currently playing. The selected track will then start playing once the current track has finished. |
| Track | The user can select a track and instruct MusicStation to insert it into the Lineup directly after the track that is currently playing. The selected track will then start playing once the current track has finished. |

12.6.3. Play Now

When a user is browsing the MusicStation catalogue they can select Play now from the More menu to insert a track which has been downloaded into the Lineup. The track which is currently playing will be interrupted and the selected track will start playing and replace the current track.

| Item | Action |
|---|---|
| Track | The user can select any song, which has already been downloaded, and instruct MusicStation to insert it into the Lineup immediately. The track which is currently playing will be interrupted and the selected track will start playing and replace the current track |

12.6.4. Play ASAP

Play ASAP stands for Play As Soon As Possible. When a user is browsing the MusicStation catalogue they can select Play ASAP from the More menu to insert a track, playlist, a track by a selected artist or an album, which has not been downloaded into the Lineup. As soon as it is available the track, playlist, track by a selected artist or an album will replace the track that is currently playing.

When a user is browsing the MusicStation catalogue if the track, playlist, a track by a selected artist or album has not already been downloaded they will be able to select the Play ASAP option from the More menu.

| Item | Action |
|---|---|
| Playlist | The user can select any playlist and instruct MusicStation to play that playlist as soon as possible. The playlist will be inserted into the Lineup and will interrupt the track that is currently playing as soon as it is available. If one or more tracks of that playlist have already been downloaded to the handset the current track would be interrupted and the playlist would start playing immediately. If the playlist must first be downloaded then the first track would be downloaded and as soon as it had finished downloading it would replace the current track and start playing. The remaining tracks from the playlist will download in the background and be queued as they become available. |
| Album | The user can select any album and instruct MusicStation to play that album as soon as possible. The album will be inserted into the Lineup and the first available track will interrupt the track that is currently playing as soon as it is possible. If one or more tracks of that album have already been downloaded to the handset the current track would be interrupted and the playlist would start playing immediately. If the album must first be downloaded then the first track would be downloaded and as soon as it had finished downloading it would interrupt the current track and start playing. The re- |

-continued

| Item | Action |
|---|---|
| | maining tracks from the playlist will album in the background and be queued as they become available. |
| Artist | The user can select an individual track by a selected artist and instruct MusicStation to play that track as soon as possible. The selected track will be inserted into the Lineup and will interrupt the track that is currently playing as soon as it is available. |
| Track | The user can select any track and instruct MusicStation to play that track as soon as possible. The track will be inserted into the Lineup and will interrupt the track that is currently playing as soon as it is available. |

13. Playing

Figure 164:
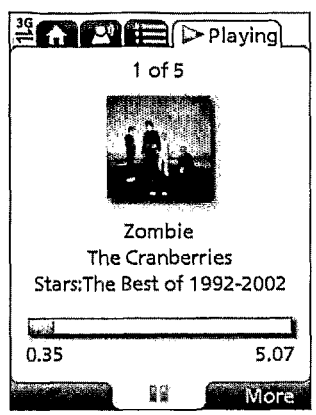
Figure 165:
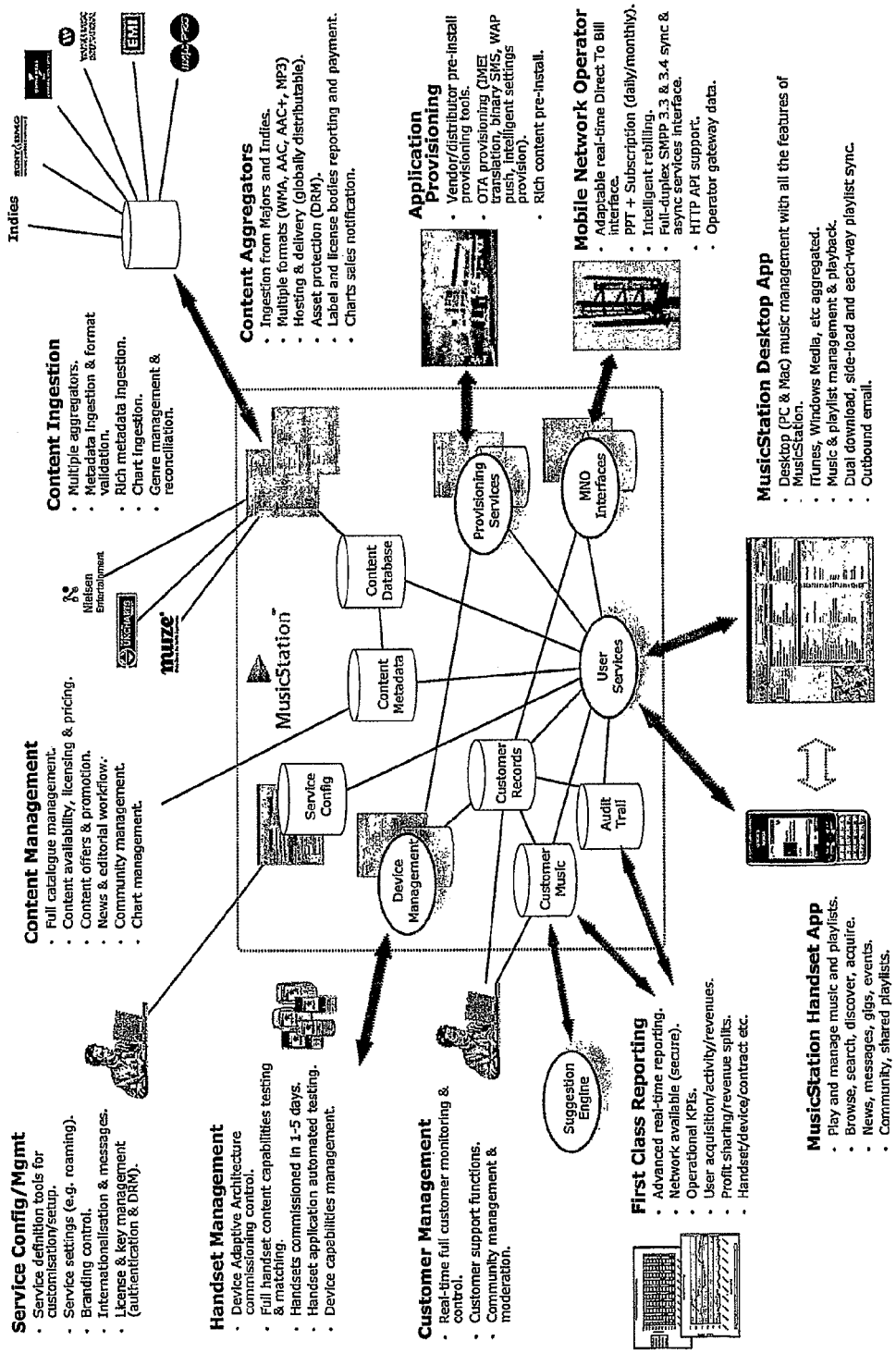
FIG. 165 is a system overview

See FIG. 164.

13.1.1. Playing Screen

The Playing tab displays the details of the track that is currently playing.

| Item | Description |
|---|---|
| Track Name | The name of the track currently playing. |
| Track Artist | The name of the artist for the track |
| Track Album | The name of the album the track is from. |
| Album Image | An image showing the cover for the album the track is from. |
| Lineup position | The track's position within the Lineup. |
| Lineup count | The number of tracks in the current Lineup. |
| Current playtime | The current position of playback of the current track in minutes:seconds |
| Playtime | The total length of the current track in minutes:seconds. |

13.1.2. Playing Actions

The user can perform the following actions on the Playing tab.

| Action | |
|---|---|
| Play | Click the joystick button or press the [5] key. |
| Pause | Click the joystick button or press the [5] key. |
| Next Track | Press the [6] key. |
| Restart Track | Press the [4] key. |
| Previous Track | Press the [4] key twice. |
| Fast Forward | Press and hold the [6] key. |
| Rewind | Press and hold [4] key. |
| Add to Playlist | Select Add to playlist from the More menu. |
| Rate | Select Rate from the More menu. |

APPENDIX 2

Context Sensitive Menus

The following appendix details the options available on the More menu when viewing menus and objects in MusicStation.

| Playlists | |
|---|---|
| Object | More Options |
| Playlist, Private | Open |
| | Add to Lineup |
| | Play next |
| | Play ASAP |
| | Send to Friend |
| | Delete |
| | Share |

| Playlists | |
|---|---|
| Object | More Options |
| Playlist, Shared | Help |
| | Minimise |
| | Close |
| | Open |
| | Add to Lineup |
| | Play next |
| | Play ASAP |
| | Rate |
| | Send to Friend |
| | Delete |
| | Make Private |
| | Help |
| | Minimise |
| | Close |
| Playlist, Buzz | Open |
| | Add to Lineup |
| | Play next |
| | Play ASAP |
| | Rate |
| | Send to Friend |
| | Help |
| | Minimise |
| | Close |

| Tracks | |
|---|---|
| Object | More Options |
| Track | Add to Lineup |
| . . . on a Shared Playlist | Play next |
| . . . on an album | Play ASAP/Play now * |
| . . . on an artist screen | Add to playlist |
| . . . on a chart | Rate |
| . . . in search results | Send to Friend |
| | Artist Profile |
| | Details |
| | Help |
| | Minimise |
| * Track not downloaded \|\| Track downloaded | Close |
| Track | Add to Lineup |
| . . . on a Private Playlist | Play next |
| | Play ASAP/Play now * |
| | Add to playlist |
| | Remove |
| | Rate |
| | Send to Friend |
| | Artist Profile |
| | Details |
| | Help |
| | Minimise |
| * Track not downloaded/Track downloaded | Close |
| Track | Add to Lineup |
| . . . in My Top Tracks | Play next |
| | Play ASAP/Play now * |
| | Add to playlist |
| | Delete |
| | Rate |
| | Send to Friend |
| | Artist Profile |
| | Details |
| | Help |
| | Minimise |

-continued

| Tracks | |
|---|---|
| Object | More Options |
| * Track not downloaded/Track downloaded | Close |

| Buzz | |
|---|---|
| Object | More Options |
| Buzz<br>. . . Buzz main screen | Open<br>Send/Receive<br>Help<br>Minimise<br>Close |
| Inbox<br>. . . Buzz main screen | Open<br>Delete<br>Send/Receive<br>Help<br>Minimise<br>Close |
| Buzz Profile | Edit my profile<br>Open<br>Help<br>Minimise<br>Close |
| Buzz member<br>. . . in a list of members | Open<br>Add as Friend **<br>Help<br>Minimise<br>Close |
| ** will be greyed out if member is already a friend | |
| Friend<br>. . . in a list of friends | Open<br>Remove<br>Help<br>Minimise<br>Close |
| Playlist<br>. . . on a buzz member profile screen | Open<br>Add to Lineup<br>Play next<br>Play ASAP<br>Rate<br>Send to Friend<br>Add as Friend **<br>Help<br>Minimise<br>Close |
| ** will be greyed out if member is already a friend | |
| Track<br>. . . on a buzz member profile screen | Add to Lineup<br>Play next<br>Play ASAP/Play now *<br>Add to playlist<br>Rate<br>Send to Friend<br>Artist Profile<br>Details<br>Add as Friend **<br>Help<br>Minimise<br>Close |
| * Trade not downloaded/Track downloaded | |
| ** will be greyed out if member is already a friend | |

| Lineup + Playing | |
|---|---|
| Object | More Options |
| Lineup<br>. . . no tracks | Play Top Track<br>Help<br>Minimise<br>Close |

| Lineup + Playing | |
|---|---|
| Object | More Options |
| Lineup<br>. . . tracks | Play<br>Rate<br>Remove<br>Clear<br>Send to Friend<br>Save as playlist<br>Add to playlist<br>Pause<br>Help<br>Minimise<br>Close |
| Playing | Add to playlist<br>Rate<br>Help<br>Minimise<br>Close |

| Other | |
|---|---|
| Object | More Options |
| Artist<br>. . . in a list of artists | Open<br>Rate<br>Send to Friend<br>Help<br>Minimise<br>Close |
| Album<br>. . . in a list of albums | Open<br>Add to Lineup<br>Play next<br>Play ASAP<br>Rate<br>Send to Friend<br>Help<br>Minimise<br>Close |
| Chart | Open<br>Add to Lineup<br>Play next<br>Play ASAP<br>Help<br>Minimise<br>Close |
| Search<br>. . . do search | OK<br>Reset search<br>Help<br>Minimise<br>Close |

| Generic | |
|---|---|
| Object | More Options |
| Generic Top Level menu item | Open<br>Help<br>Minimise<br>Close |
| Generic Actionable menu item e.g. Create playlist | <<Do action>> e.g. Create playlist<br>Help<br>Minimise<br>Close |
| Menu item (default) | Help<br>Minimise<br>Close |

The invention claimed is:

1. A portable wireless computing device programmed with a software application embodied on a non-transitory storage medium that enables digital music content to be downloaded and used on the computing device; the portable wireless computing device configured such that
   (a) the software application enables an end-user to browse and search music content on a remote server using a wireless network; and to download music content from that remote server using the wireless network;
   (b) the software application includes or interacts with a digital rights management program whose operation can be remotely configured (i) to enable unlimited legal downloads of different music tracks to the device whilst a subscription service between the device and the remote server is valid for the device or user associated with that device and (ii) to enable any of those tracks stored on the device to be played so long as the subscription service has not terminated; and
   (c) the software application uses a multithreaded architecture to balance the computational demands of network and/or music track catalogue access; and a computational demand of one or more of: a user interface of the software application; the digital rights management program; media operations.

2. The device of claim 1 in which the multithreaded architecture uses parallel download threads so that large objects can be downloaded to the device in parallel as a background process.

3. The device of claim 1 in which the application is adapted to handle latency inherent in mobile networks and intermittent connectivity by intelligently knowing how much of a file has been downloaded and to ask only for any residual part of a file that has not been downloaded.

4. The device of claim 1 in which the application includes a scheduler for requesting different objects and data from the server, with priority being automatically determined by the application.

5. The device of claim 1 in which the application uses track meta-data that is formed as a separate meta-data layer and defines attributes of tracks, the meta-data being external to a music track to enable sharing and browsing of track information without needing to distribute the related music track files.

6. The device of claim 1 in which intelligent memory management automatically deletes least used tracks to make space for newly downloaded tracks.

7. The device of claim 1 in which the digital rights management program can be remotely configured such that defined, downloaded music tracks can still be played even if the subscription service is terminated.

8. The device of claim 1 in which a billing infrastructure for the subscription service is part of the billing infrastructure provided by a network operator that controls the wireless network.

9. The device of claim 1 in which periodically rolling or one-off subscription is achieved by linking the remote configuration of the digital rights management program to the billing infrastructure provided by the network operator that controls the wireless network.

10. The device of claim 1 in which the application has been automatically adapted to parameters associated with the computing device without end-user input, in which the parameters define one or more of:
   (a) computing capabilities of the device;
   (b) a set of media files and formats that can be shown via Java, including audio, pictures, video, and animations on the device;
   (c) memory limitations of the device;
   (d) a set of media files and formats that the device's operating system can handle;
   (e) how the device handles a network connection;
   (f) networking capabilities and handling of the device, including one or more of CSD, GPRS, 2G, 2.5G, 3G, WAP, SMS, Bluetooth, Infrared, Wi-Fi, WiMAX.

11. The device of claim 1 in which the application records, and feeds back to a remote server, detailed end-user listening data.

12. The device of claim 11 in which the data includes how long tracks have been listened to.

13. The device of claim 11 in which the data includes what tracks are skipped through and when.

14. The device of claim 11 in which the application displays targeted news filtered according to the end-user's playback habits.

15. The device of claim 11 in which the data is locally cached on the device and then sent back to the server as a piggyback over a communication that happens anyway.

16. The device of claim 15 in which the device will pre-emptively send the data back without waiting for the communication expected to happen anyway, only if the user has not connected for more than a set time.

17. The device of claim 11 in which the data is used to enrich a music suggestion engine that provides music track suggestions for display on the device.

18. The device of claim 1 in which the application creates, manages and displays shared playlists.

19. The device of any claim 1 in which the application displays playlist charts generated by users based on play behaviour.

20. The device of claim 1 in which the application interacts with music recommendation systems.

21. The device of claim 1 in which multiple such devices can all be synchronised by wireless or wire via the server to give same view of metadata irrespective of which device a user operates.

22. The device of claim 1 in which playlists are stored on the server as meta-data defining the tracks in the playlist, the meta-data being separate from the tracks themselves and being capable of being sent more efficiently over the wireless network than the tracks themselves.

23. A software application embodied on a non-transitory storage medium, for a portable wireless computing device and that enables digital music content to be downloaded and used on the computing device; the software application configured such that:
   (a) the software application enables an end-user to browse and search music content on a remote server using a wireless network; and to download music content from that remote server using the wireless network;
   (b) the software application includes or interacts with a digital rights management program whose operation can be remotely configured (i) to enable unlimited legal downloads of different music tracks to the device whilst a subscription service between the device and the remote server is valid for the device or user associated with that device and (ii) to enable any of those tracks stored on the device to be played so long as the subscription service has not terminated; and
   (c) the software application uses a multithreaded architecture to balance the computational demands of network and/or music track catalogue access; and a computational demand of one or more of: a user interface of the software application; the digital rights management program; media operations.

* * * * *